US009454766B2

(12) United States Patent
Miyabayashi et al.

(10) Patent No.: US 9,454,766 B2
(45) Date of Patent: Sep. 27, 2016

(54) INFORMATION PROCESSING APPARATUS, METHOD, AND PROGRAM

(75) Inventors: Naoki Miyabayashi, Tokyo (JP); Masahiro Sueyoshi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 219 days.

(21) Appl. No.: 13/355,992

(22) Filed: Jan. 23, 2012

(65) Prior Publication Data

US 2012/0198086 A1 Aug. 2, 2012

(30) Foreign Application Priority Data

Jan. 31, 2011 (JP) ................. P2011-018633

(51) Int. Cl.
*G06F 15/16* (2006.01)
*G06Q 30/02* (2012.01)

(52) U.S. Cl.
CPC .................... *G06Q 30/02* (2013.01)

(58) Field of Classification Search
None
See application file for complete search history.

(56) References Cited

U.S. PATENT DOCUMENTS

| 7,933,414 B2* | 4/2011 | Bauchot ........... H04L 12/189 380/279 |
| 8,140,402 B1* | 3/2012 | Mesaros ................. 705/26.1 |
| 2004/0014422 A1* | 1/2004 | Kallio .................. 455/41.1 |
| 2005/0274807 A1* | 12/2005 | Barrus et al. ........ 235/462.25 |
| 2006/0019651 A1* | 1/2006 | Uchida et al. ............ 455/423 |
| 2007/0061246 A1* | 3/2007 | Ramer et al. ............. 705/37 |
| 2008/0313040 A1* | 12/2008 | Rose et al. ............... 705/14 |
| 2010/0027836 A1 | 2/2010 | Sakurada |
| 2010/0162093 A1* | 6/2010 | Cierniak ................ 715/205 |

FOREIGN PATENT DOCUMENTS

JP 2010-041194 A 2/2010

OTHER PUBLICATIONS

Nov. 1, 2007, XP 002456252, Statement in accordance with the Notice from the European Patent Office dated Oct. 1, 2007, concerning business methods (OJ EPO Nov. 2007, 592-593).
Extended European Search Report EP 12151675, dated Apr. 27, 2012.

* cited by examiner

Primary Examiner — Jeffrey R Swearingen
(74) Attorney, Agent, or Firm — Chip Law Group

(57) ABSTRACT

An information processing apparatus includes: an record information obtaining mechanism which obtains record information representing a provision destination of one predetermined electronic information property by a terminal device relating to a provider of the electronic information property; a weighting mechanism which extracts the provision destination included in the obtained actual achievement information and performs weighting on the extracted provision destination based on a reference predetermined in accordance with the attribute of the provision destination; and an evaluation value calculating mechanism which calculates an evaluation value of the provider based on the weighted value.

25 Claims, 43 Drawing Sheets

FIG. 5

| ITEM | EXPLANATION |
|---|---|
| BROAD AREA COMMUNICATION TYPE | COMMUNICATION TYPE SUCH AS 3G, Wimax, OR THE LIKE |
| BROAD AREA COMMUNICATION ADDRESS | ADDRESS |
| NEAR FIELD WIRELESS COMMUNICATION TYPE | COMMUNICATION TYPE SUCH AS Bluetooth, WiFi, OR THE LIKE |
| NEAR FIELD WIRELESS COMMUNICATION ADDRESS | ADDRESS |
| NON-CONTACT COMMUNICATION SCHEME | ONLY FOR DATA RESPONSE, ONLY FOR DATA OBTAINING, DATA TRANSMISSION AND RECEIVING AVAILABLE |
| UNIQUE KEY | SECRET KEY ALLOCATED TO EACH TERMINAL DEVICE (KEY INFORMATION WHICH IS NECESSARY FOR MODULE ACCESS WHEN THERE IS A SECURITY MODULE) |
| PROVIDER SORTING | WHETHER OR NOT PERSON IS PROVIDER |

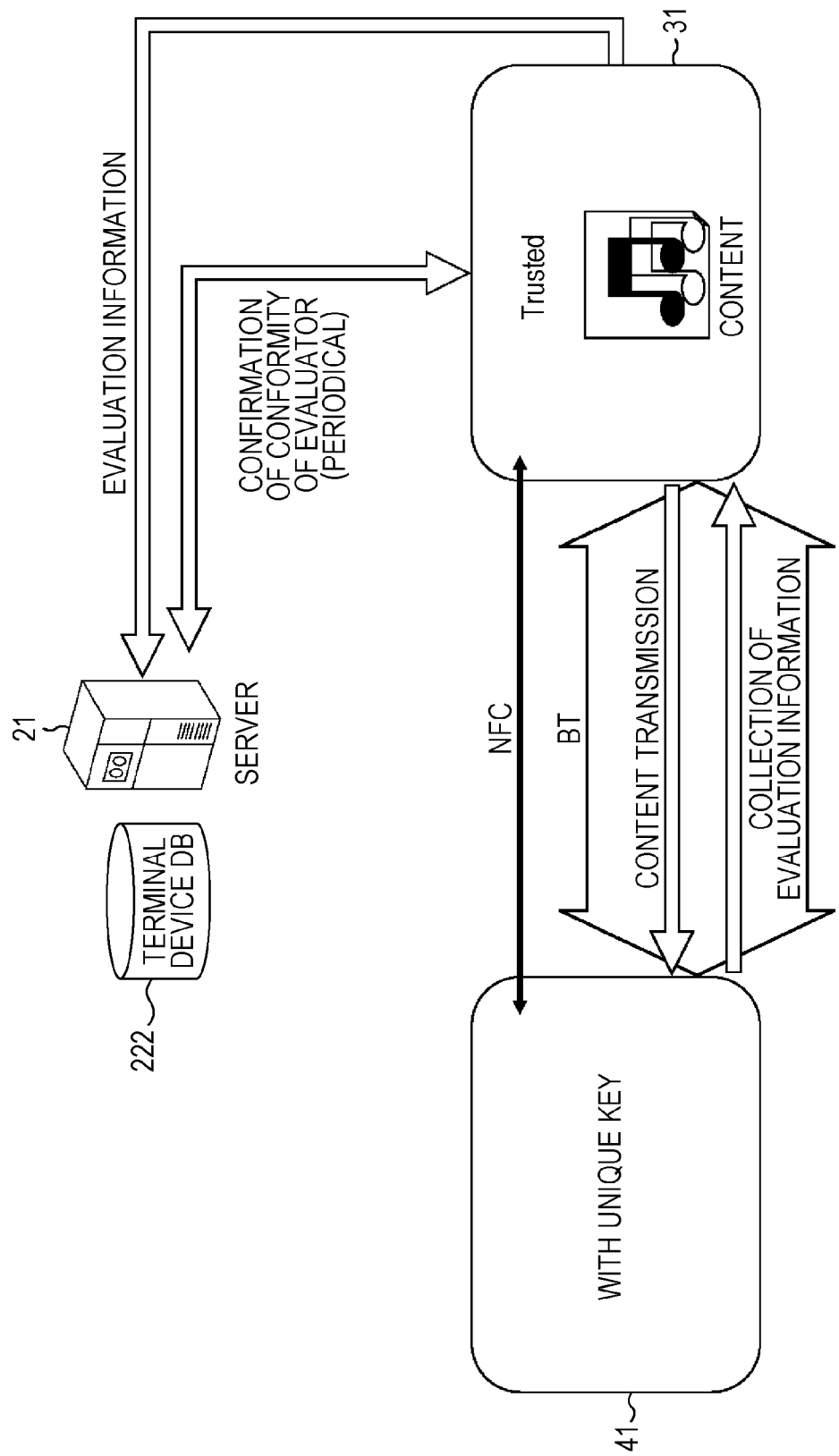

FIG. 15

| EVALUATOR SIDE \ PROVIDER SIDE | Trusted | | No Trusted | |
|---|---|---|---|---|
| | UNIQUE KEY | TEMPORARY KEY | UNIQUE KEY | TEMPORARY KEY |
| UNIQUE KEY | CASE 1 | CASE 1 | CASE 3 | CASE 4 |
| TEMPORARY KEY | CASE 2 | CASE 2 | CASE 4 | CASE 5 |

FIG. 38

| CONTENT PROVISION DESTINATION | | | | | DETAIL | | | |
|---|---|---|---|---|---|---|---|---|
| USER ID | USER ATTRIBUTE | | | | PROVISION START TIME | PROVISION COMPLETION TIME | CONTENT ID | CERTIFICATE |
| | AGE | SEX | ADDRESS | TASTE | | | | |
| A010001 | 19 | MALE | AAA... | XXX... | 06/24/2010/10:00 | 06/24/2010/10:15 | 1 | ○○○ |
| B020003 | 25 | FEMALE | BBB... | YYY... | 06/25/2010/18:40 | 06/25/2010/18:55 | 1 | △△△ |

INFORMATION PROCESSING APPARATUS, METHOD, AND PROGRAM

CROSS-REFERENCE TO RELATED APPLICATION

The present application claims priority from Japanese Patent Application No. JP 2011-018633 filed in the Japanese Patent Office on Jan. 31, 2011, the entire content of which is incorporated herein by reference.

BACKGROUND

The present disclosure relates to an information processing apparatus, a method, and a program, and particularly to an information processing apparatus, a method, and a program which make it possible to enhance the added value of content distribution services.

Content distribution services based on a download scheme via a network have actively been used in the related art. According to such content distribution services, there is a case in which content is transmitted and received between mobile terminals of users in addition to a case in which content is downloaded from a server with the use of a user's mobile phone or the like, for example.

In addition, information which is called word-of-mouth information is exchanged on message boards and the like on the Internet. This word-of-mouth information is evaluation information regarding the services of shops, the qualities of products, the appeal of content, or the like, for example.

The word-of-mouth information is helpful as it is the opinions of persons who actually went to the shops, persons who bought the products, persons who viewed the content, and the like unlike the evaluation information described by magazine writers or experts, and is often referred to for the purchase of the products or services.

In addition, a technique has also been proposed in which viewing effects are measured by collecting the attributes of viewers (user information) from the wireless terminals of the viewers (see Japanese Unexamined Patent Application Publication No. 2010-41194, for example). With such a technique, it has become possible to more easily collect evaluation information.

SUMMARY

Incidentally, content including advertisements has been distributed for free, for example, as content distribution services have become widespread.

As the states of content distribution services have become diversified as described above, it is necessary to differentiate these services from the content distribution services in the related art in which a user simply pays for the desired content to be downloaded.

It is possible to enhance the added value of content distribution services if content is distributed with priority to users who have contributed to the improvement of the evaluation information in the market of content to be distributed, for example.

For example, viral marketing has attracted attention in recent years as a method of marketing with the use of so-called word-of-mouth information.

In viral marketing, existing users are encouraged to introduce original content or services to acquaintances to indirectly promote the original content or services via existing users. For this reason, the information regarding which users are to be encouraged is extremely important information for viral marketing.

It has been difficult to appropriately analyze which users efficiently introduce the provided contents or services to be promoted by a company, according to the word-of-mouth information in a message board on the Internet in the related art.

It is desirable to obtain useful information easily for viral marketing.

According to an embodiment of the present disclosure, there is provided an information processing apparatus including: a record information obtaining mechanism which obtains record information indicating a provision destination of one predetermined electronic information property by a terminal device relating to a provider of the electronic information property; a weighting mechanism which extracts the provision destination included in the obtained record information and performs weighting on the extracted provision destination based on a reference predetermined in accordance with the attribute of the provision destination; and an evaluation value calculating mechanism which calculates an evaluation value of the provider based on the weighted value.

According to the embodiment, a first terminal device as a terminal device relating to a provider of the electronic information property may include a device information receiving mechanism which receives identification information of a second terminal device relating to a provision destination of the electronic information property and information including an address of second communication from the second terminal device via first communication, and an electronic information property transmitting mechanism which transmits the electronic information property to the second terminal device via the second communication, wherein the record information may include identification information and attribute information of a user of the second terminal device included in information received via the first communication.

According to the embodiment, the weighting mechanism may perform weighting on the provision destination based on evaluation information with respect to the electronic information property which has been received by the second terminal device with the use of the second communication.

According to the embodiment, the weighting mechanism may perform the weighting on the provision destination based on at least one of a type of the electronic information property provided to the provision destination and the time point at which the electronic information property was provided.

According to the embodiment, the information processing apparatus may further include: an assigned group specifying mechanism which specifies an assigned group, to which a provider belongs, by specifying a user of the terminal device as a target of computation of the evaluation value based on a plurality of pieces of record information; and a provision destination group specifying mechanism which specifies a provision destination group by specifying a user of the terminal device to which the provider as the target of the computation of the evaluation value has newly provided the electronic information property based on the plurality of pieces of record information, wherein the assigned group specifying mechanism may specify first to n-th providing users while regarding the provider as the target of the computation of the evaluation value as a first providing user, regarding the specified user as a second providing user, and regarding a user who provided the electronic information property to the second providing user in the past as a third providing user, and wherein the provision destination group specifying mechanism may specify first to n-th provided users while regarding the specified user as a first provided user and regarding the user to which the first provided user provided the electronic information property in the past as a second provided user.

According to the embodiment, the evaluation value calculating mechanism may calculate the evaluation value based on the number of users who are not duplicated among users belonging to the specified assigned group and the provision destination group.

According to the embodiment, the record information may further include information relating to a user authentication scheme of the second terminal included in the information received via the first communication and the user authentication result of the second terminal.

According to the embodiment, the information processing apparatus may further include: a class specifying mechanism which specifies a reliability class indicating the reliability of a provider of a product or a service, a security class of the first terminal device, and a security class of the second terminal device based on the identification information of the first terminal device and the identification information of the second terminal device; and a link authentication mechanism which specifies a link authentication scheme in which it is confirmed that second communication is being continuously performed between the first terminal device and the second terminal device based on the specification result and executing processing relating to the link authentication based on the scheme, wherein the information relating to the user authentication result of the second terminal may include the result of the link authentication.

According to the embodiment, the link authentication mechanism may periodically function according to the specification result evaluator identity confirmation processing in which the identity of the second terminal device is confirmed by receiving information, which indicates whether or not information transmitted to the second terminal device with the use of the third communication has been transmitted to the first terminal device with the use of the second communication, from the first terminal device with the use of the third communication, and provider identity confirmation processing in which the identity of the first terminal device is confirmed by receiving information, which indicates whether or not the information transmitted to the first terminal device with the use of the third communication has been transmitted to the second terminal device with the use of the second communication, from the second terminal device with the use of the third communication.

According to the embodiment, the link authentication mechanism may specify the link authentication scheme by determining whether or not the provider identity confirmation processing is executed based on the reliability class.

According to the embodiment the link authentication mechanism may specify the link authentication scheme by determining whether a unique key stored in advance in the first terminal device or the second terminal device is used in the evaluator identity confirmation processing or the provider identity confirmation processing or whether a temporary key which is not stored in advance in the first terminal device or the second terminal device is used, based on the security class.

According to another embodiment of the present disclosure, there is provided an information processing method including: obtaining by a record information obtaining mechanism actual achievement information indicating a provision destination of one predetermined electronic information property by a terminal device relating to a provider of the electronic information property; extracting the provision destination included in the obtained record information and performing weighting on the extracted provision destination based on a reference predetermined in accordance with the attribute of the provision destination by a weighting mechanism; and calculating an evaluation value of the provider based on the weighted value by an evaluation calculating mechanism.

According to still another embodiment of the present disclosure, there is provided a program which causes a computer to function as an information processing apparatus including: a record information obtaining mechanism which obtains record information indicating a provision destination of one predetermined electronic information property by a terminal device relating to a provider of the electronic information property; a weighting mechanism which extracts the provision destination included in the obtained record information and performs weighting on the extracted provision destination based on a reference predetermined in accordance with the attribute of the provision destination; and an evaluation value computing mechanism which calculates an evaluation value of the provider based on the weighted value.

According to the embodiment, record information indicating a provision destination of one predetermined electronic information property by a terminal device relating to a provider of the electronic information property is obtained, the provision destination included in the obtained record information is extracted, the weighting is performed on the extracted provision destination in accordance with the attribute of the provision destination based on a predetermined reference, and an evaluation value of the provider is calculated based on the weighted value.

According to the present disclosure it is possible to further enhance the added value of the content distribution services.

BRIEF DESCRIPTION OF THE DRAWINGS

FIG. 5 is a diagram showing an example of terminal device information;

FIG. 6 is a diagram illustrating an example of a scheme in which link authentication is performed to collect evaluation information;

FIG. 15 is a diagram illustrating information for specifying a scheme for link authentication;

FIG. 38 is a diagram showing an example of record information;

DETAILED DESCRIPTION OF EMBODIMENTS

Hereinafter, description will be given of embodiments of the present disclosure with reference to the drawings.

According to the present disclosure, evaluation information is collected with the use of a handover function of a mobile terminal, for example.

For example, a mobile terminal configured as a mobile phone has a near-field wireless communication mechanism such as Bluetooth (registered trademark), WiFi (registered trademark), or the like in some cases. In such cases, the mobile phones can directly (locally) communicate with each other. Moreover, when mobile phones are provided with non-contact communication (NFC: Near Field Communication) devices, connection authentication is performed by the non-contact communication devices by the users causing the mobile phones to approach (or contact) each other, whereby the near-field wireless communication becomes available. The function by which the connection authentication is performed by the non-contact communication devices to make the near-field wireless communication possible is referred to as handover.

With the use of such a handover function, the user can receive provided service or purchase a product simply by touching the mobile phones. When the user purchases content as a product, the user can download the data of the content onto the mobile terminal through the near-field wireless communication simply by touching the mobile phones.

Figure 1:
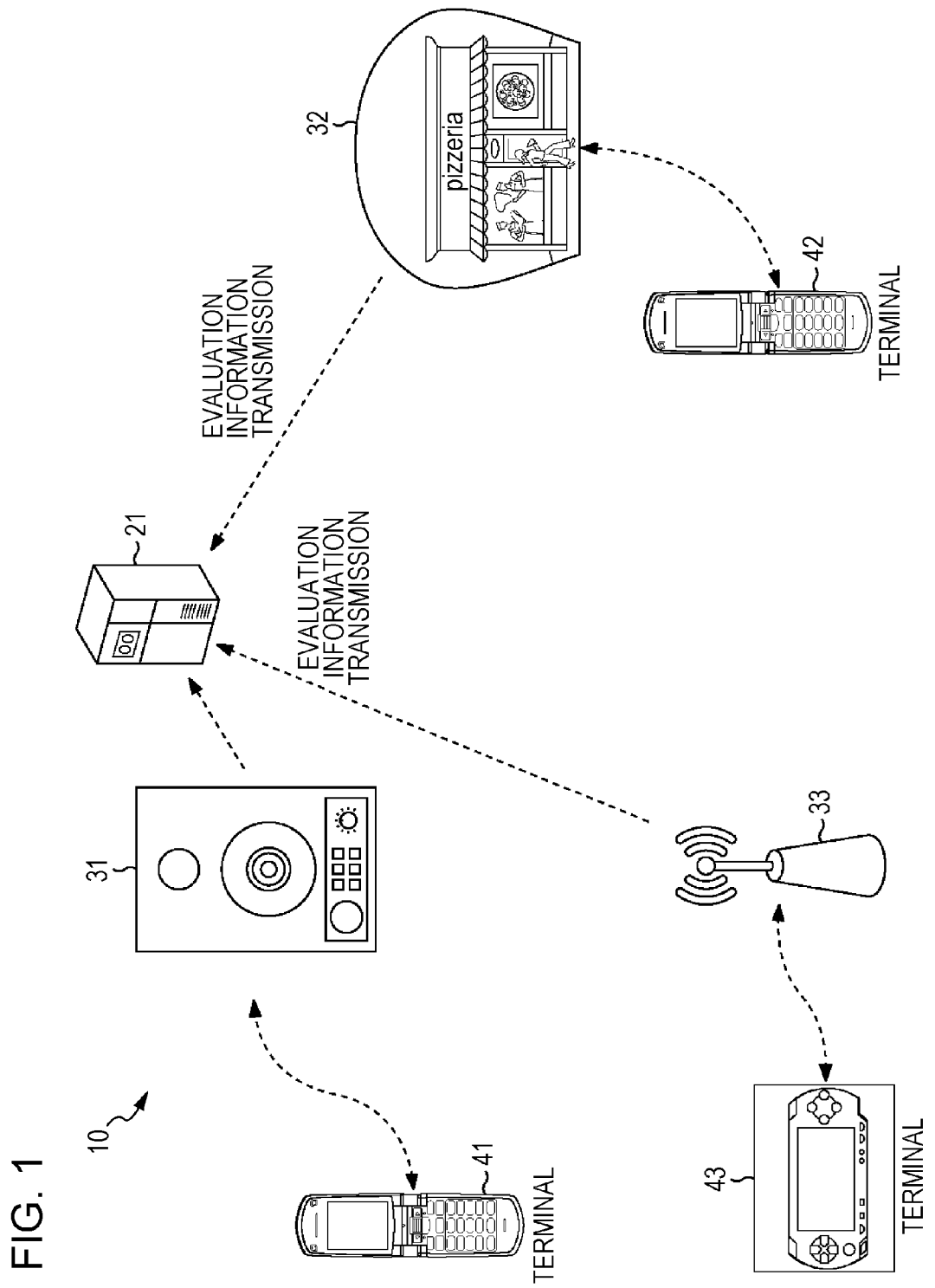
FIG. 1 is a diagram showing a configuration example of an evaluation information collecting system according to an embodiment of the present disclosure.

FIG. 1 is a diagram showing a configuration example of an evaluation information collecting system according to an embodiment of the present disclosure. In the example of the drawing, an evaluation information collecting system 10 includes a server 21, information collecting terminals 31 to 33, and mobile terminals 41 to 43.

The server 21 is installed at a data center of a business operator of collecting evaluation information, obtains the evaluation information transmitted from the information collecting terminals 31 to 33, and performs processing such as storage, modification, and the like of the obtained evaluation information. The server 21 performs processing such as the sorting of the obtained information into each type of a product or a service as the target of evaluation and the provision of the classified information to a user who accesses via the network.

The information collecting terminals 31 to 33 are terminals which respectively communicate by the handover functions of the mobile terminals 41 to 43, and are configured to include near-field wireless communication mechanisms and non-contact communication devices.

For example, the information collecting terminal 31 is configured as a device which provides trial-listening services of music content. When the user causes a mobile terminal 41 to touch a predetermined region, for example, the information collecting terminal 31 transmits a part of data of the content via the near-field wireless communication after the non-contact communication and causes the mobile terminal 41 to perform streaming reproduction of the content. In so doing, the user can listen to the content as a trial by putting on a headset connected to the mobile terminal 41.

In addition, the information collecting terminal 32 is configured as a device such as a POS terminal used in a restaurant, for example. When the user causes the mobile terminal 42 to touch a predetermined region, the information collecting terminal 32 transmits GUI data such as a menu, an order format, or the like via the near-field wireless communication after the non-contact communication, and causes the mobile terminal 42 to display the GUI data. In so doing, the user can order a desired menu or answer questionnaire and get bonus points by the mobile terminal 42.

The information collecting terminal 33 is configured as a device such as a wireless communication hub installed at a predetermined area such as a shopping mall, an entertainment park, or the like. When the user causes the mobile terminal 43 to touch a predetermined region, the information collecting terminal 33 transmits data of game content via the near-field wireless communication after the non-contact communication. In so doing, the user can enjoy the game by the mobile terminal 43.

Each of the information collecting terminals 31 to is provided with a broad area communication mechanism, which is for communicating with the server 21, as well as the near-field wireless communication mechanism and the non-contact communication device. As the broad area communication mechanism, a wireless communication device can be exemplified which performs wireless communication with the nearest wires base station to perform communication via the mobile communication network. Alternatively, another configuration is also applicable in which connection with the server 21 can be made via a dedicated line.

The mobile terminals 41 and 42 are configured as mobile phones, for example. The mobile terminal 43 is configured as a game device, for example. The mobile terminals 41 to 43 are terminals which respectively communicate by the handover function, and are configured to include the near-field wireless communication mechanisms and the non-contact communication devices. In addition to them, the mobile terminals 41 to 43 include wireless communication devices which perform wireless communication with the nearest wireless base station to perform communication via the mobile communication network.

In the example of FIG. 1, the information accumulated in the information collecting terminal 31 such as the number of times of the reproduction orders of the content, the attribute information of the user of the mobile terminal 41, which is obtained via the non-contact communication, or the like is transmitted to the server 21 as the evaluation information.

For example, the information accumulated in the information collecting terminal 32 such as the number of times of the orders for each menu, the answer to the questionnaire, or the like is transmitted to the server 21 as the evaluation information.

Moreover, the information accumulated in the information collecting terminal 33 such as the operation information in the game or the like is transmitted to the server 21 as the evaluation information, for example.

As described above, the evaluation information is transmitted from the information collecting terminals 31 to 33 to the server 21 with the use of the broad area communication mechanisms.

Figure 2:
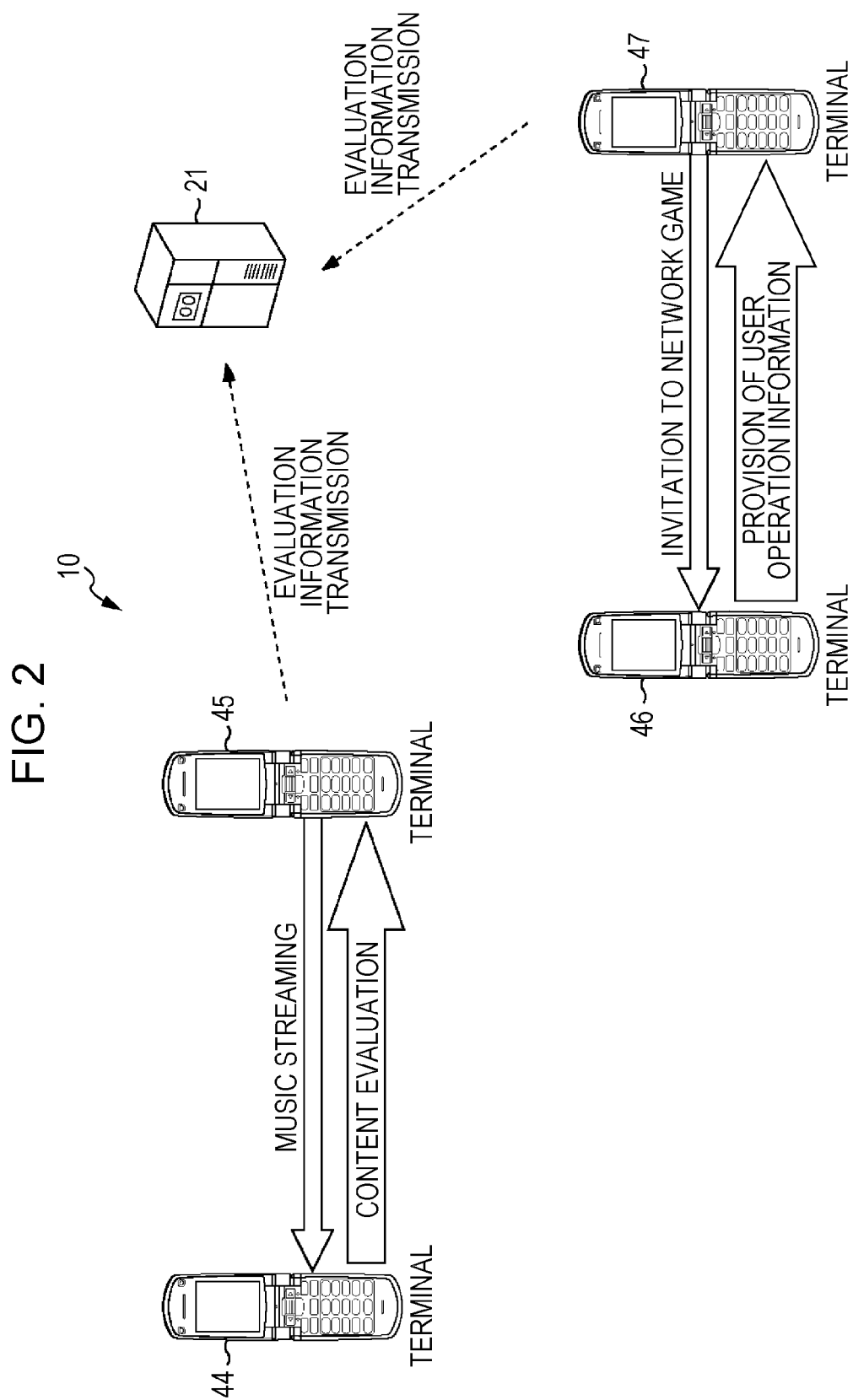
FIG. 2 is a diagram showing another configuration example of an evaluation information collecting system according to an embodiment of the present disclosure.

FIG. 2 is a diagram showing another configuration example of an evaluation information collecting system according to an embodiment of the present disclosure. In the example of the drawing, the evaluation information collecting system 10 includes a server 21 and mobile terminals 44 to 47.

The mobile terminals 44 to 47 are respectively configured as mobile phones in the same manner as the mobile terminals 41 and 42 in FIG. 1. In the case of FIG. 2, the users of the mobile terminals 45 and 47 are providers of the content, respectively, and the users of the mobile terminals 44 and 46 are the evaluators of the content, respectively.

In the example of FIG. 2, the server 21 is installed at a data center of a business operator of collecting evaluation information in the same manner, obtains the evaluation information transmitted from the mobile terminals 45 and 47, and performs processing such as the storage, the modification, and the like of the obtained evaluation information.

For example, it is assumed that the user of the mobile terminal 45 downloads to the mobile terminal 45 the data of music content that the user desires to introduce to friends. When the mobile terminals 44 are brought to be in contact with the mobile terminal 45, the data of the content from the mobile terminal 45 is transmitted via the near-field wireless communication after the non-contact communication, and the mobile terminal 44 is caused to perform streaming reproduction of the content. In so doing, the user of the mobile terminal 44 can listen to the content as a trial by putting on a headset or the like. Then, the user of the mobile terminal 44 transmits the evaluation of the music (Brief comment or the like, for example) to the mobile terminal 45 via the near-field wireless communication.

For example, it is assumed that the user of the mobile terminal 47 enjoys a network game and desires that a friend who is the user of the mobile terminal 46 also join this network game. When the mobile terminals 46 and 47 are brought to be in contact, the data of the game is transmitted from the mobile terminal 47 via the near-field wireless communication after the non-contact communication, and the mobile terminal 46 is caused to display the screen and the like of the game.

In so doing, the user of the mobile terminal 46 can join the network game that the user of the mobile terminal 47 enjoys. In addition, information such as the profile of the user, the operation information of the game, and the like are transmitted from the mobile terminal 46 to the mobile terminal 47 via the near-field wireless communication.

In the case of FIG. 2, the information accumulated in the mobile terminal 45 such as the comment for music or the like is transmitted to the server 21 as the evaluation information, for example.

In addition, the information accumulated in the mobile terminal 47 such as the operation information of a game or the like is transmitted to the server 21 as the evaluation information, for example.

The evaluation information from the mobile terminals 45 and 47 to the server 21 is transmitted with the use of the broad area communication mechanisms.

As described above, the evaluation information collecting system 10 according to the present disclosure does not place weight on collected evaluation information based on the user comment, and it is also possible to collect the information such as the user's record of trial listening for the content, for example, as the evaluation information.

Figure 3:
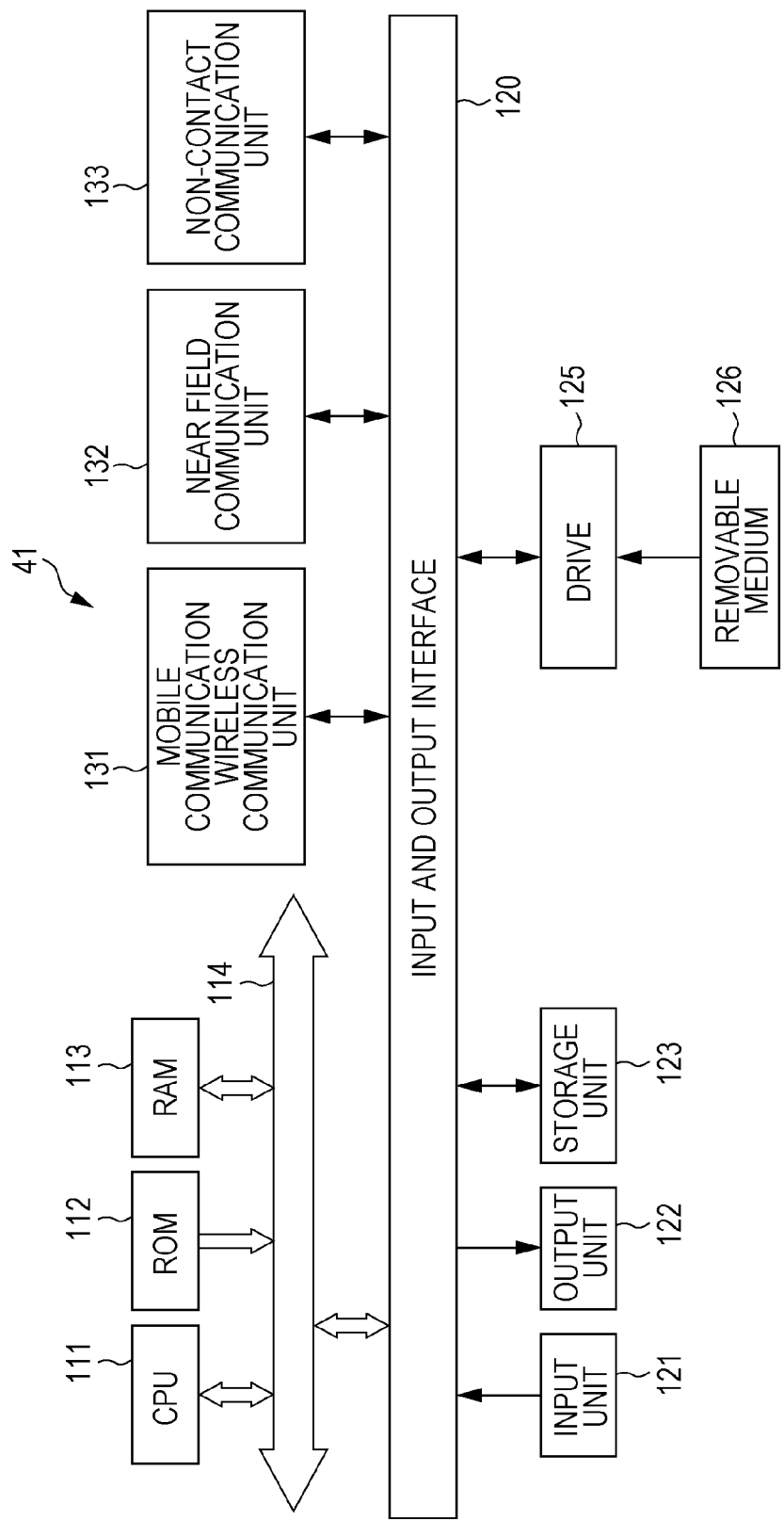
FIG. 3 is a block diagram showing a configuration example of a mobile terminal.

FIG. 3 is a block diagram showing a configuration example of a mobile terminal in FIG. 1 or 2. Although the drawing shows the configuration of the mobile terminal 41, it is also possible to apply the configuration of the drawing to the mobile terminals 42 to 47.

In FIG. 3, the CPU (Central Processing Unit) 111 of the mobile terminal 41 executes various kinds of processing based on the program stored on the ROM (Read Only Memory) 112 or the program loaded on the RAM (Random Access Memory) 113 from the storage unit 123. The RAM 113 appropriately stores data which is necessary for the CPU 111 to execute various kinds of processing.

The CPU 111, the ROM 112, and the RAM 113 are connected to each other via the bus 114. The input and output interface 120 is also connected to the bus 114.

To the input and output interface 120, an input unit 121 including a keyboard, a mouth, and the like, a display including an LCD (Liquid Crystal Display) and the like, an output unit 122 including a speaker and the like, and a storage unit 123 configured by a hard disk, a flash memory, or the like are connected.

A drive 125 is also connected to the input and output interface 120, if necessary, a removable medium 126 such as a magnetic disk, an optical disc, a magneto-optical disc, or a semiconductor memory is appropriately mounted thereon, and a computer program read from the removable medium 126 is installed on the storage unit 123, if necessary.

A mobile communication wireless communication unit 131, a near field communication unit 132, and a non-contact communication unit 133 are further connected to the input and output interface 120.

The mobile communication wireless communication unit 131 is a wireless communication device which performs wireless communication with a wireless base station which is not shown in the drawing and performs communication via the mobile communication network. The mobile communication wireless communication unit 131 uses a frequency band of 2 GHz, for example, and is used not only for the telephone call application but also for various communication applications such as the Internet connection and the like with the use of the data communication of 2 Mbps at a maximum. For example, the wireless communication by the mobile communication wireless communication unit 131 is used for downloading the content data, for the communication with the server 21, and the like. In addition, the mobile communication wireless communication unit 131 is assumed to be configured as a device or the like capable of communicating based on a communication scheme of a so-called third generation mobile phone.

The near field communication unit 132 is a near-field wireless communication device such as Bluetooth (registered trademark, referred to as a BT) or IEEE (Institute of Electrical and Electronic Engineers) 802.11x. Here, the near-field wireless communication means local (narrow area) wireless communication in which the communicable maximum distance is about several meters to several tens of meters. An arbitrary communication standard can be used. For example, when the near field communication unit 132 performs communication of BT, the communication at the maximum communication rate 3 Mbit/second (Version 2.0+ EDR or later versions) is performed in the band of 2.4 GHz via an antenna.

The non-contact communication unit 133 is an NFC (Near Field Communication) device. Hear, the non-contact communication means local (narrow area) wireless communication in which the communicable maximum distance is about several tens of cm. An arbitrary communication standard can be used. For example, the non-contact communication unit 133 uses a frequency in the band of 13.56 MHz via an antenna and performs communication at a communication rate of 424 Kbit/second at a maximum in the extremely short distance of about 10 cm.

The non-contact communication by the non-contact communication unit 133 is used for sending and receiving the information which is necessary for establishing the near-field wireless communication connection by the near field communication unit 132 and the message in which a list or the like of the transmittable content to and from the mobile terminal whose case body is brought to be in contact or placed nearby.

Each part of the mobile terminal 41 is controlled by the CPU 111. The execution binary code of the control program is stored on the ROM 112 or the storage unit 123, and the stack and the heap regions for various kinds of computation processing are expanded on the RAM 113.

In addition, since the information collecting terminals 31 to 33 are configured in the same manner as in the example of FIG. 3, the detailed description thereof will be omitted.

Figure 4:
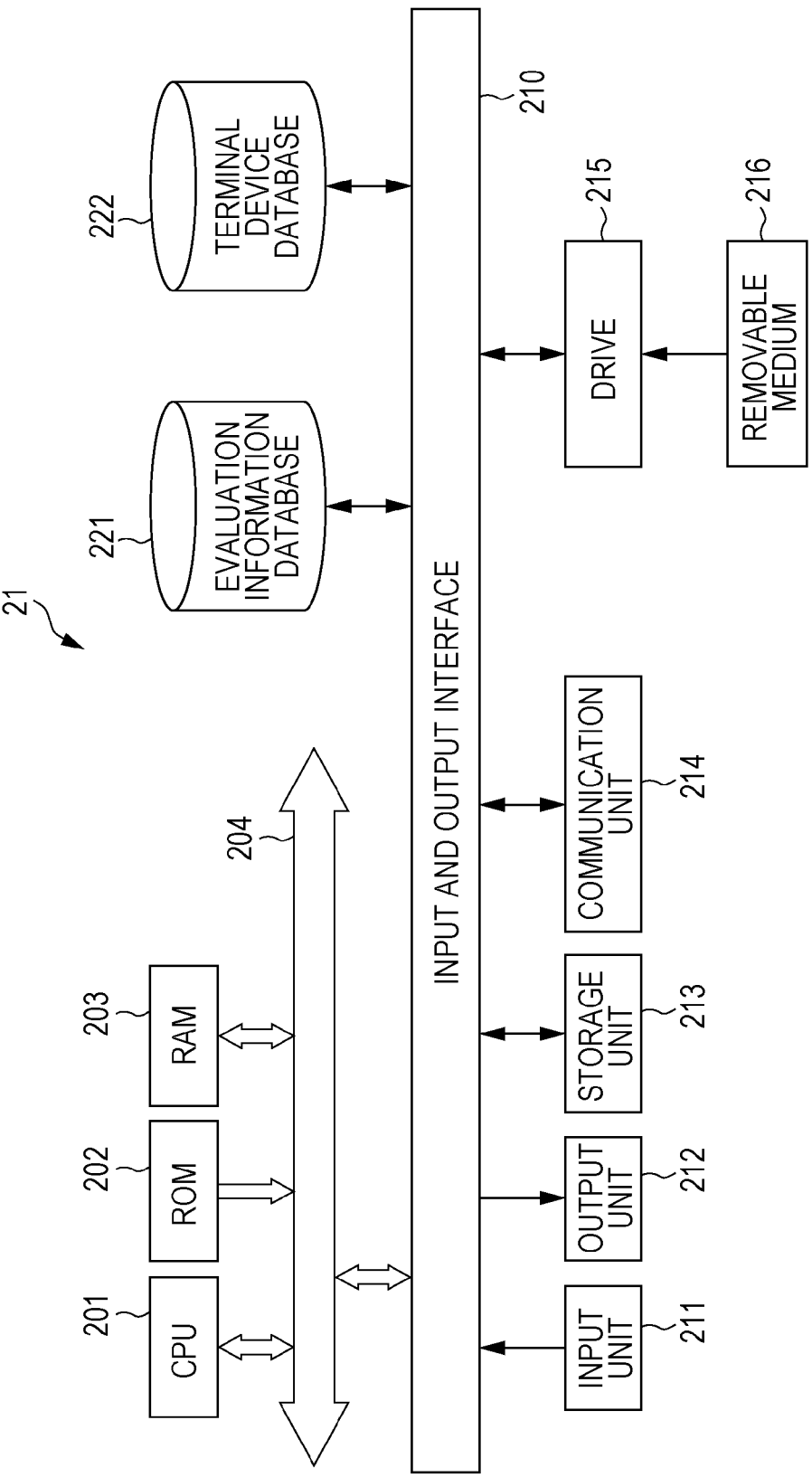
FIG. 4 is a block diagram showing a configuration example of a server.

FIG. 4 is a block diagram showing a configuration example of a server in FIG. 1 or 2.

As shown in the drawing, the server 21 includes a CPU 201, a ROM 202, and a RAM 203 which are connected to each other via the bus 204, in the same manner as in the case of the mobile terminal 41. In addition, an input and output interface 210 is connected to the bus 204.

To the input and output interface 210, an input unit 211, an output unit 212, a storage unit 213, a driver 215 for a removable medium 216 are connected in the same manner as in the case of the mobile terminal 41.

The CPU 201, the ROM 202, the RAM 203, the bus 204, the input and output interface 210, the input unit 211, the output unit 212, the storage unit 213, the drive 215, and the removable medium 216 in FIG. 4 correspond to the CPU 111, the ROM 112, the RAM 113, the bus 114, the input and output interface 120, the input unit 121, the output unit 122, the storage unit 123, the drive 125, and the removable medium 126 in FIG. 2, respectively.

The server 21 also includes a communication unit 214 connected to the input and output interface 210. The communication unit 214 is a communication device which performs communication with other devices via the network. For example, the communication unit 214 is connected to the mobile communication network via the wired network and used for the communication with a mobile terminal or an information collecting terminal.

To the input and output interface 210, an evaluation information database 221 and the terminal device database 222 are further connected.

The evaluation information database 221 stores the evaluation information transmitted from a mobile terminal or an information collecting terminal. The evaluation information database 221 classifies the evaluation information into the types of products or services as the targets of the evaluation and organizes the information as the database such that it is possible to search for the identification information of the products, the identification information of the evaluators, the evaluation date, and the like as keys, if necessary.

The terminal device database 222 store the information (terminal device information) relating to a communication function of a mobile terminal or an information collecting terminal (appropriately referred to as a terminal device) for each terminal.

FIG. 5 is a diagram showing an example of information stored on the terminal device database 222. The drawing shows an example of the terminal device information of the mobile terminal with a predetermined identification number, for example.

The "type of broad area communication" shown in FIG. 5 is the information for specifying the type of the broad area communication mechanism of the mobile terminal, in which the information such as 3G (IMT-2000), WiMAX (Worldwide Interoperability for Microwave Access), or the like are described, for example.

In the "broad area communication address", the information for specifying the address for communicating with the user of the aforementioned broad area communication mechanism is described.

The "near-field wireless communication type" is the information for specifying the type of the near-field wireless communication mechanism of the mobile terminal, in which the information such as Bluetooth (registered trademark), Wi-Fi, or the like is described.

In the "near-field wireless communication address", the information for specifying the address for communicating with the use of the aforementioned near-field wireless communication mechanism is described.

The "non-contact communication scheme" is the information for specifying the communication scheme available by the non-contact communication by the mobile terminal, and the information such as "only data response", "only data obtaining", or "data communication available" is described.

The "unique key" is the information representing a secret key stored in advance on the mobile terminal. When the mobile terminal includes a security module, the information of the key which is necessary for the access to the security module is described.

The "provider sorting" is the information for specifying whether or not the mobile terminal is the mobile terminal of the provider of the products or the services or the information for specifying the scheme of the provision of the products or the services, and the information representing it is described.

As described above, the terminal device information of the information collecting terminal 31, the terminal device information of the information collecting terminal 32, . . . the terminal device information of the mobile terminal 41, the terminal device information of the mobile terminal 42, . . . are stored on the mobile device database 222 of the server 21. That is, the terminal device database 222 stores the terminal device information of the terminal devices which can join the valuation information collecting system 10 so as to correspond to the respective identification information.

As described above, according to the evaluation information collecting system 10 of the present disclosure, the evaluation information is collected with the use of the handover functions of the mobile terminals. The evaluation information collected with the use of the handover functions is the evaluation information obtained in the state in which the provider of the products or the services is in the extremely close relationship with the evaluator. This is because the connection authentication is performed by the non-contact communication devices of the mobile terminals placed nearby to perform the near-field wireless communication according to the handover functions.

The thus collected evaluation information is helpful as opinions of persons who actually receive the products or the services, and it is considered that the evaluation information can be referred to for the purpose of the products or the services. This is because the evaluation information collected with the use of the handover functions is considered to be the evaluation of the users, who actually receive the products or the services, as it is unlike the articles in the magazine which introduce the products or the services. In addition, the evaluation information collected with the use of the handover functions is not collected from the persons who do not actually receive the products or the services unlike the information written in message boards on the Internet.

When the evaluation information is collected with the use of the handover functions, however, it is difficult to prove that the evaluation information is really the information which has been collected with the use of the handover functions when the evaluation information is collected with the use of the handover functions. That is, it is understood that the evaluation information collected with the use of the handover functions is helpful just because the evaluation information has been collected immediately after the reception of the products or the services via the near-field wireless communication as described above. For example, when the evaluation information is collected from mobile terminals or the information collecting terminals by the server 21 based on the batch scheme, it is difficult to remove a doubt that only the evaluation information which is advantageous for the provider of the products or the services is transmitted or a doubt that the evaluation information is fake.

Of course, it is considered that business operators of collecting evaluation information try to honestly collect information; however, a person who refers to the evaluation information may think that some impropriety has occurred when the evaluation of a specific product is extremely good as compared with that of other products. Moreover, if the transmission of the evaluation information is failed or the evaluation information which has already been transmitted is repeatedly transmitted due to the trouble of the software or the like even when the provider of the products or the services does not meant to do so, incorrect evaluation is formed as a result. If such a situation occurs, the evaluation relating to the reliability of the evaluation information supplied by the server 21 is significantly lowered thereafter.

Thus, the present disclosure makes it possible to confirm that the near-field wireless communication is continuously performed between the mobile terminal or the information collecting terminal of the provider and the mobile terminal of the evaluator when the server 21 collects the evaluation information. In so doing, it is possible to prove that the evaluation information has been collected immediately after receiving the products or the services.

According to the present disclosure, the server 21 is immediately notified of the handover between the mobile terminal or the information collecting terminal of the provider and the mobile terminal of the evaluator although the detail thereof will be described later. In addition, the server 21 accesses the mobile terminal or the information collecting terminal of the provider with the use of the broad area communication mechanism, for example, to confirm that the near-field wireless communication with the mobile terminal of the same evaluator is continuously performed.

For example, it is possible to confirm that the near-field wireless communication with the mobile terminal of the same evaluator is continuously performed as follows. When the notification of the handover is made, predetermined authentication information is transmitted from the server 21 to the mobile terminal of the evaluator, and it is confirmed that the authentication information has been transmitted from the mobile terminal of the evaluator in the near-field wireless communication after the handover. In addition, the confirmation of the fact that the near-field wireless communication with the mobile terminal of the same evaluator is continuously performed will be referred to as link authentication.

FIG. 6 is a diagram illustrating an example of a scheme in which link authentication is performed to collect evaluation information in the evaluation information collecting system 10. The drawing shows an example in which the handover is performed between the information collecting terminal 31 and the mobile terminal 41, a part of the content data is transmitted via the near-field wireless communication (BT) after the non-contact communication (NFC communication), and the streaming reproduction is performed.

In the example of the drawing, the information collecting terminal 31 notifies the server 21 of the handover between the information collecting terminal 31 and the mobile terminal 41 with the use of the broad area communication. At this time, the identification number of the information collecting terminal 31 and the identification number of the mobile terminal 41 are also transmitted to the server 21. Then, the server 21 generates random number and encrypts the random number using a unique key of the mobile terminal 41. In addition, it is possible to obtain the unique key of the mobile terminal 41 by searching for the terminal device database 222 with the use of the identification number of the mobile terminal 41.

The server 21 transmits the random number which has been encrypted (referred to as encrypted random number) to the broad area communication address of the information collecting terminal 31. In addition, it is possible to obtain the broad area communication address of the information collecting terminal 31 by searching for the terminal device database 222 using the identification number of the information collecting terminal 31.

The information collecting terminal 31 transmits the encrypted random number transmitted from the server 21 to the mobile terminal 41 via the near-field wireless communication.

The mobile terminal 41 decodes the encrypted random number with the own unique key to obtain the random number. Then, the mobile terminal 41 transmits the random number to the information collecting terminal 31 via the near-field wireless communication.

The information collecting terminal 31 transmits the random number transmitted from the mobile terminal 41 to the server 21 via the broad area communication.

The server 21 compares the random number transmitted from the information collecting terminal 31 with the random number generated by the server 21 and confirms that the near-field wireless communication with the evaluator at the time of the handover is being performed when both random numbers are coincident with each other. That is, it is possible to confirm the identity of the evaluator.

Thereafter, a part of the content data is transmitted from the information collecting terminal 31 via the near-field wireless communication, and the streaming reproduction of the content is performed by the mobile terminal 41. The mobile terminal 41 transmits the evaluation information to the information collecting terminal 31 at this time.

While the content data and the evaluation information are transmitted via the near-field wireless communication between the information collecting terminal 31 and the mobile terminal 41, the server 21 continuously (periodically) confirms the identity of the evaluator as described above at a constant cycle, for example.

Then, the evaluation information accumulated in the information collecting terminal 31 is transmitted to the server 21 via the broad area communication.

In so doing, the link authentication is performed in the evaluation information collecting system 10 to collect the evaluation information.

Figure 7:
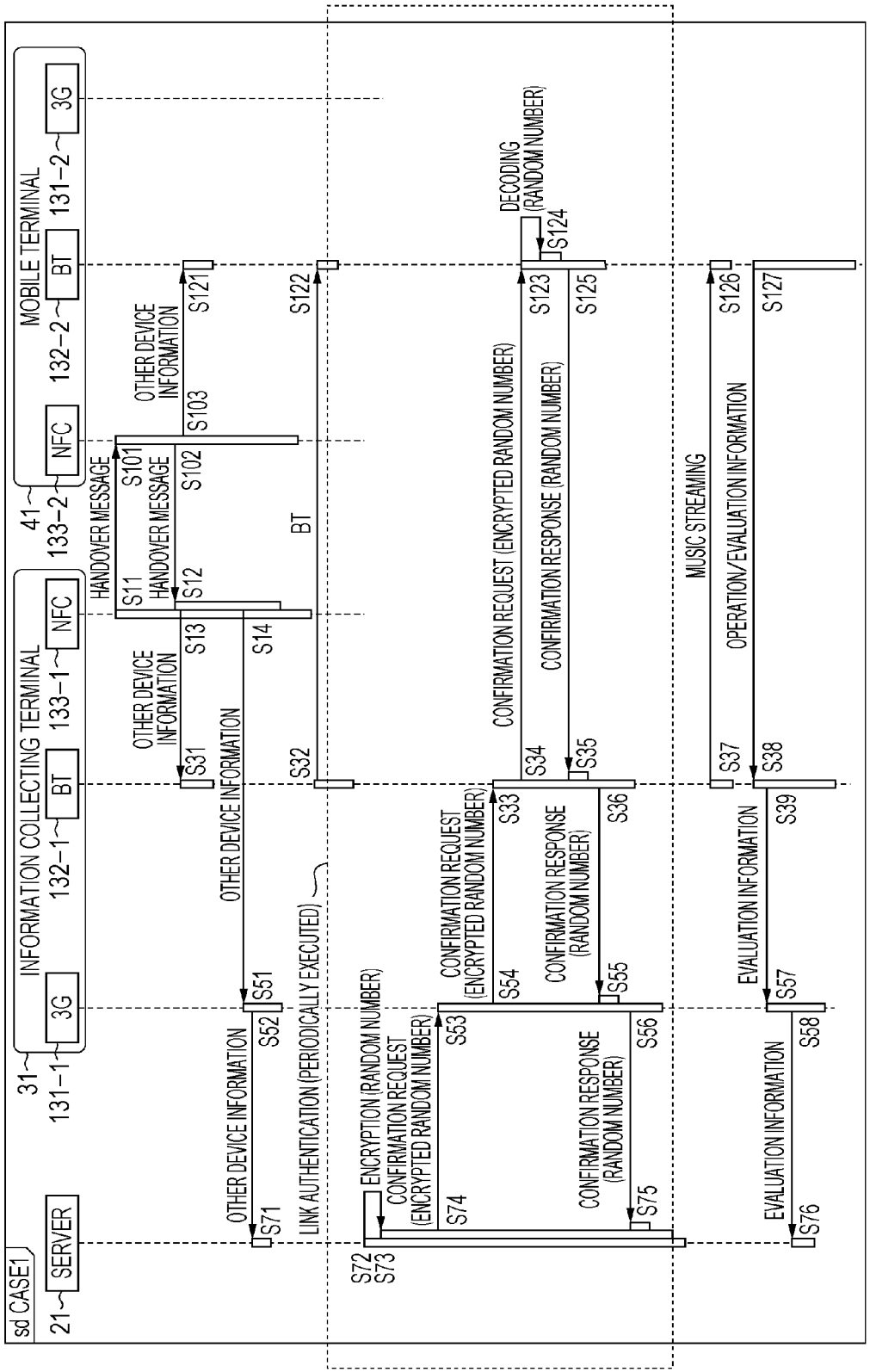
FIG. 7 is an arrow chart illustrating a flow of processing based on the scheme of FIG. 6.

FIG. 7 is an arrow chart illustrating a flow of processing of performing the aforementioned link authentication with reference to FIG. 6 to collect the evaluation information.

In the drawing, the mobile communication wireless communication unit 131 of the information collecting terminal 31 of the mobile communication wireless communication unit 131 is described as 3G131-1 while the mobile communication wireless communication unit 131 of the mobile terminal 41 is described as 3G131-2. In addition, the near field communication unit 132 of the information collecting terminal 31 is described as BT132-1 while the near field communication unit 132 of the mobile terminal 41 is described as BT132-2. Moreover, the non-contact communication unit 133 of the information collecting terminal 31 is described as NFC133-1 while the non-contact communication unit 133 of the mobile terminal 41 is described as NFC133-2.

In addition, the 3G here is based on a communication scheme of a digital mobile phone such as a W-CDMA scheme, a CDMA2000 scheme, or the like and means a so-called third generation mobile phone (3G).

The NFC133-1 of the information collecting terminal 31 transmits the handover message in Step S11, and the NFC133-2 of the mobile terminal 41 receives the handover message in Step S101.

The NFC133-2 transmits the handover message in Step S102, and the NFC133-1 receives the handover message in Step S12.

By the above processing, the other device information is exchanged by the information collecting terminal 31 and the mobile terminal 41. In addition, the other device information includes the identification number of the device as the counterpart of the handover, the near-field wireless communication address, and the like.

The NFC133-1 notifies the BT132-1 of the other device information in Step S13, and the BT132-1 receives the other device information in Step S31. In addition, the NFC133-2 notifies the BT132-2 of the other device information in Step S103, and the BT132-2 receives the other device information in Step S121. In practice, the other device information and other information are notified via the CPU 111. The same is true in the following process.

The NFC133-1 notifies the 3G131-1 of the other device information in Step S14, and the 3G131-1 receives the other device information in Step S51.

The 3G131-1 performs the notification of the handover by transmitting the information including the other device information to the server 21 in Step S52, and the server 21 obtains the notification in Step S71. When the server 21 is notified of the handover, not only the other device information of the counterpart of the handover but also the other device information of its own (in this case, the information collecting terminal 31) is transmitted.

The BT132-1 transmits a BT connection request to the BT132-2 in Step S32, and the BT132-2 receives the BT connection request in Step S122.

The server 21 generates a random number in Step S72 and encrypts the random number in Step S73. The server 21 transmits the encrypted random number obtained in the processing of Step S73 as a confirmation request in Step S74, and the 3G131-1 receives the encrypted random number in Step S53.

The 3G131-1 notifies the BT132-1 of the confirmation request, which has been received in Step S53, in Step S54 and the BT132-1 receives the confirmation request in Step S33.

The BT132-1 transmits the confirmation request, which has been received in Step S33, in Step S34, and the BT132-2 receives the confirmation request in Step S123.

The BT132-2 decodes the encrypted random number of the confirmation request, which has been received in Step S123, in Step S124 to obtain the random number. In addition, the encrypted random number is decoded by the CPU 111 in practice.

The BT132-2 transmits the random number obtained in the processing of Step S124 as the confirmation request in Step S125, and the BT132-1 receives the random number in Step S35.

The BT132-1 notifies the 3G131-1 of the confirmation request, which has been received in Step S35, in Step S36, and the 3G131-1 obtains the confirmation request in Step S55.

The 3G131-1 transmits the confirmation request, which has been obtained in Step S55, in Step S56, and the server 21 receives the confirmation request in Step S75.

The content data is transmitted and received in Step S37 and Step S126, and the operation information as the evaluation information is transmitted and received in Step S127 and Step S38.

The BT132-1 notifies the 3G131-1 of the evaluation information in Step S39 and the 3G131-1 receives the evaluation information in Step S57.

The 3G131-1 transmits the evaluation information, which has been obtained in Step S57, in Step S58, and the server 21 receives the evaluation information in Step S76.

The processing of the part surrounded by the dotted line in the drawing is periodically executed as the processing for confirming the identity of the evaluator.

As described above, the link authentication is performed, and the processing of collecting the evaluation information is executed.

Although the subjects which execute each step in the arrow chart were expressed as the 3G131-1, the BT132-1, . . . and the like in this example as appropriately described in the explanation of FIG. 7, the expressions were given only for the purpose of convenience. That is, such expressions were given to facilitate understanding of on which communication scheme the information transmitted or received in each step is based since three types of communication schemes including the non-contact communication, the near-field wireless communication, and the broad area communication are used in the present disclosure. Accordingly, the processing relating to each step is executed by the CPU 111 or the like in practice. The same is true in the following arrow charts.

Although the description was made of a case in which the mobile terminal 41 holds the unique key in the example described above with reference to FIG. 6, there is also a case in which the mobile terminal 41 does not hold a unique key. In such a case, it is possible to confirm the identity of the evaluator as shown in FIG. 8, for example.

Figure 8:
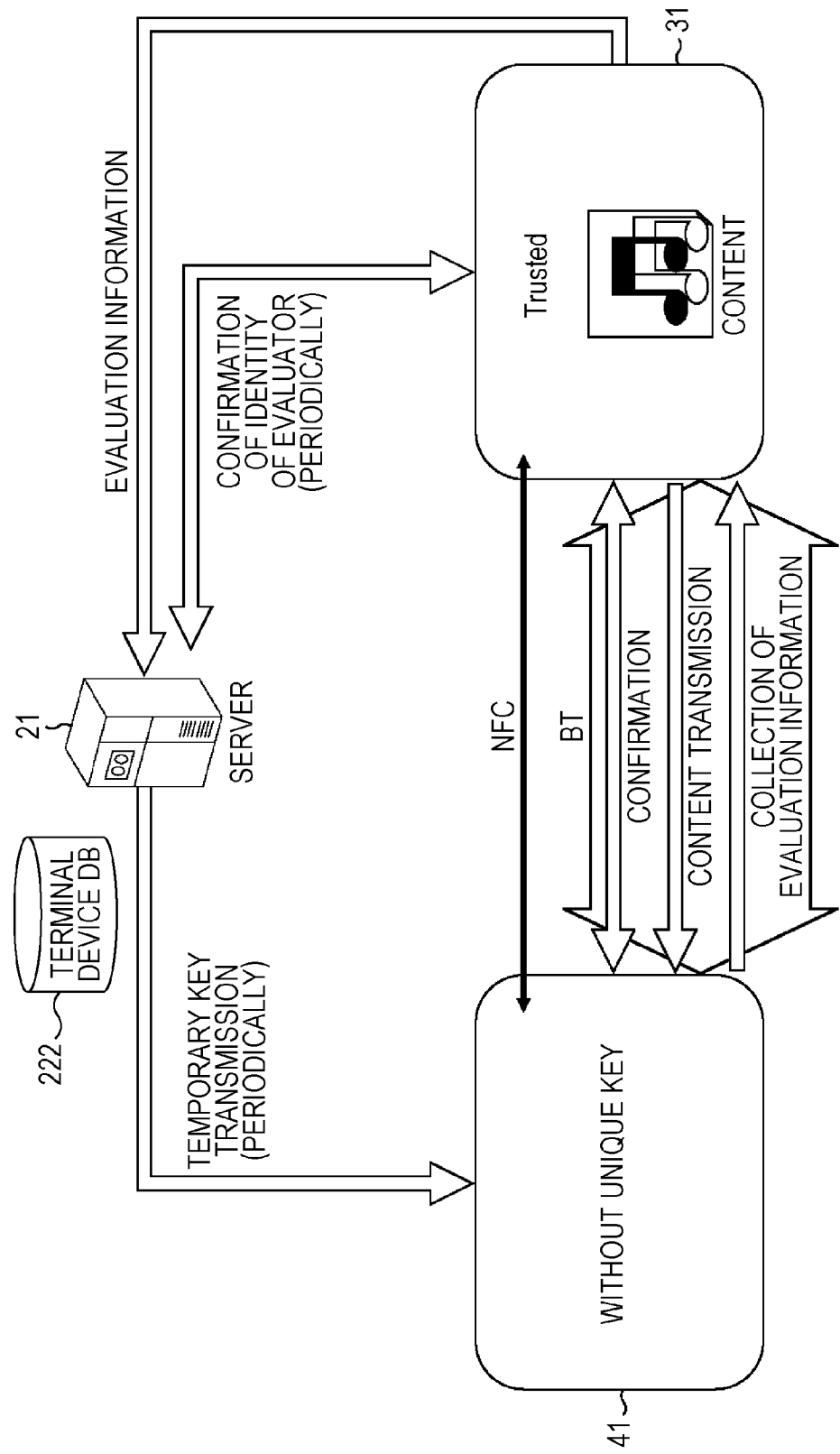
FIG. 8 is a diagram illustrating another example of a scheme in which link authentication is performed to collect evaluation information.

FIG. 8 is a diagram illustrating another example of a scheme in which the link authentication is performed to collect the evaluation information in the evaluation information collecting system 10. The drawing shows a case in which the handover is performed between the information collecting terminal 31 and the mobile terminal 41, a part of the content data is transmitted via the near-field wireless communication (BT) after the non-contact communication (NFC communication), and the streaming reproduction is performed. In the case of the example of FIG. 8, the mobile terminal 41 does not hold a unique key unlike the case of FIG. 6.

In the case of the example of FIG. 8, the information collecting terminal 31 notifies the server 21 of the handover between the information collecting terminal 31 and the mobile terminal 41 via the broad area communication. At this time, the identification number of the information collecting terminal 31 and the identification number of the mobile terminal 41 are also transmitted to the server 21. Then, the server 21 generates random number and confirms that the mobile terminal 41 does not hold a unique key. It is possible to confirm that the mobile terminal 41 does not hold a unique key, by searching for the terminal device database 222 with the use of the identification number of the mobile terminal 41.

The server 21 transmits the random number to the broad area communication address of the mobile terminal 41 as a temporary key. In addition, it is possible to obtain the broad area communication address of the mobile terminal by searching for the mobile device database 222 with the use of the identification number of the mobile terminal 41.

The server 21 transmits the confirmation request to the broad area address of the information collecting terminal 31, and the information collecting terminal 31 delivers the confirmation request to the mobile terminal 41 via the near-field wireless communication.

The mobile terminal 41 transmits the temporary key as the response to the confirmation request to the information collecting terminal 31 via the near-field wireless communication, and the information collecting terminal 31 delivers the response to the server 21 via the broad band communication.

The server 21 compares the temporary key transmitted from the information collecting terminal 31 with the random number generated by the information collecting terminal 31 and confirms that the near-field wireless communication with the evaluator at the time of the handover is being performed when both are coincident. That is, it is possible to confirm the identity of the evaluator.

Thereafter, a part of the content data is transmitted from the information collecting terminal 31 via the near-field wireless communication, and the mobile terminal 41 performs the streaming reproduction of the content. At this time, the mobile terminal 41 transmits the evaluation information to the information collecting terminal 31.

While the content data and the evaluation information are transmitted via the near-field wireless communication between the information collecting terminal 31 and the mobile terminal 41 as described above, the server continuously (periodically) confirms the identity of the evaluator as described above at a constant cycle, for example.

Then, the evaluation information accumulated in the information collecting terminal 31 is transmitted to the server 21 via the broad area communication.

In so doing, the link authentication is performed, and the evaluation information is collected in the evaluation information collecting system 10 even when the mobile terminal 41 does not hold the unique key.

Figure 9:
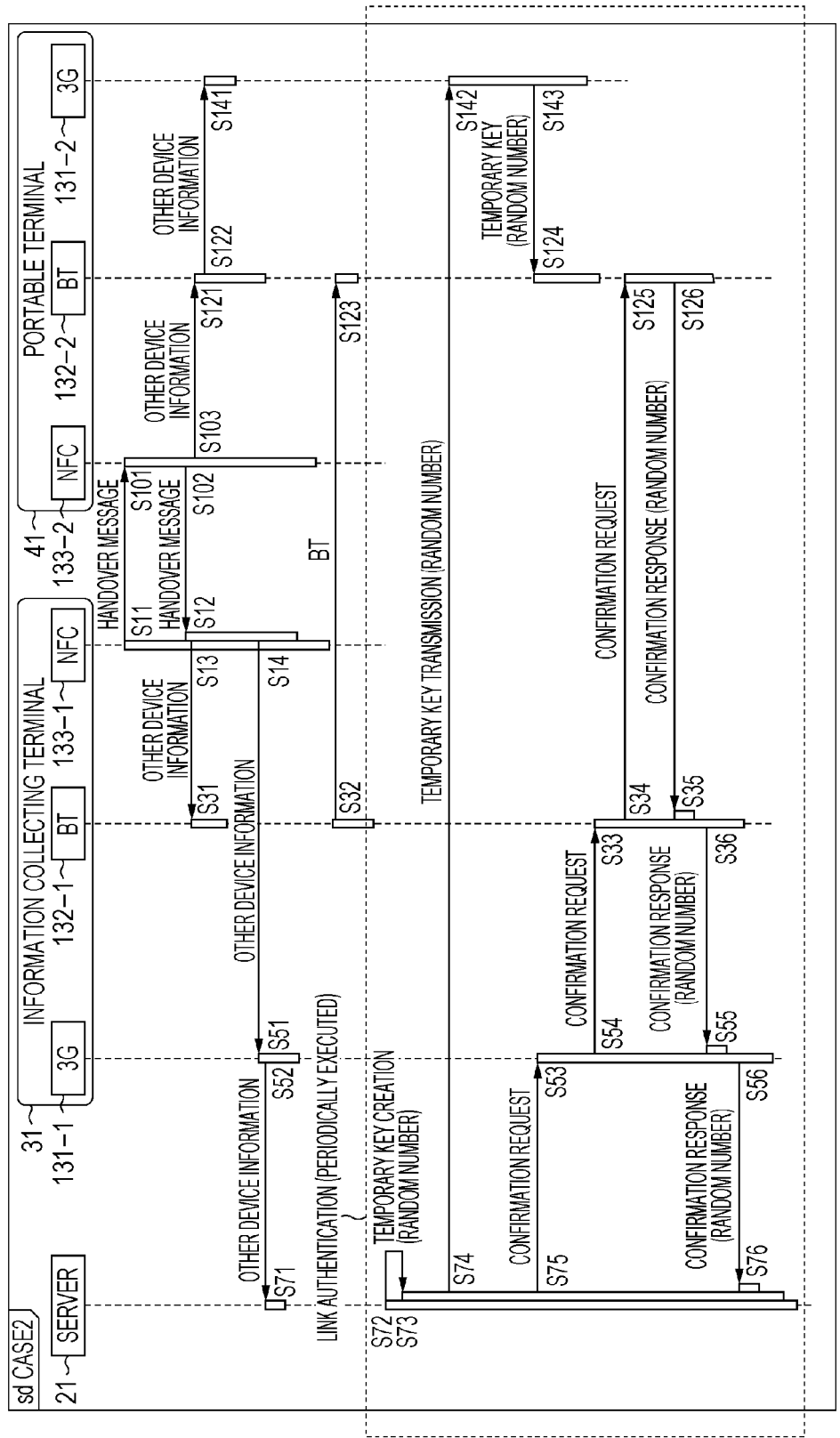
FIG. 9 is an arrow chart illustrating a flow of processing based on the scheme of FIG. 8.

FIG. 9 is an arrow chart illustrating a flow of processing of performing the aforementioned link authentication with reference to FIG. 8 to collect the evaluation information.

The NFC133-1 of the information collecting terminal 31 transmits the handover message in Step S11, and the NFC133-2 of the mobile terminal 41 receives the handover message in Step S101.

The NFC133-2 transmits the handover message in Step S102, and the NFC133-1 receives the handover message in Step S12.

By the above processing, the other device information is exchanged between the information collecting terminal 31 and the mobile terminal 41. In addition, the other device information is the information such as the identification number of the device as the counterpart of the handover, the near-field wireless communication address, and the like. In addition, the other device information includes the broad area communication address of the server 21, if necessary.

The NFC133-1 notifies the BT132-1 of the other device information in Step S13, and the BT132-1 receives the other device information in Step S31. In addition, the NFC133-2 notifies the BT132-2 of the other device information in Step S103, and the BT132-2 receives the other device information in Step S121.

The BT132-2 notifies the 3G131-2 of the other device information, which has been obtained in Step S121, in Step S122, and the 3G131-2 receives the other device information in Step S141. In addition, the processing of Steps S122 and S141 may be omitted.

The NFC133-1 notifies the 3G131-1 of the other device information in Step S14, and the 3G131-1 receives the other device information in Step S51.

The 3G131-1 notifies the server 21 of the handover by transmitting the information including the other device information to the server 21 in Step S52, and the server 21 obtains the handover in Step S71. When the server 21 is notified of the handover, not only the other device information of the counterpart of the handover but also the other device information of its own (in this case, the information collecting terminal 31) is transmitted.

The BT132-1 transmits the BT connection request to the BT132-2 in Step S32, and the BT132-2 receives the BT connection request in Step S123.

The server 21 generates a random number in Steps S72 and S73 as a temporary key. The server 21 transmits the temporary key obtained in the processing of Step S73 in Step S74, and the 3G131-2 receives the temporary key in Step S142.

The 3G131-2 notifies the BT312-2 of the temporary key, which has been received in Step S142, in Step S143, and the BT312-2 receives the temporary key in Step S124.

The server 21 transmits the confirmation request in Step S75, and the 3G131-1 receives the confirmation request in Step S53.

The 3G131-1 notifies the BT132-1 of the confirmation request, which has been received in Step S53, in Step S54, and the BT132-1 obtains the confirmation request in Step S33.

The BT132-1 transmits the confirmation request, which has been obtained in Step S33, in Step S34, and the BT132-2 receives the confirmation request in Step S125.

The BT132-2 transmits the temporary key, which has been obtained in Step S124, as the response to the confirmation request, which has been received in Step S125, in Step S126, and the BT132-1 receives the temporary key in Step S35.

The BT132-1 notifies the 3G131-1 of the confirmation response, which has been received in Step S35, in Step S36, and the 3G131-1 obtains the confirmation response in Step S55.

The 3G131-1 transmits the confirmation response, which has been obtained in Step S55, in Step S56, and the server 21 receives the confirmation response in Step S76.

Although the content data and the operation information as the evaluation are transmitted or received thereafter, such processing is the same as that in the case described above with reference to FIG. 7, and therefore, the detailed description thereof will be omitted.

The processing in the part surrounded by a dotted line in the drawing is periodically executed as the processing for confirming the identity of the evaluator.

As described above, the processing of performing the link authentication to collect the evaluation information is executed.

Incidentally, in the example described above with reference to FIG. 6 and the example described above with reference to FIG. 8, the link authentication is performed based on the information obtained only from the information collecting terminal 31. However, such scheme does not effectively function in some cases when there is no sufficiently confidential relationship between the business operator of collecting evaluation information or the like who administers the server 21 and the content provider which administers the information collecting terminal 31. In order to represent that the content provider which administers the information collecting terminal 31 is worthy of trust, the description of "Trusted" is added to the information collecting terminal 31 in FIGS. 6 and 8.

For example, when the content provider is not worthy of trust, it is not possible to believe that the random number decoded and obtained by the mobile terminal 41 and the temporary key received by the mobile terminal 41 via the broad area communication have been transmitted as they are to the server 21. That is, it is difficult to deny the possibility that the information collecting terminal 31 has faked the confirmation response transmitted in Step S56 of FIG. 7 and in Step S56 of FIG. 9.

For this reason, the confirmation of the identity of the evaluator based on the information transmitted from the provider side is not enough, and it is necessary to further confirm the identity of the provider based on the information transmitted from the evaluator side when there is no sufficiently confidential relationship between the business operator of collecting evaluation information or the like and the content provider. That is, it is difficult to deny the possibility that the provider pretends to be the evaluator, for example, and therefore, it is necessary to confirm that the provider and the evaluator are continuously performing the near-field wireless communication at the time of the handover from both the provider side and the evaluator side.

Figure 10:
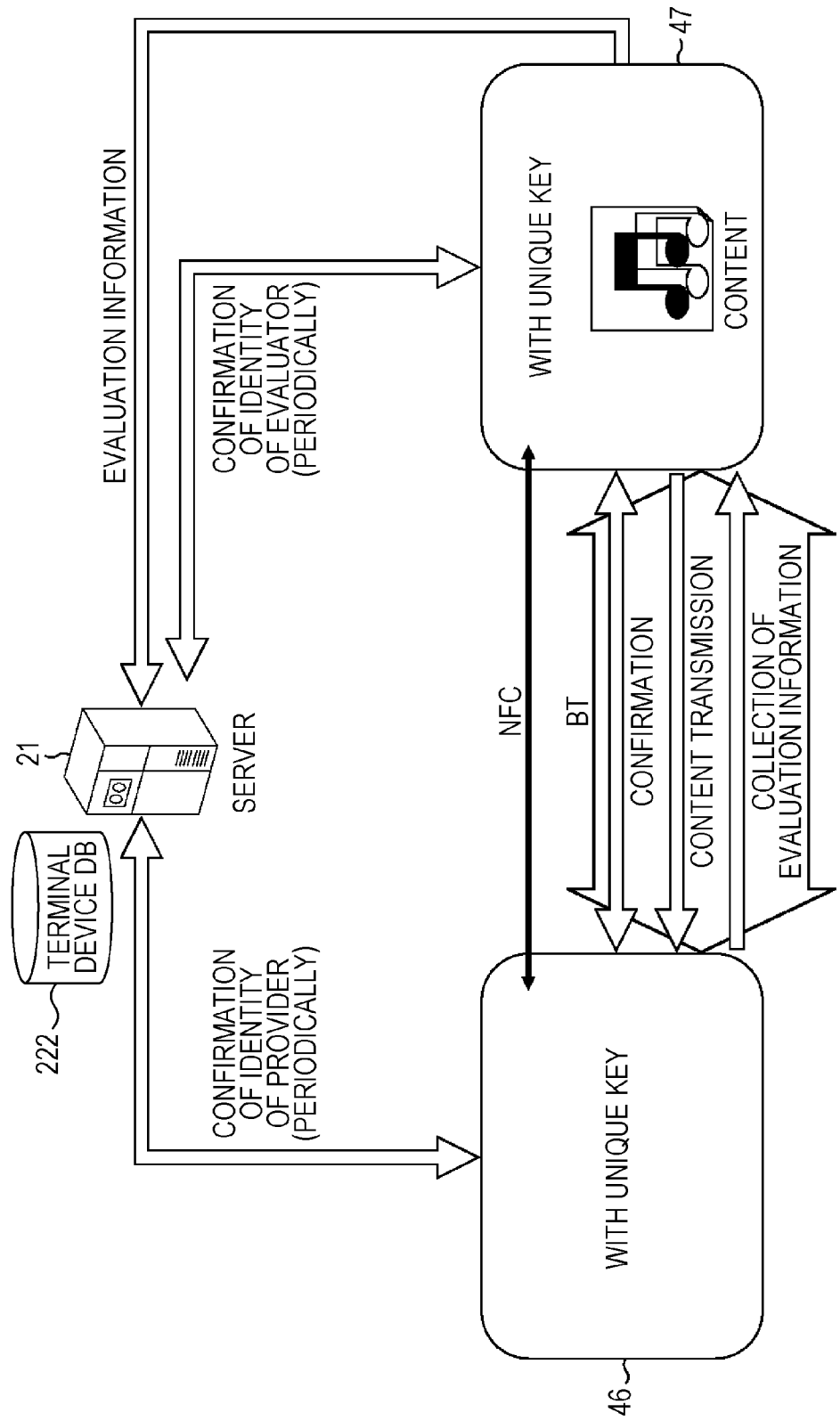
FIG. 10 is a diagram illustrating still another example of a scheme in which link authentication is performed to collect evaluation information.

FIG. 10 is a diagram illustrating still another example of a scheme in which link authentication is performed to collect evaluation information in the evaluation information collecting system 10. The drawing shows an example in which the handover is performed between the mobile terminal 47 and the mobile terminal 46 and the content (a game, for example) data is transmitted via the near-field wireless communication (BT) after the non-contact communication (NFC communication).

In the case of the example in FIG. 10, the description of "Trusted" is not added to the mobile terminal 47 as a content provider unlike the case of FIG. 6 or 8. That is, there is no sufficiently confidential relationship between the business operator of collecting evaluation information or the like and the content provider in the case of the example in FIG. 10. In the example of the drawing, both the mobile terminal 46 and the mobile terminal 47 hold unique keys.

In the example of FIG. 10, the mobile terminal 47 notifies the server 21 of the handover between the mobile terminal 47 and the mobile terminal 46 via the broad area communication. At this time, the identification numbers of the mobile terminal 47 and the mobile terminals 46 are also transmitted to the server 21. Then, the server 21 generates a random number and encrypts the random number using the unique key of the mobile terminal 46. In addition, the unique key of the mobile terminal 46 can be obtained by searching for the terminal device database 222 with the use of the identification number of the mobile terminal 46.

The server 21 transmits the random number which has been encrypted (referred to as an encrypted random number) to the broad area communication address of the mobile terminal 47. The broad area communication address of the mobile terminal 47 can be obtained by searching for the terminal device database 222 using the identification number of the mobile terminal 47.

The mobile terminal 47 transmits the encrypted random number, which has been transmitted from the server 21, to the mobile terminal 46 via the near-field wireless communication.

The mobile terminal 46 decodes the encrypted random number with its own unique key to obtain the random number. Then, the mobile terminal 46 transmits the random number to the mobile terminal 47 via the near-field wireless communication.

The mobile terminal 46 transmits the random number, which has been transmitted from the mobile terminal 46, to the server 21 via the broad area communication.

The server 21 compares the random number transmitted from the mobile terminal 47 with the random number generated by its own and confirms that the near-field wireless communication with the evaluator at the time of the handover is being performed when both are coincident. That is, it is possible to confirm the identity of the evaluator based on the information transmitted from the side of the provider.

The server 21 generates another random number and encrypts the random number with the use of the unique key of the mobile terminal 47. In addition, it is possible to obtain the unique key of the mobile terminal by searching for the terminal device database 222 with the use of the identification number of the mobile terminal 47.

The server 21 transmits the random number which has been encrypted (referred to as an encrypted random number) to the broad area communication address of the mobile terminal 46. In addition, it is possible to obtain the broad area communication address of the mobile terminal 46 by searching for the terminal device database 222 with the use of the identification number of the mobile terminal 46.

The mobile terminal 46 transmits the encrypted random number, which has been transmitted from the server 21, to the mobile terminal 47 via the near-field wireless communication.

The mobile terminal 46 decodes the encrypted random number with its own unique key to obtain the random number. Then, the mobile terminal 47 transmits the random number to the mobile terminal 46 via the near-field wireless communication.

The mobile terminal 47 transmits the random number, which has been transmitted from the mobile terminal 47, to the server 21 via the broad area communication.

The server 21 compares the random number transmitted from the mobile terminal 46 with the random number generated by its own and confirm that the near-field wireless communication with the provider at the time of the handover is being performed when both are coincident. That is, it is possible to confirm the identity of the evaluator based on the information transmitted from the side of the evaluator.

Thereafter, the content data is transmitted from the mobile terminal 47 via the near-field wireless communication, and a game screen or the like is displayed by the mobile terminal 46. The mobile terminal 46 transmits the evaluation information to the mobile terminal 47 at this time.

While the content data and the evaluation information are transmitted via the near-field wireless communication between the mobile terminal 47 and the mobile terminal 46 as described above, the server 21 continuously (periodically) confirms the identity of the evaluator and the identity of the provider at a constant cycle as described above.

Then, the evaluation information accumulated in the mobile terminal 47 is transmitted to the server 21 via the broad area communication.

In so doing, the link authentication is performed to collect the evaluation information in the evaluation information collecting system 10 even in the case where there is no sufficiently confidential relationship between the business operator of collecting evaluation information or the like and the provider of the content.

Figure 11:
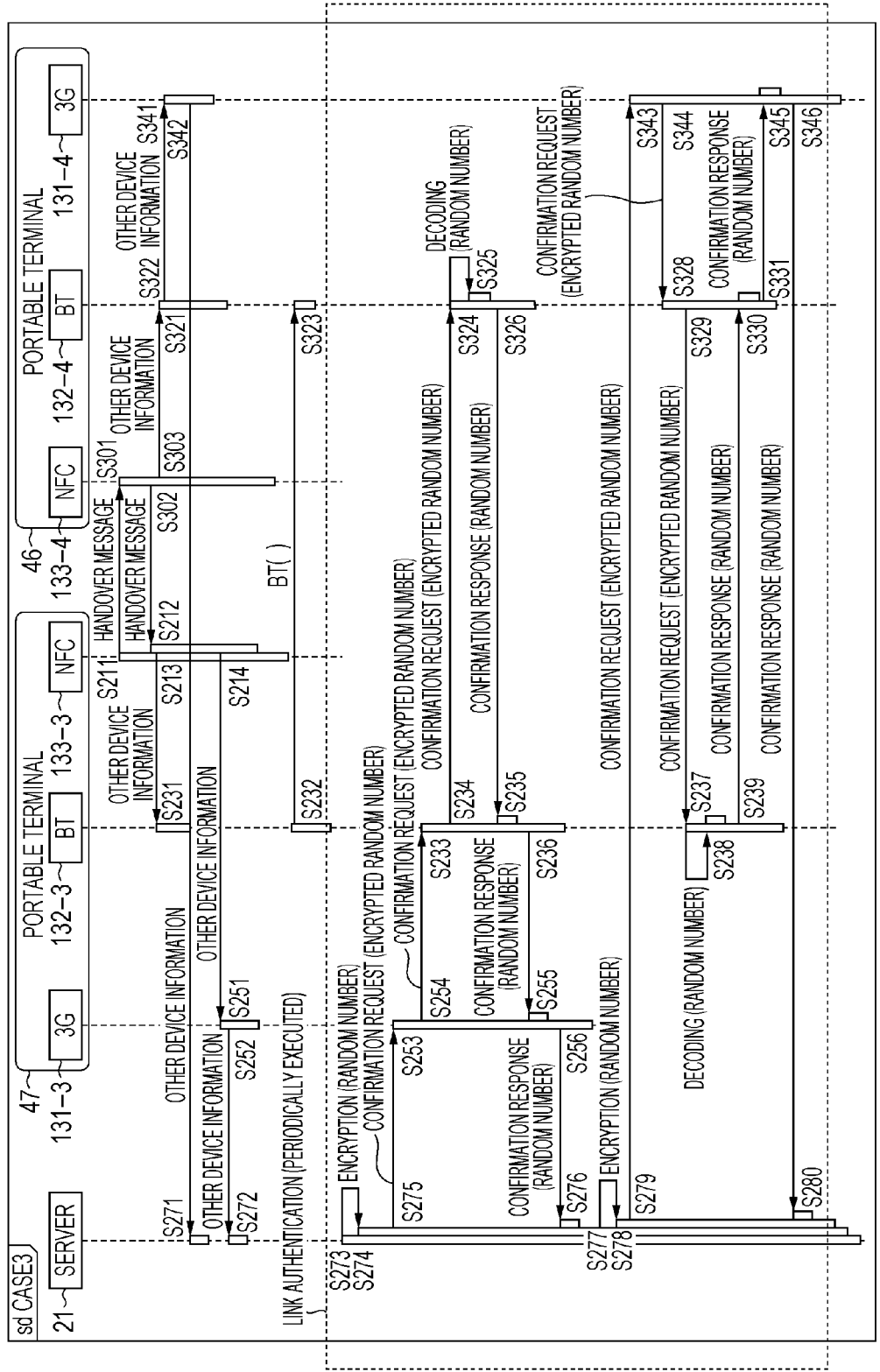
FIG. 11 is an arrow chart illustrating a flow of processing based on the scheme of FIG. 10.

FIG. 11 is an arrow chart illustrating a flow of processing of performing the aforementioned link authentication to collect the evaluation information with reference to FIG. 10.

In the drawing, the mobile communication wireless communication unit 131 of the mobile terminal 47 is expressed as 3G131-3, and the mobile communication wireless communication unit 131 of the mobile terminal 46 is expressed as 3G131-4. In addition, the near field communication unit 132 of the mobile terminal 47 is expressed as BT132-3, and the near field communication unit 132 of the mobile terminal 46 is expressed as BT132-4. Furthermore, the non-contact communication unit 133 of the mobile terminal 47 is expressed as NFC133-3, and the non-contact communication unit 133 of the mobile terminal 46 is expressed as NFC133-4.

The NFC133-3 of the mobile terminal 47 transmits the handover message in Step S211, and the NFC133-4 of the mobile terminal 46 receives the handover message.

The NFC133-4 transmits the handover message in Step S302, and the NFC133-3 receives the handover message in Step S212.

By the above processing, the other device information is exchanged between the mobile terminal 47 and the mobile terminal 46. In addition, the other device information is the information such as the identification number of the device as the counterpart of the handover, the near-field wireless communication address, and the like. In addition, the other device information includes the broad area communication address of the server 21, if necessary.

The NFC133-3 notifies the BT132-3 of the other device information in Step S213, and the BT132-3 receives the other device information in Step S231. In addition, the NFC133-4 notifies the BT132-4 of the other device information in Step S303, and the BT132-4 receives the other device information in Step S321. The BT132-4 notifies the 3G131-4 of the other device information, which has been obtained in Step S321, in Step S322, and the 3G131-4 receives the other device information in Step S341. In practice, the notification of the other device information and other information is performed via the CPU 111. The same is true in the following description.

The 3G131-4 performs the notification of the handover by transmitting the information including the other device information to the server 21 in Step S342, and the server 21 receives the notification in Step S271. In addition, the processing of Step S321, Step S341, and Step S342 may be omitted.

The NFC133-3 notifies the 3G131-3 of the other device information in Step S214, and the 3G131-3 receives the other device information in Step S251.

The 3G131-3 performs the notification of the handover by transmitting the information including the other device information to the server 21 in Step S252, and the server 21 receives the notification in Step S272. In addition, when the server 21 is notified of the handover, not only the other device information of the counterpart of the handover but also the other device information of its own (in this case, the mobile terminal 37) is transmitted.

The BT132-3 transmits a BT connection request to the BT132-4 in Step S232, and the BT132-4 receives the BT connection request in Step S323.

The server 21 generates a random number in Step S273 and encrypts the random number in Step S274. The server transmits the encrypted random number obtained in the processing of Step S274 as a confirmation request in Step S275, and the 3G131-3 receives the encrypted random number in Step S253.

The 3G131-3 notifies the BT132-3 of the confirmation request, which has been received in Step S253, in Step S254, and the BT132-3 receives this confirmation request in Step S233.

The BT132-3 transmits the confirmation request, which has been obtained in Step S233, in Step S234, and the BT132-4 receives the confirmation request in Step S234.

The BT132-4 decodes the encrypted random number as the confirmation request, which has been obtained in Step S324, to obtain the random number in Step S325. In addition, the CPU 111 decodes the encrypted random number in practice.

The BT132-4 transmits the random number, which has been obtained in the processing of Step S325, as the confirmation response in Step S326, and the BT132-3 receives the random number in Step S235.

The BT132-3 notifies the 3G131-3 of the confirmation response, which has been received in Step S35, in Step S236, and the 3G131-3 receives the confirmation response in Step S255.

The 3G131-3 transmits the confirmation response, which has been obtained in Step S255, in Step S256, and the server 21 receives the confirmation response in Step S276.

In addition, the server 21 generates another random number in Step S277 and encrypts the random number in Step S278. The server 21 transmits the encrypted random number, which has been obtained in the processing of Step S278, in Step S279, and the 3G131-4 receives the encrypted random number in Step S343.

The 3G131-4 notifies the BT132-4 of the confirmation request, which has been received in Step S343, in Step S344, and the BT132-4 receives the confirmation request in Step S328.

The BT132-4 transmits the confirmation request, which has been obtained in Step S328, in Step S329, and the BT132-3 receives the confirmation request in Step S237.

The BT132-3 decodes the encrypted random number of the confirmation request, which has been received in Step S237, to obtain the random number in Step S238.

The BT132-3 transmits the random number, which has been obtained in the processing of Step S238, as the confirmation response in Step S239, and the BT132-4 receives the random number in Step S330.

The BT132-4 notifies the 3G131-3 of the confirmation response, which has been received in Step S330, in Step S331, and the 3G131-3 receives the confirmation response in Step S345.

The 3G131-4 transmits the confirmation response, which has been obtained in Step S345, in Step S346, and the server 21 receives the confirmation response in Step S280.

Thereafter, the content data and the operation information as the evaluation information will be transmitted and received. Since such processing is the same as that in the case described above with reference to FIG. 7, the detailed description thereof will be omitted.

The processing in the part surrounded by the dotted line in the drawing is periodically executed as the processing for confirming the identity of the evaluator and the identity of the provider.

As described above, the processing of performing the link authentication to collect the evaluation information is executed.

In the example described above with reference to FIG. 10, the description was given of a case in which the mobile terminal 46 holds a unique key. However, the mobile terminal 46 may not hold a unique key in some cases. In such a case, it is possible to confirm the identity of the evaluator and the identity of the provider as shown in FIG. 12, for example.

Figure 12:
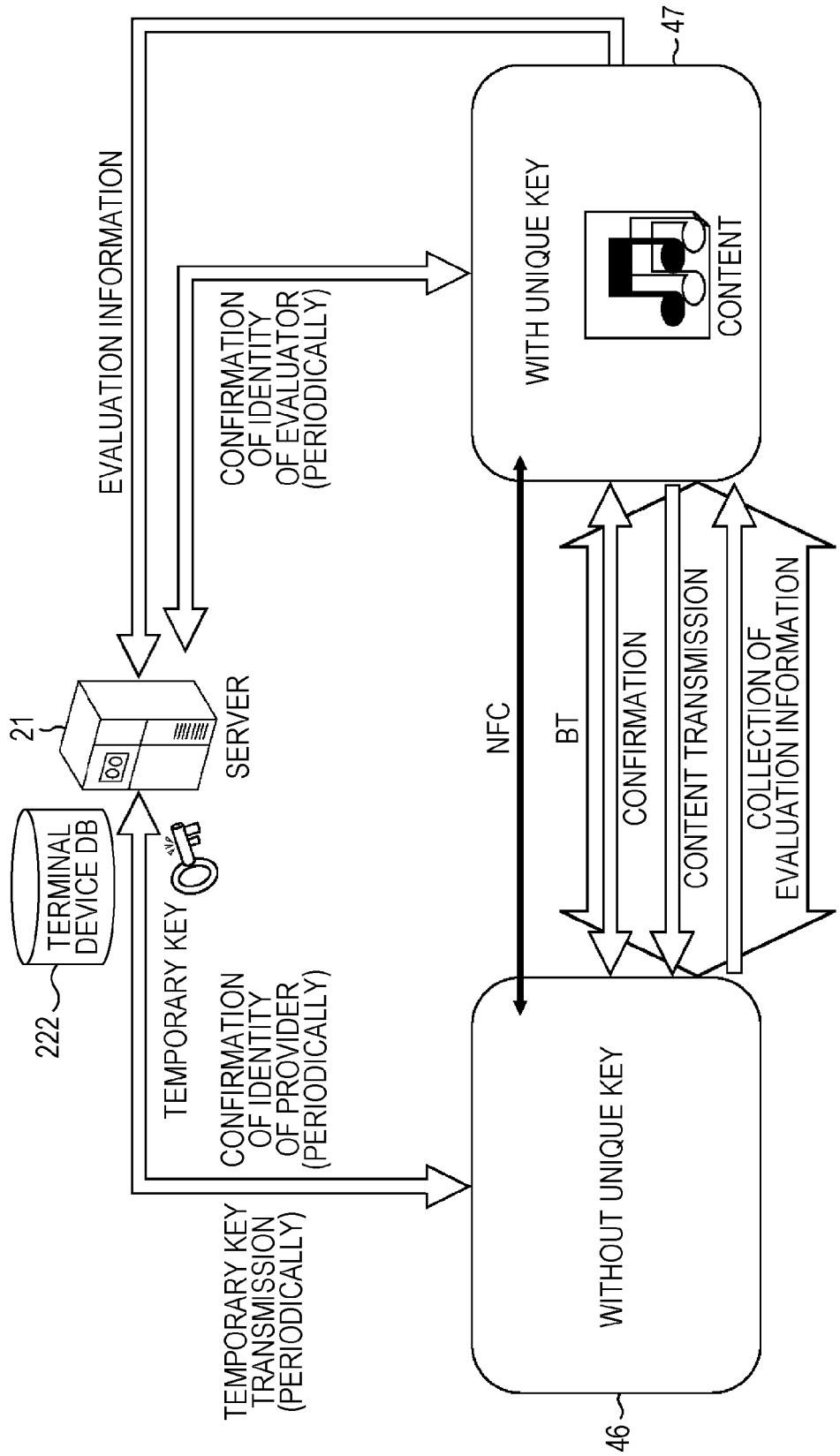
FIG. 12 is a diagram illustrating still another example of a scheme in which link authentication is performed to collect evaluation information.

FIG. 12 is a diagram illustrating still another example of a scheme in which link authentication is performed to collect evaluation information in the evaluation information collecting system 10. The example in the drawing shows a case in which the handover is performed between the mobile terminal 47 and the mobile terminal 46 and the content (for example, a game) data is transmitted via the near-field wireless communication (BT) after the non-contact communication (NFC communication).

In the case of the example in FIG. 12, the expression "Trusted" is not added to the mobile terminal 47 as the content provider in the same manner as in the case of FIG. 10, and there is no sufficiently confidential relationship between the business operator of collecting evaluation information or the like and the content provider. In addition, the example shown in the drawing is different from the case of FIG. 10 in that the mobile terminal 47 holds a unique key while the mobile terminal 46 does not hold a unique key.

In FIG. 12, the mobile terminal 47 notifies the server 21 of the handover between the mobile terminal 47 and the mobile terminal 46 via the broad area communication. At this time, the identification numbers of the mobile terminal and the mobile terminal 46 are also transmitted to the server 21. Then, the server 21 generates a random number and confirms that the mobile terminal 46 does not hold a unique key. In addition, it is possible to confirm that the mobile terminal 46 does not hold a unique key by searching for the terminal device database 222 with the use of the identification number of the mobile terminal 46.

The server 21 transmits the random number as a temporary key to the broad area communication address of the mobile terminal 46. In addition, the broad area communication address of the mobile terminal 46 can be obtained by searching for the terminal device database 222 with the use of the identification number of the mobile terminal 46.

The server 21 transmits a confirmation request to the broad area address of the mobile terminal 47, and the mobile terminal 47 delivers the confirmation request to the mobile terminal 46 via the near-field wireless communication. In addition, the broad area communication address of the mobile terminal 47 can be obtained by searching for the terminal device database 222 with the use of the identification number of the mobile terminal 47.

The mobile terminal 46 transmits the temporary key as a response to the confirmation request to the mobile terminal 47 via the near-field wireless communication, and the mobile terminal 47 delivers the response to the server 21 via the broad area communication.

The server 21 compares the temporary key transmitted from the mobile terminal 47 with the random number generated by its own and confirms that the near-field wireless communication with the evaluator at the time of the handover is being performed when both are coincident. That is, it is possible to confirm the identity of the evaluator based on the information transmitted from the side of the provider.

The server 21 generates another random number and encrypts the random number with the use of the unique key of the mobile terminal 47. In addition, the unique key of the mobile terminal 47 can be obtained by searching for the terminal device database 222 with the use of the identification number of the mobile terminal 47.

The server 21 transmits the random number which has been encrypted (referred to as an encrypted random number) to the broad area communication address of the mobile terminal 46. The broad area communication address of the mobile terminal 46 can be obtained by searching for the terminal device database 222 with the use of the identification number of the mobile terminal 46.

The mobile terminal 46 transmits the encrypted random number, which has been transmitted from the server 21, to the mobile terminal 47 via the near-field wireless communication.

The mobile terminal 47 decodes the encrypted random number with its own unique key to obtain the random number. Then, the mobile terminal 47 transmits the random number to the mobile terminal 46 via the near-field wireless communication.

The mobile terminal 46 transmits the random number, which has been transmitted from the mobile terminal 47, to the server 21 via the broad area communication.

The server 21 compares the random number transmitted from the mobile terminal 46 with the random number generated by its own and confirms that the near-field wireless communication with the provider at the time of the handover is being performed when both are coincident. That is, it is possible to confirm the identity of the provider based on the information transmitted from the side of the evaluator.

Thereafter, the mobile terminal 47 transmits the content data via the near-field wireless communication, and the game screen or the like is displayed by the mobile terminal 46. The mobile terminal 46 transmits the evaluation information to the mobile terminal 47 at this time.

While the content data and the evaluation information are transmitted via the near-field wireless communication between the mobile terminal 47 and the mobile terminal 46 as described above, the server 21 continuously (periodically) confirms the identity of the evaluator and the identity of the provider at a constant cycle, for example, as described above.

Then, the evaluation information accumulated in the mobile terminal 47 is transmitted to the server 21 via the broad area communication.

As described above, the link authentication is performed to collect the evaluation information in the evaluation information collecting system 10 even when there is no sufficiently confidential relationship between the business operator of collecting evaluation information or the like and the content provider and the evaluator side does not have a unique key.

The processing described above with reference to FIG. 12 is the combination of the processing described above with reference to FIG. 10 and the processing described above with reference to FIG. 8. Therefore, the detailed description with reference to the arrow chart will be omitted.

Moreover, both the mobile terminal 46 and the mobile terminal 47 do not hold unique keys in some cases. In such a case, it is possible to confirm the identity of the evaluator and the identity of the provider as shown in FIG. 13, for example.

Figure 13:
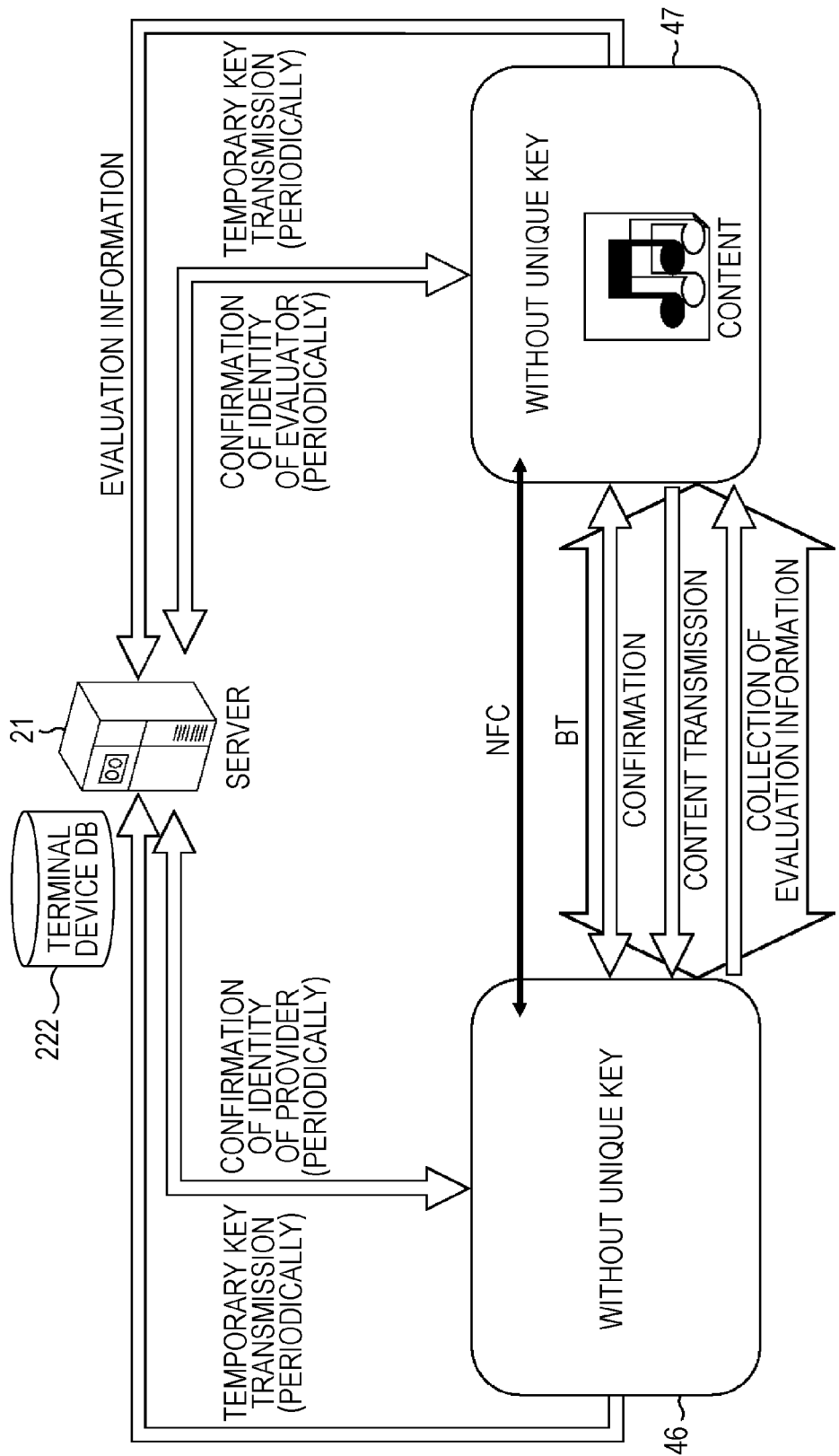
FIG. 13 is a diagram illustrating still another example of a scheme in which link authentication is performed to collect evaluation information.

FIG. 13 is a diagram illustrating still another example of a scheme in which link authentication is performed to collect evaluation information in the evaluation information collecting system 10. The example of the drawing shows a case in which the handover between the mobile terminal 47 and the mobile terminal 46 is performed and the content (for example, a game) data is transmitted via the near-field wireless communication (BT) after the non-contact communication (NFC communication).

In the case of the example in FIG. 13, the expression of "Trusted" is not added to the mobile terminal 47 as the content provider in the same manner as in the case of FIG. 10, and there is no sufficiently confidential relationship between the business operator of collecting evaluation information or the like and the content provider. In the example of the drawing, both the mobile terminal 47 and the mobile terminal 46 do not hold unique keys unlike the case of FIG. 12.

In FIG. 13, the mobile terminal 47 notifies the server 21 of the handover between the mobile terminal 47 and the mobile terminal 46 via the broad area communication. At this time, the identification numbers of the mobile terminals 47 and 46 are also transmitted to the server 21. Then, the server 21 generates a random number and confirms that the mobile terminal 46 does not hold a unique key. It is possible to confirm that the mobile terminal 46 does not hold a unique key by searching for the terminal device database 22 with the use of the identification number of the mobile terminal 46.

The server 21 transmits the random number as a temporary key to the broad area communication address of the mobile terminal 46. The broad area communication address of the mobile terminal 46 can be obtained by searching for the terminal device database 222 with the use of the identification number of the mobile terminal 46.

The server 21 transmits a confirmation request to the broad area address of the mobile terminal 47, and the mobile terminal 47 delivers the confirmation request to the mobile terminal 46 via the near-field wireless communication. In addition, the broad area communication address of the mobile terminal 47 can be obtained by searching for the terminal device database 222 with the use of the identification number of the mobile terminal 47.

The mobile terminal 46 transmits a temporary key as a response to the confirmation request to the mobile terminal 47 via the near-field wireless communication, and the mobile terminal 47 delivers the response to the server 21 via the broad area communication.

The server 21 compares the temporary key transmitted from the mobile terminal 47 with the random number generated by its own and confirms that the near-field wireless communication with the evaluator at the time of the handover is being performed when both are coincident. That is, it is possible to confirm the identity of the evaluator based on the information transmitted from the provider side.

In addition, the server 21 generates another random number and confirms that the mobile terminal 47 does not hold a unique key. It is possible to confirm that the mobile terminal 47 does not hold a unique key by searching for the terminal device database 222 with the use of the identification number of the mobile terminal 47.

The server 21 transmits the random number as a temporary key to the broad area communication address of the mobile terminal 47.

The server 21 transmits a confirmation request to the broad area address of the mobile terminal 46, and the mobile terminal 46 delivers the confirmation request to the mobile terminal 47 via the near-field wireless communication.

The mobile terminal 47 transmits the temporary key as a response to the confirmation request to the mobile terminal 46 via the near-field wireless communication, and the mobile terminal 46 delivers the response to the server 21 via the broad area communication.

The server 21 compares the temporary key transmitted from the mobile terminal 46 with the random number generated by its own and confirms that the near-field wireless communication with the provider at the time of the handover is being performed when both are coincident. That is, it is possible to confirm the identity of the provider based on the information transmitted from the evaluator side.

Thereafter, the mobile terminal 47 transmits the content data via the near-field wireless communication, and a game screen or the like is displayed by the mobile terminal 46. The mobile terminal 46 transmits the evaluation information to the mobile terminal 47 at this time.

While the content data and the evaluation information are transmitted via the near-field wireless communication between the mobile terminal 47 and the mobile terminal 46 as described above, the server 21 continuously (periodically) confirms the identity of the evaluator and the identity of the provider at a constant cycle, for example, as described above.

Then, the evaluation information accumulated in the mobile terminal 47 is transmitted to the server 21 via the broad area communication.

In so doing, the link authentication is performed to collect the evaluation information in the evaluation information collecting system 10 even when there is no sufficiently confidential relationship between the business operator of collecting evaluation information or the like and the content provider.

Since the processing described above with reference to FIG. 13 is also the combination of the aforementioned processing, the detailed description thereof with reference to the arrow chart will be omitted.

According to the present disclosure, it is possible to perform the link authentication and collect the evaluation information as described above, and it is also possible to obtain the evaluation information on a P2P network in which the content provider and the evaluator are dynamically changed, for example.

According to the present disclosure, it is possible to shorten the time from the showing of a product, content, or the like as the evaluation target to the collecting of the evaluation information as compared with the case in the related art, and it is also possible to provide timely evaluation information.

Moreover, it is not necessary to install a dedicated device such as a camera or the like to confirm that an evaluator is actually present, for example, and it is possible to realize an evaluation information collecting system with high reliability with a simple configuration.

As the conclusion of the examples described above with reference to FIGS. 6 to 13, it is considered that the following two points are to be taken into consideration when the link authentication is performed to collect the evaluation information in the evaluation information collecting system 10. The first point is whether or not there is a sufficiently confidential relationship between the business operator of collecting evaluation information or the like and the content provider, and the second point is whether or not the evaluator side and the provider side hold unique keys.

That is, when there is a sufficiently confidential relationship between the business operator of collecting evaluation information or the like and the content provider, it is possible to realize the link authentication by periodically confirming the identity of the evaluator based on the information transmitted from the provider side. On the other hand, when there is no sufficiently confidential relationship between the business operator of collecting evaluation information or the like and the content provider, it is possible to realize the link authentication by periodically confirming the identity of the evaluator based on the information transmitted from the provider side and by confirming the identity of the provider based on the information transmitted from the evaluator side.

When the mobile terminal of the evaluator holds a unique key, it is possible to confirm the identity of the evaluator based on the information transmitted from the provider side by transmitting a random number encrypted with the use of the unique key to the mobile terminal of the provider side. On the other hand, when the mobile terminal of the evaluator does not hold a unique key, it is possible to confirm the identity of the evaluator based on the information transmitted from the provider side by transmitting a temporary key to the mobile terminal or the like of the evaluator side and then transmitting a confirmation request to the mobile terminal or the like of the provider.

Similarly, when the mobile terminal or the like of the provider holds a unique key, it is possible to confirm the identity of the provider based on the information transmitted from the evaluator side by transmitting a random number encrypted with the use of the unique key to the mobile terminal of the evaluator side. On the other hand, when the mobile terminal or the like of the provider does not hold a unique key, it is possible to confirm the identity of the provider based on the information transmitted from the evaluator side by transmitting a temporary key to the mobile terminal or the like of the provider side and then transmitting a confirmation request to the mobile terminal or the like of the evaluator.

As described above, the collection of the evaluation information by performing the link authentication is realized based on the total of five types of schemes.

The present disclosure is for making it possible to collect the evaluation information by performing the link authentication regardless of the confidential relationship between the business operator of collecting evaluation information or the like and the content provider and regardless of the presence of the unique keys on the sides of the evaluator and the provider. For this reason, the handover message is made to include the following information.

Figure 14:
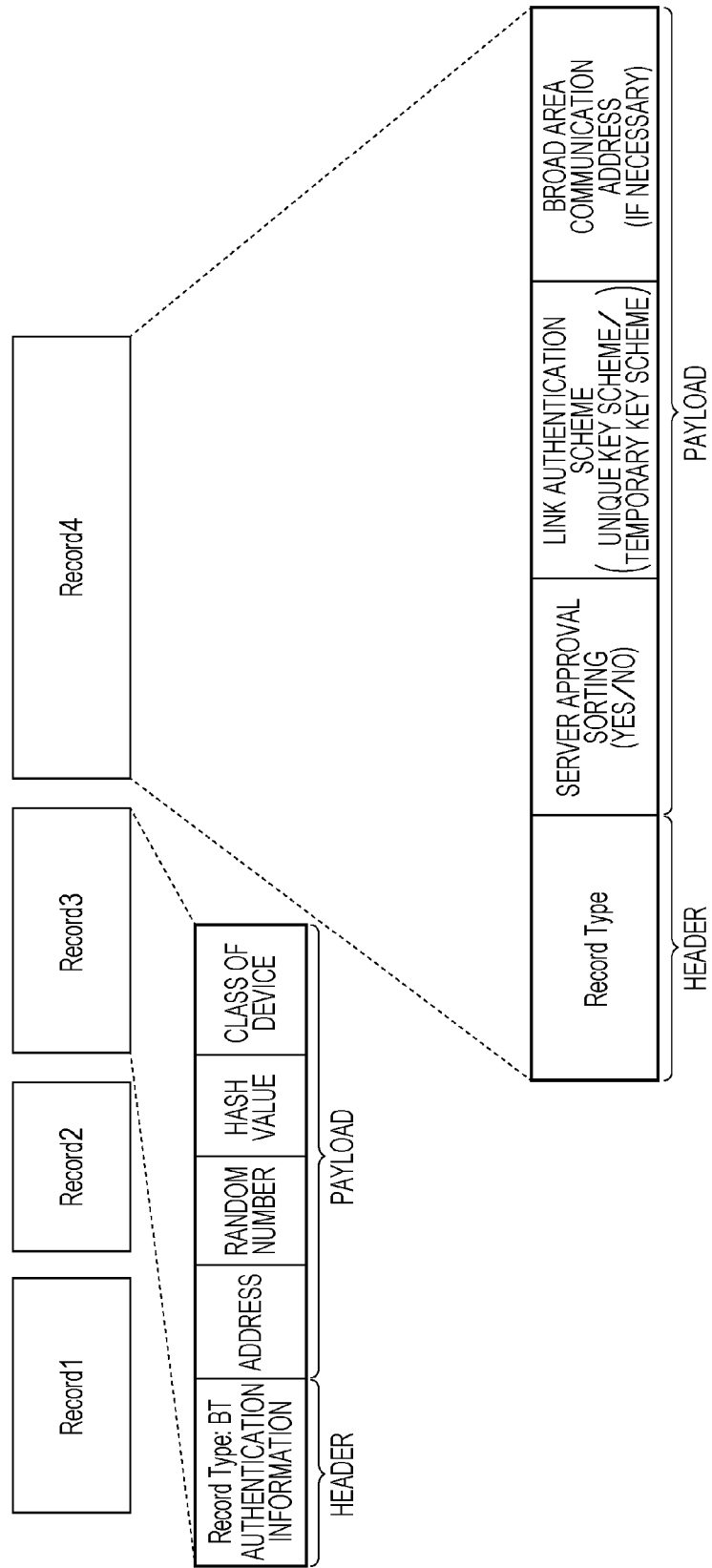
FIG. 14 is a diagram illustrating a handover message.

FIG. 14 is a diagram illustrating a format of a handover message. The handover message is the information transmitted and received when the mobile terminal or the information collecting terminal performs the non-contact communication (NFC), for example. The format of the handover message is standardized by NFC Forum, and the format shown in the drawing is defined by a standard of the NFC forum.

As shown in the drawing, the handover message is configured by a plurality of (four in this example) divided records.

The "Record 1" is a record in which information such as a handover request, selection, or the like is stored. The "Record 2" is a record in which second carrier candidates are stored, where the "ac (Alternative Carrier)" is stored as the Record Type at the header part and a pointer of each second carrier (identifier of the "Record 3") is stored in the payload part.

The "Record 3" is a record in which information relating to the near-field wireless communication mechanism is stored. As shown in the drawing, the storage of a packet including a header and a payload in the "Record 3" is defined by the standard of Bluetooth SIG. In addition, the packet shown in the drawing as the packet of the "Record 3" is the packet in the case where the near-field wireless communication mechanism performs the communication based on Bluetooth.

The "Record 4" is a record in which information defined by a manufacturer of the mobile terminal or the like is stored. In the present disclosure, the packet information shown in the drawing is defined as the information included in the "Record 4".

As shown in the drawing, a packet including a header and a payload is stored on the "Record 4".

The information regarding the "Record Type" is described in the header, and the information representing that the record 4 in this case is the record in which information used for collecting the evaluation information is stored is described.

The payload includes "server approval sorting", a "link authentication scheme", and a "broad area communication address".

In the "server approval sorting", the information representing whether or not the terminal device is the terminal device approved by the server 21 (Yes/No, for example) is described. The fact that the terminal device is the terminal device approved by the server 21 means that there is a sufficiently confidential relationship with the business operator of collecting evaluation information or the like.

In the "link authentication scheme", the information representing a scheme based on which the aforementioned confirmation of the identity of the evaluator or the confirmation of the identity of the provider is performed is described. Specifically, the information representing a scheme in which a random number is encrypted with the use of a unique key or a scheme in which a temporary key is transmitted in advance from the server 21 is described.

In the "broad area communication address", the broad area communication address of the device and the broad area communication address of the server 21 are described, if necessary.

According to the evaluation information collecting system 10 of the present disclosure, the handover message as shown in FIG. 14 is transmitted and received at the time of the handover. The information shown in FIG. 14 is transmitted as the other device information to the server 21 as well with the notification of the handover.

When the server 21 is notified of the handover from the information collecting terminal or the mobile terminal, the server 21 analyzes the information included in the "Record 4" in FIG. 14 and performs the link authentication. As described above, the collection of the evaluation information by performing the link authentication is realized based on the total of five types of schemes in the evaluation information collecting system 10 of the present disclosure.

The first scheme is employed when there is a sufficiently confidential relationship between the business operator of collecting evaluation information or the like and the provider and when the mobile terminal of the evaluator holds a unique key as described above with reference to FIG. 6. This is referred to as Case 1.

The second scheme is employed when there is a sufficiently confidential relationship between the business operator of collecting evaluation information or the like and the provider and when the mobile terminal of the evaluator does not hold a unique key as described above with reference to FIG. 8. This is referred to as Case 2.

The third scheme is employed when there is no sufficiently confidential relationship between the business operator of collecting evaluation information or the like and the provider and when both the mobile terminal of the evaluator and the mobile terminal of the provider hold unique keys as described above with reference to FIG. 10. This is referred to as Case 3.

The fourth scheme is employed when there is no sufficiently confidential relationship between the business operator of collecting evaluation information or the like and the provider and when the mobile terminal of the evaluator does not hold a unique key while the mobile terminal of the provider holds a unique key as described above with reference to FIG. 12. This is referred to as Case 4.

The fifth scheme is employed when there is no sufficiently confidential relationship between the business operator collecting evaluation information or the like and the provider and when both the mobile terminal of the evaluator and the mobile terminal of the provider do not hold unique keys as described above with reference to FIG. 13. This is referred to as Case 5.

When the server 21 is notified of the handover from the information collecting terminal or the mobile terminal, the server 21 analyzes the information included in the "Record 4" in FIG. 14, specifies the attribute of the provider side and the attribute of the evaluator side, and specifies the scheme of the link authentication as shown in FIG. 15.

That is, it is determined whether or not there is a sufficiently confidential relationship with the business operator of collecting evaluation information or the like based on the "server approval sorting" of the handover messages on the sides of the provider and the evaluator as shown in FIG. 15. In this example, the expression "Trusted" is added to the mobile terminal which has a sufficiently confidential relationship with the business operator of collecting evaluation information or the like (Yes in the "server approval sorting") while the expression of "Not Trusted" is added to the mobile terminal which does not have a confidential relationship (No in the "server approval sorting").

In addition, a scheme for confirming the identity of the evaluator and the identity of the provider based on the "server approval sorting" of the handover messages on the sides of the provider and the evaluator is specified. In this example, the scheme in which a random number is encrypted with the use of the unique key is described as the "unique key", and the scheme in which a temporary key is transmitted in advance from the server 21 is described as the "temporary key".

As described above, the server 21 specifies the scheme of the link authentication and performs the link authentication to collect the evaluation information.

Figure 16:
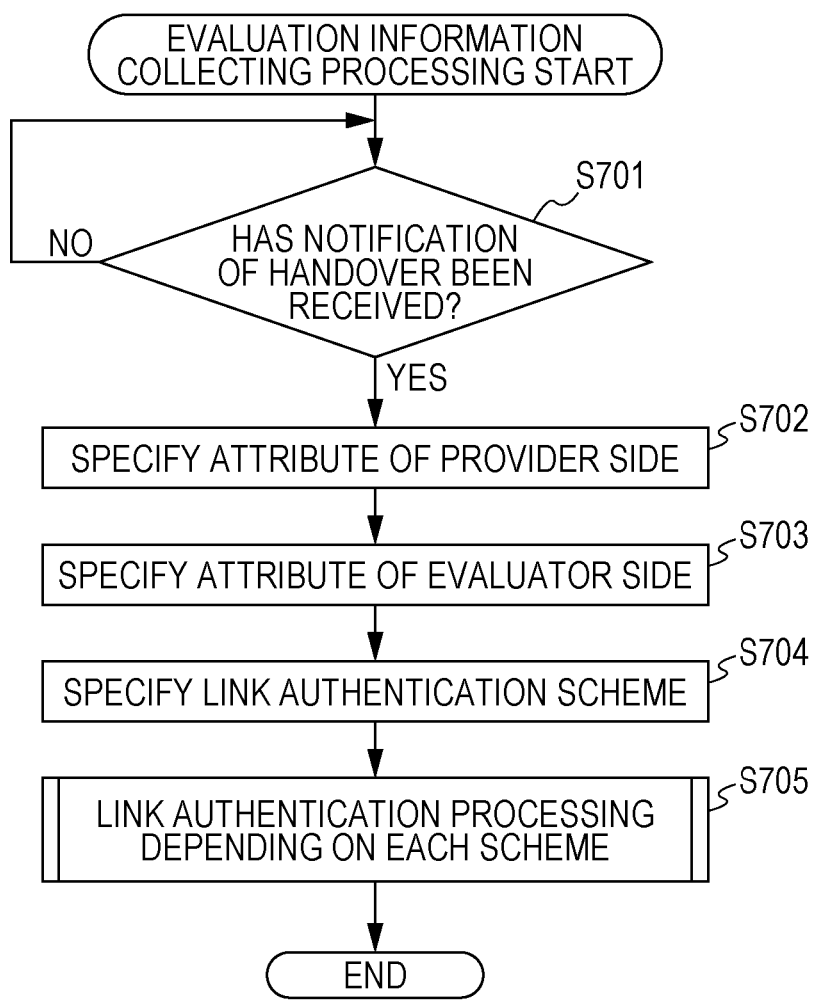
FIG. 16 is a flow chart illustrating an example of evaluation information collecting processing.

Next, description will be given of an example of the evaluation information collecting processing executed by the server 21 with reference to the flow chart in FIG. 16.

The CPU 201 of the server 21 determines whether or not the notification of the handover has been received from the information collecting terminal or the mobile terminal in Step S701 and waits for the determination that the notification of the handover has been received.

When it is determined that the notification of the handover has been received in Step S701, the processing proceeds to Step S702.

The CPU 201 obtains and analyzes the device information on the provider side, which has been transmitted with the notification of the handover, to specify the attribute of the provider side in Step S702. At this time, the information included in the "Record 4" in FIG. 14, for example, is analyzed, and the attribute of the provider side (the information collecting terminal 31, the mobile terminal 47, or the like, for example) is specified. That is, whether or not there is a sufficiently confidential relationship with the business operator of collecting evaluation information or the like and whether the scheme is a scheme in which a random number is encrypted with the use of a unique key or a scheme in which a temporary key is transmitted in advance from the server 21 are specified.

The CPU 201 obtains and analyzes the device information of the evaluator side, which has been transmitted from the notification of the handover, in Step S703 in the same manner as in the processing of Step S702 to specify the attribute of the evaluator side.

The CPU 201 specifies the scheme of the link authentication based on the attribute, which has been specified in Step S702 and Step S703, in Step S704. That is, the schemes of Case 1 to Case 5 are specified as described above with reference to FIG. 15.

The CPU 201 executes the link authentication processing depending on the scheme based on the link authentication scheme, which has been specified in Step S704, in Step S705. In so doing, the link authentication corresponding to each of Case 1 to Case 5 is performed.

Figure 17:
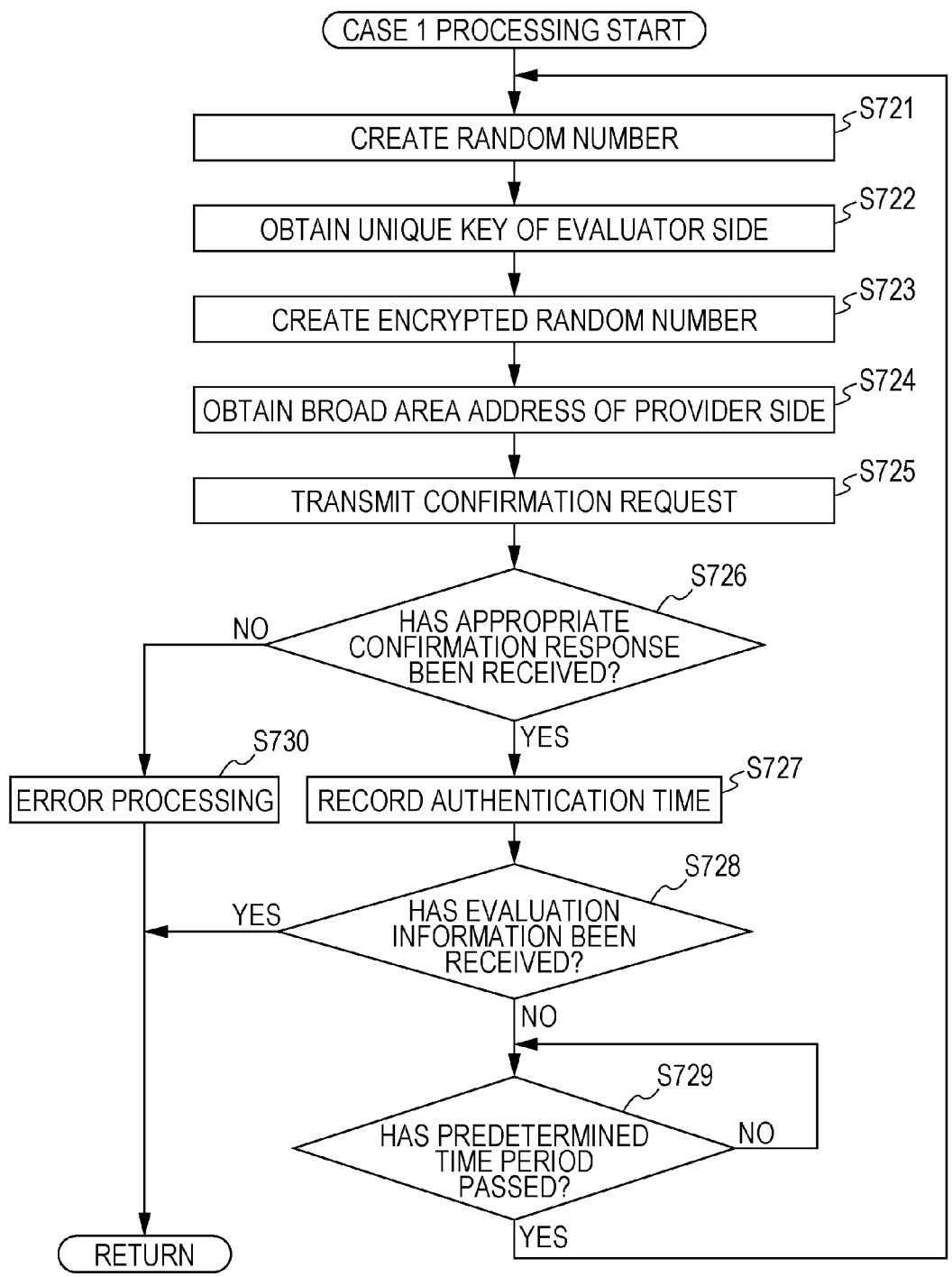
FIG. 17 is a flow chart illustrating an example of processing of Case 1.

FIG. 17 is a flow chart illustrating an example of processing of Case 1 executed as the processing of Step S705 when the link authentication scheme corresponds to Case 1 in Step S704.

The CPU 201 creates (generates) a random number in Step S721.

The CPU 201 obtains the unique key of the evaluator side by searching for the terminal device database 222 with the use of the identification number of the evaluator side (the mobile terminal 41, for example) in Step S722.

The CPU 201 encrypts the random number created in Step S721 with the use of the unique key, which has been obtained in Step S722, in Step S723.

The CPU 201 obtains the broad area communication address of the provider side by searching for the terminal device database 222 with the use of the identification number of the provider side (the information collecting terminal 31, for example) in Step S724.

The CPU 201 transmits the encrypted random number created in Step S723 as a confirmation request to the broad area address, which has been obtained in Step S724, in Step S725.

The CPU 201 determines whether or not an appropriate confirmation response, which is the response to the confirmation request transmitted in Step S725, has been received in Step S726. At this time, it is determined that the random number created in Step S721 is included in the confirmation request, and that an appropriate response has been received when the random number is included.

When it is determined in Step S726 that the appropriate confirmation response has been received, the processing proceeds to Step S727. On the other hand, when it is determined that the appropriate confirmation response has not been received, the processing proceeds to Step S730 to execute the error processing.

The CPU 201 records the time point at which the appropriate confirmation response was received as the authentication time of the link authentication in Step S727.

The CPU 201 determines in Step S728 whether or not the evaluation information has been transmitted from the provider side and moves on to Step S729 when it is determined that the evaluation information has not yet been transmitted.

The CPU 201 determines in Step S729 whether or not a predetermined time period has passed since the authentication time was recorded in Step S727 and waits for the determination that the predetermined time period has passed. When it is determined in Step S729 that the predetermined time period has passed, the processing returns to Step S721. In so doing, the identity of the evaluator is continuously (periodically) confirmed at a constant cycle.

On the other hand, when it is determined in Step S728 that the evaluation information has been transmitted from the provider side, the processing of Case 1 is completed.

As described above, the link authentication processing depending on the scheme in the case of Case 1 is executed.

Figure 18:
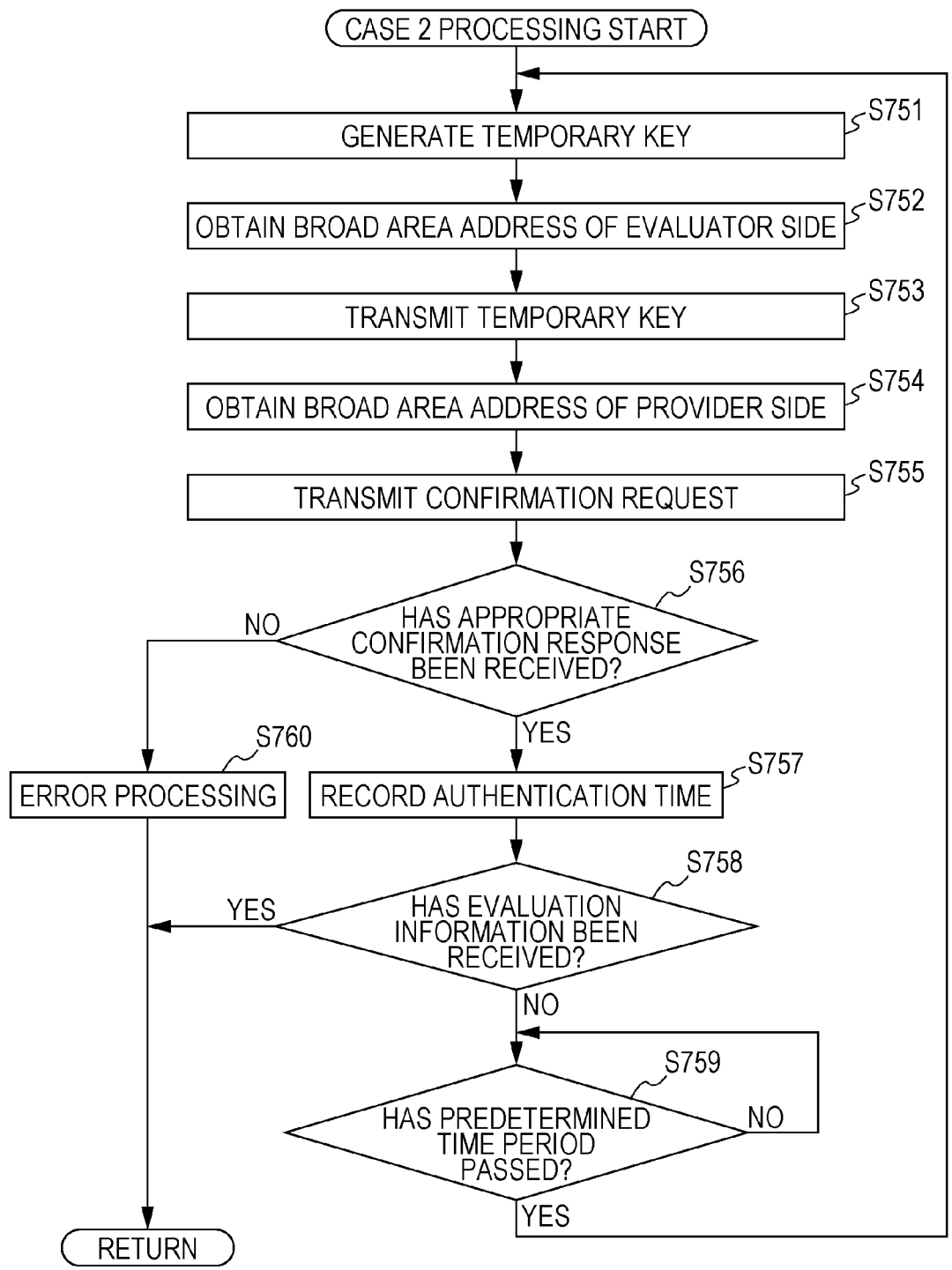
FIG. 18 is a flow chart illustrating an example of processing of Case 2.

FIG. 18 is a flow chart illustrating an example of processing of Case 2 executed as the processing of Step S705 when the link authentication scheme is specified to be Case 2 in Step S704.

The CPU 201 creates a temporary key in Step S751.

The CPU 201 obtains the broad area communication address of the evaluation side by searching for the terminal device database 222 with the use of the identification of the evaluation side (the mobile terminal 41, for example) in Step S752.

The CPU 201 transmits the temporary key created in Step S751 to the broad area address, which has been obtained in Step S752, in Step S753.

The CPU 201 obtains the broad area communication address of the provider side by searching for the terminal device database 222 with the use of the identification number of the provider side (the information collecting terminal 31, for example) in Step S754.

The CPU 201 transmits a confirmation request to the broad area address, which has been obtained in Step S754, in Step S755.

The CPU 201 determines whether or not an appropriate confirmation response, which is the response to the confirmation request transmitted in Step S755, has been received in Step S756. At this time, it is determined that the temporary key created in Step S751 is included in the confirmation response, and that the appropriate confirmation response has been received when the temporary key is included.

When it is determined in Step S756 that the appropriate confirmation response has been received, the processing proceeds to Step S757. On the other hand, when it is determined that the appropriate confirmation response has not been received, the processing proceeds to Step S760 to execute the error processing.

The CPU 201 records the time at which the appropriate confirmation response was received as the authentication time of the link authentication in Step S757.

The CPU 201 determines in Step S758 whether or not the evaluation information has been transmitted from the provider side and moves on to Step S759 when it is determined that the evaluation information has not yet been transmitted.

The CPU 201 determines in Step S759 whether or not a predetermined time period has passed since the authentication time was recorded in Step S757 and waits for the determination that the predetermined time has passed. When it is determined in Step S759 that the predetermined time has passed, the processing returns to Step S751. In so doing, the identity of the evaluator is continuously (periodically) confirmed at a constant cycle.

On the other hand, when it is determined in Step S758 that the evaluation information has been transmitted from the provider side, the processing of Case 2 is completed.

As described above, the link authentication processing depending on the scheme in the case of Case 2 is executed.

Figure 19:
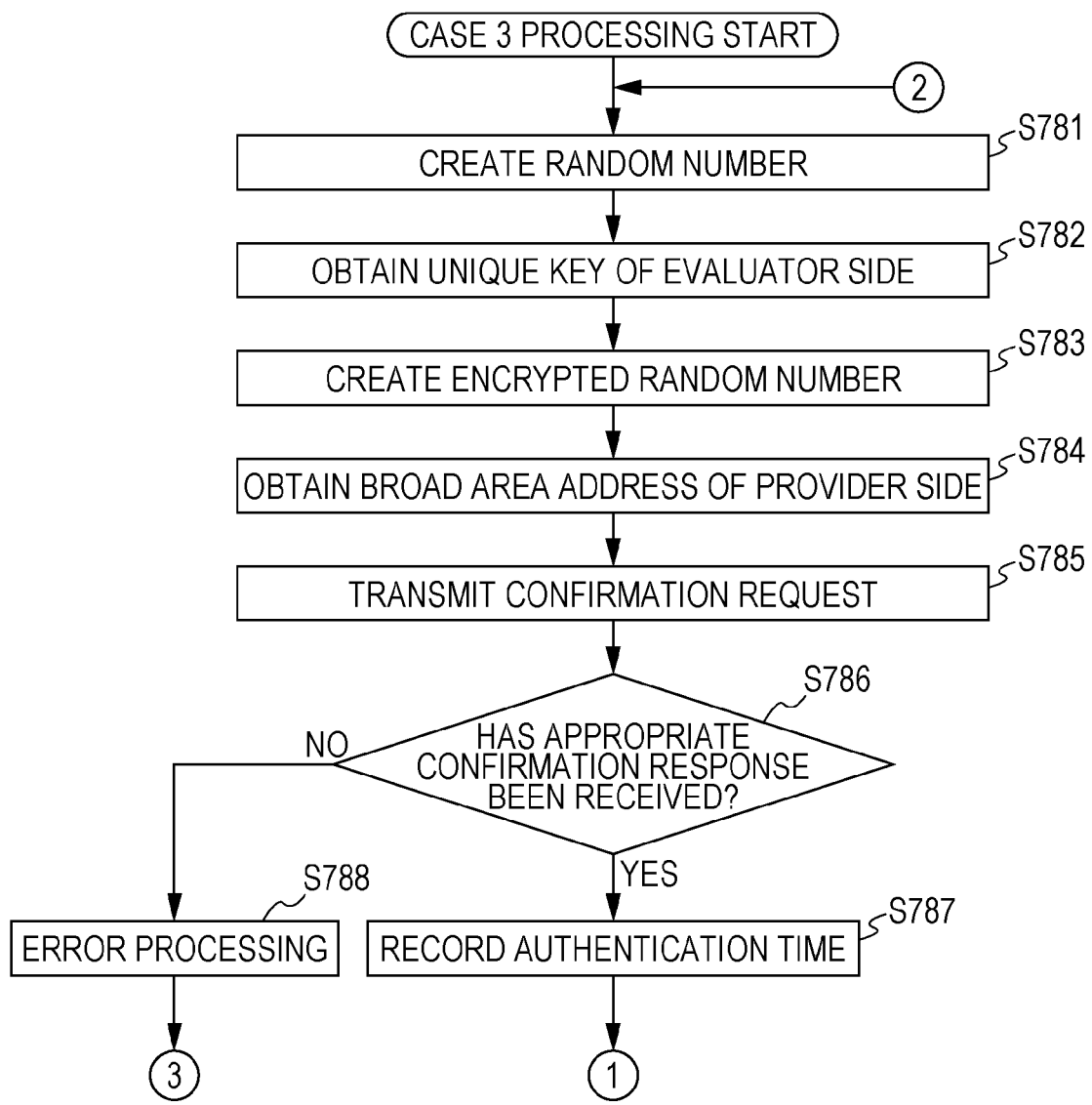
FIG. 19 is a flow chart illustrating an example of processing of Case 3.
Figure 20:
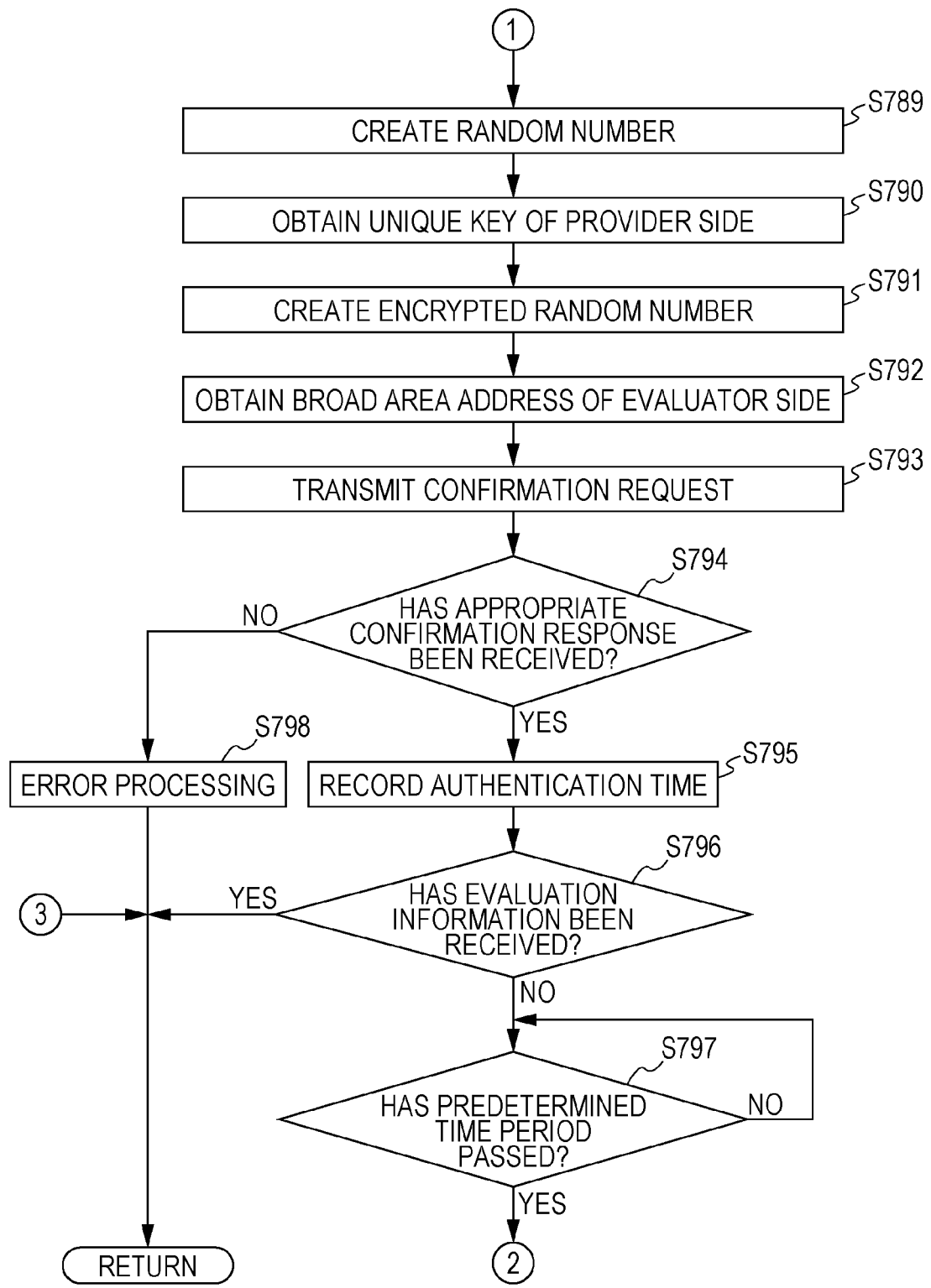
FIG. 20 is a flow chart illustrating an example of processing of Case 3.

FIGS. 19 and 20 are flow charts illustrating an example of the processing of Case 3 executed as the processing of Step S705 when the link authentication scheme corresponds to Case 3 in Step S704.

Since the processing form Step S781 to Step S788 is the same as that from Step S721 to Step S727 and Step S730 in FIG. 17, the detailed description thereof will be omitted.

The CPU 201 creates (generates) a random number in Step S789.

The CPU 201 obtains the unique key of the provider side by searching the terminal device database 222 with the use of the identification number of the provider side (the mobile terminal 47, for example) in Step S790.

The CPU 201 encrypts the random number created in Step S789 with the use of the unique key, which has been obtained in Step S790, in Step S791.

The CPU 201 obtains the broad area communication address of the evaluator side by searching for the terminal device database 222 with the use of the identification number of the evaluator side (the mobile terminal 46, for example) in Step S792.

The CPU 201 transmits the encrypted random number generated in Step S791 as a confirmation request to the broad area address, which has been obtained in Step S792, in Step S793.

The CPU 201 determines whether or not an appropriate confirmation response, which is the response to the confirmation request transmitted in Step S793, has been received in Step S794. At this time, it is determined whether or not the random number created in Step S789 is included in the confirmation response, and that the appropriate confirmation response has been received when the random number is included.

When it is determined that the appropriate confirmation response has been received in Step S794, the processing proceeds to Step S795. On the other hand, when it is determined that the appropriate confirmation response has not been received, the processing proceeds to Step S798 to execute the error processing.

The CPU 201 records the time at which the appropriate confirmation response was received as the authentication time of the link authentication in Step S795.

The CPU 201 determines in Step S796 whether or not the evaluation information has been transmitted from the provider side and moves on to Step S797 when it is determined that the evaluation information has not yet been transmitted.

The CPU 201 determines in Step S797 whether or not a predetermined time period has passed after recording the authentication time in Step S795 and waits for the determination that the predetermined time period has passed. When it is determined in Step S795 that the predetermined time period has passed, the processing returns to Step S781. In so doing, the identity of the evaluator and the identity of the provider are periodically confirmed.

On the other hand, when it is determined in Step S796 that the evaluation information has been transmitted from the provider side, the processing of Case 3 is completed.

As described above, the link authentication processing depending on each scheme in the case of Case 3 is executed.

Figure 21:
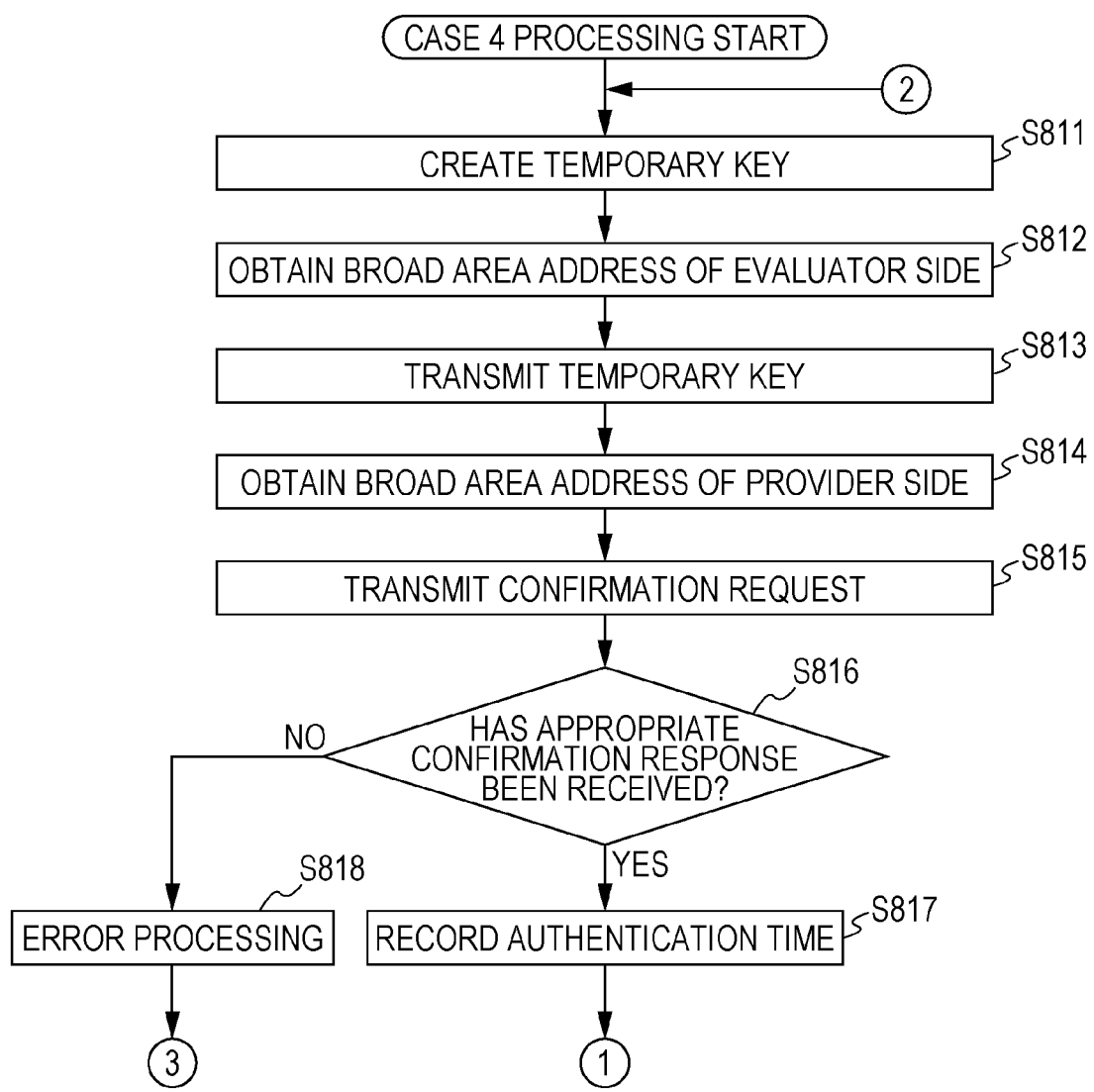
FIG. 21 is a flow chart illustrating an example of processing of Case 4.
Figure 22:
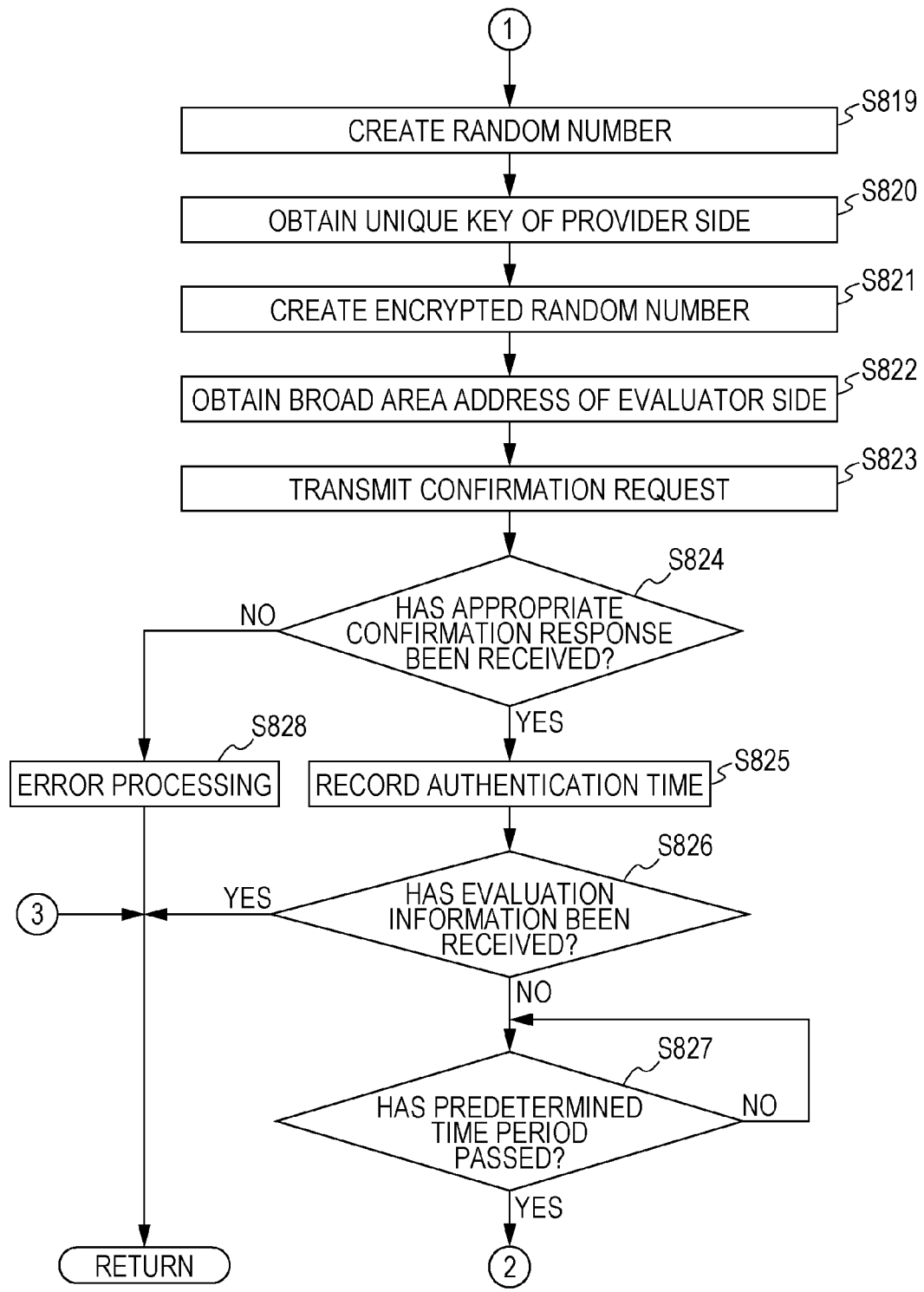
FIG. 22 is a flow chart illustrating an example of processing of Case 4.

FIGS. 21 and 22 are flow charts illustrating an example of the processing of Case 4 executed as the processing of Step S705 when the link authentication scheme is specified to be Case 4 in Step S704.

Since the processing from Step S811 to Step S818 is the same as the processing from Step S751 to Step S757 and Step S760 in FIG. 18, the detail description thereof will be omitted.

Since the processing from Step S819 to Step S828 is the same as the processing from Step S789 to Step S798 in FIG. 20, the detailed description thereof will be omitted.

The link authentication processing depending on the scheme in the case of Case 4 is executed in this manner.

Figure 23:
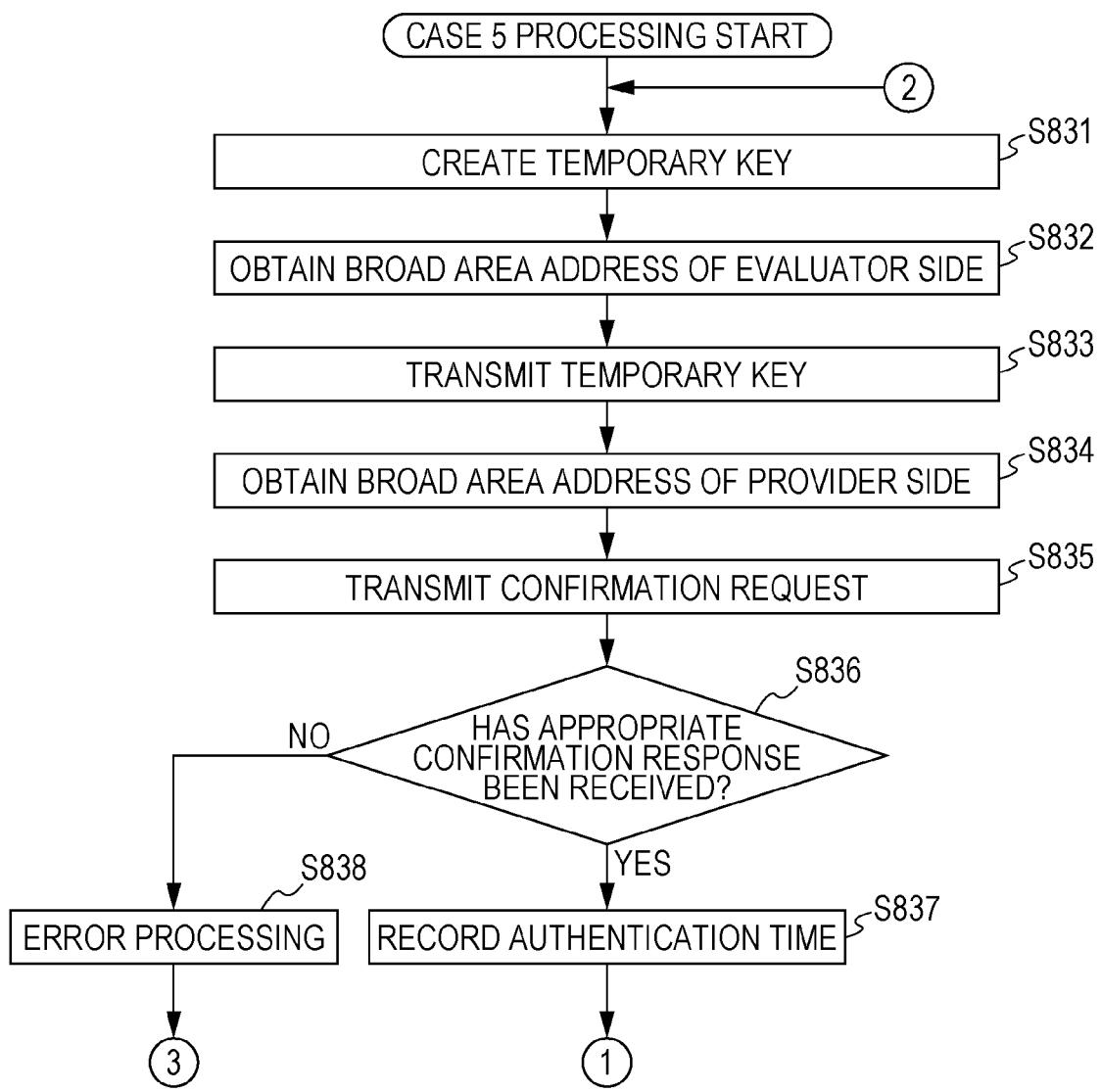
FIG. 23 is a flow chart illustrating an example of processing of Case 5.
Figure 24:
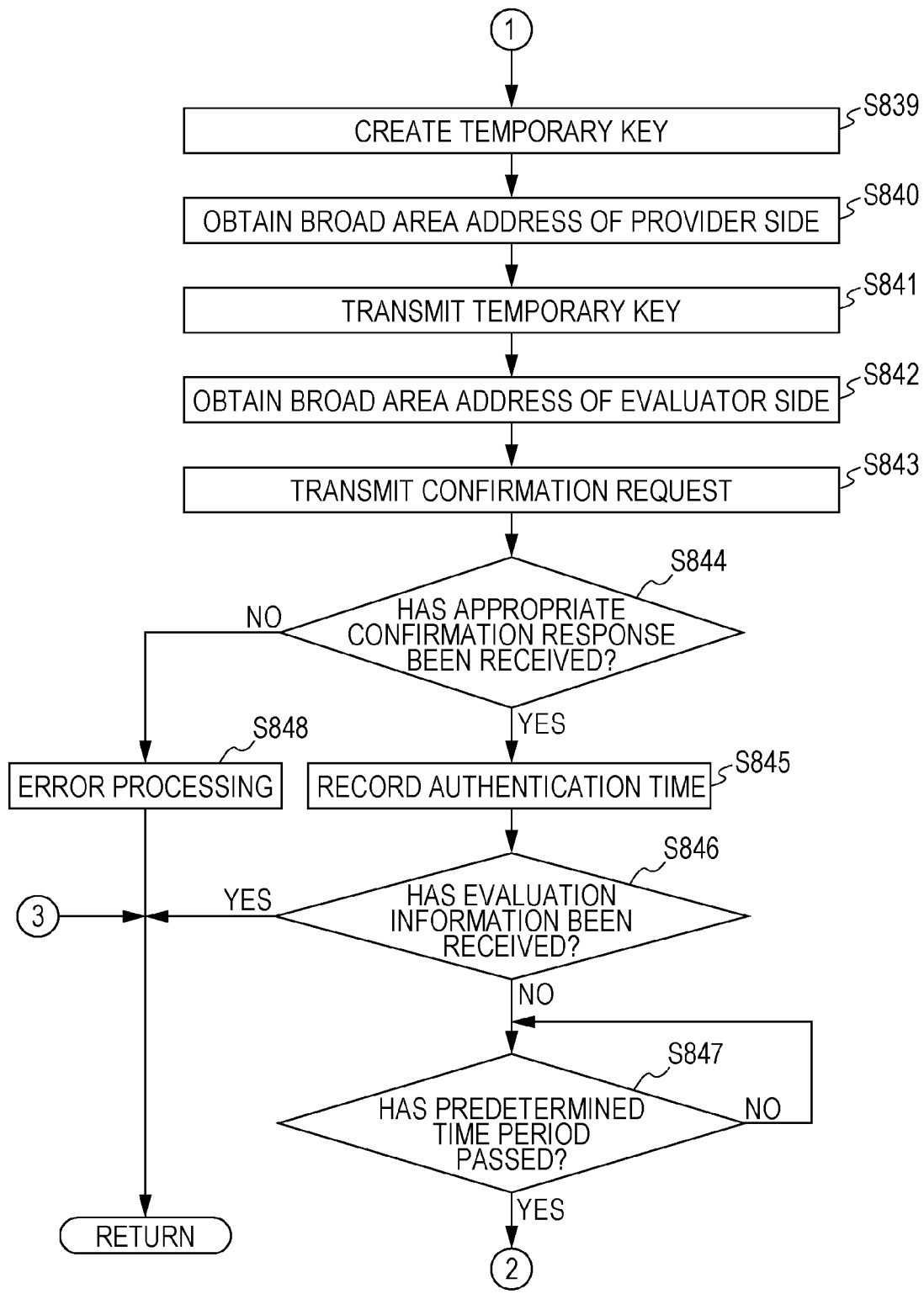
FIG. 24 is a flow chart illustrating an example of processing of Case 5.

FIGS. 23 and 24 are flow charts illustrating an example of the processing of Case 5 executed as the processing in Step S705 when the link authentication scheme is specified to be Case 5 in Step S704.

Since the processing from Step S831 to Step S838 is the same as the processing from Step S811 to Step S818 in FIG. 21, the detailed description will be omitted.

The CPU 201 creates a temporary key in Step S839.

The CPU 201 obtains the broad area communication address of the provider side by searching for the terminal device database 222 with the use of the identification number of the provider side (the mobile terminal 47, for example) in Step S840.

The CPU 201 transmits the temporary key created in Step S839 to the broad area address, which has been obtained in Step S840, in Step S841.

The CPU 201 obtains the broad area communication address of the evaluation side by searching for the terminal device database 222 with the use of the identification number of the evaluator side (the mobile terminal 46, for example) in Step S842.

The CPU 201 transmits a confirmation request to the broad area address, which has been obtained in Step S842, in Step S843.

The CPU 201 determined in Step S844 whether or not an appropriate confirmation response, which is the response to the confirmation request transmitted in Step S843, has been received. At this time, it is determined whether or not the temporary key created in Step S839 is included in the confirmation response, and that the appropriate confirmation response has been received when the temporary key is included.

When it is determined in Step S844 that the appropriate confirmation response has been received, the processing proceeds to Step S845. On the other hand, when it is determined that the appropriate confirmation response has not been received, the processing proceeds to Step S848 to execute the error processing.

The CPU 201 records the time at which the appropriate confirmation response was received as the authentication time of the link authentication in Step S845.

The CPU 201 determines in Step S846 whether or not the evaluation information has been transmitted from the provider side and moves on to Step S847 when it is determined that the evaluation information has not yet been transmitted.

The CPU 201 determines in Step S847 whether or not a predetermined time period has passed since the recording of the authentication time in Step S845 and waits for the determination that the predetermined time period has passed. When it is determined in Step S847 that the predetermined time period has passed, the processing returns to Step S831. In so doing, the identity of the evaluator and the identity of the provider are periodically confirmed.

On the other hand, when it is determined in Step S846 that the evaluation information has been transmitted from the provider side, the processing of Case 5 is completed.

As described above, the link authentication processing depending on the scheme in the case of Case 5 is executed.

The evaluation information collecting processing including such link authentication processing depending on the scheme is executed.

Figure 25:
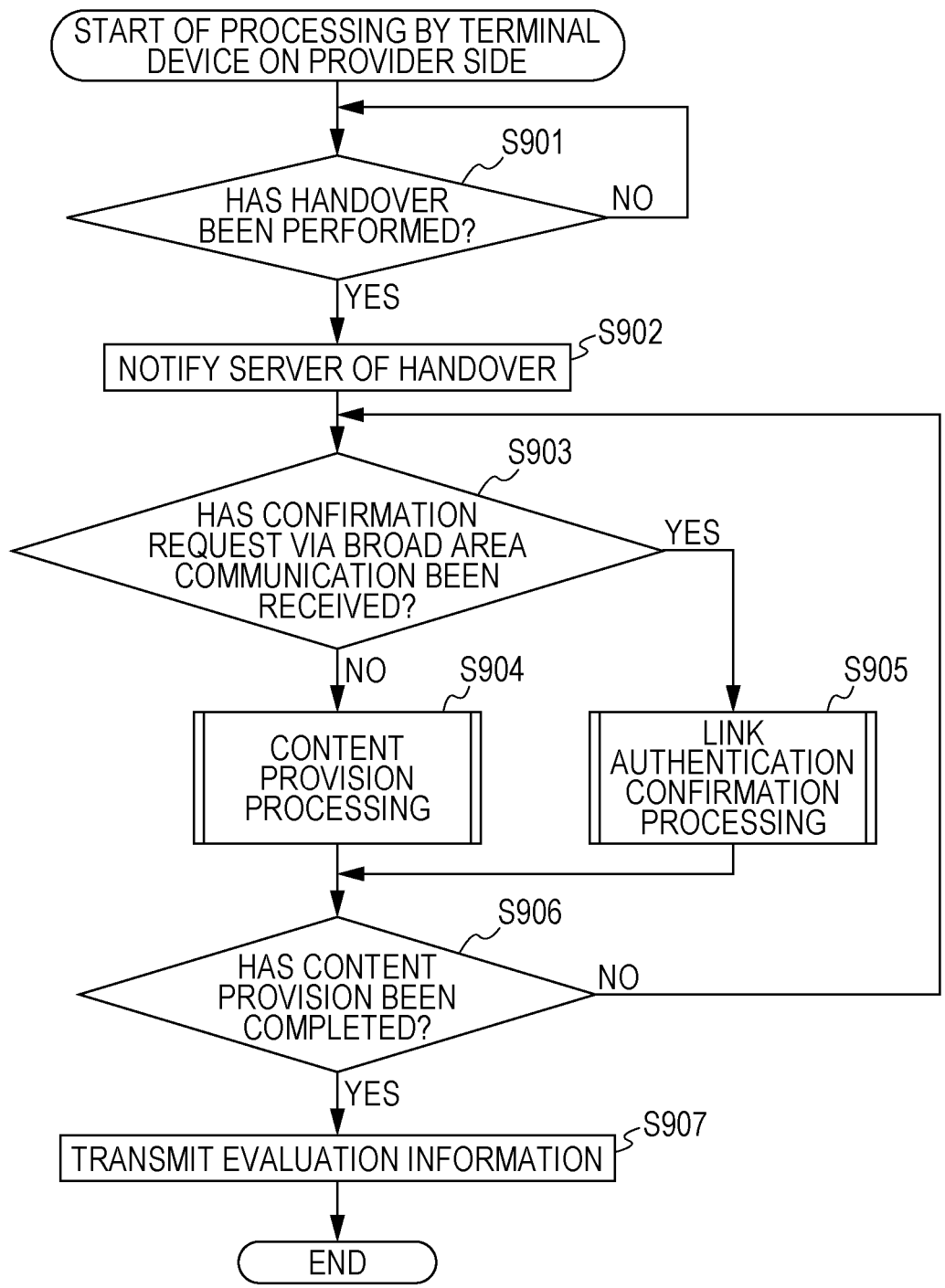
FIG. 25 is a flow chart illustrating an example of processing by a terminal device on the side of a provider.

Next, description will be given of an example of the processing by the terminal device (the information collecting terminal 31, the mobile terminal 47, or the like, for example) on the provider side with reference to the flow chart in FIG. 25. The processing is executed in the terminal device on the provider side which holds a unique key, and the terminal device on the provider side provides music content or the like in this example.

The CPU 111 of the information collecting terminal or the mobile terminal determines in Step S901 whether or not the handover has been performed and waits for the determination that the handover has been performed.

The CPU 111 notifies the server 21 of the handover via the broad area communication in Step S902. At this time, the other device information is transmitted along with the notification of the handover.

The CPU 111 determines in Step S903 whether or not a confirmation request via the broad area communication has been received. When it is determined in Step S903 that the confirmation request has been received, the processing proceeds to Step S905. When it is determined that the confirmation request has not been received, the processing proceeds to Step S904.

Figure 26:
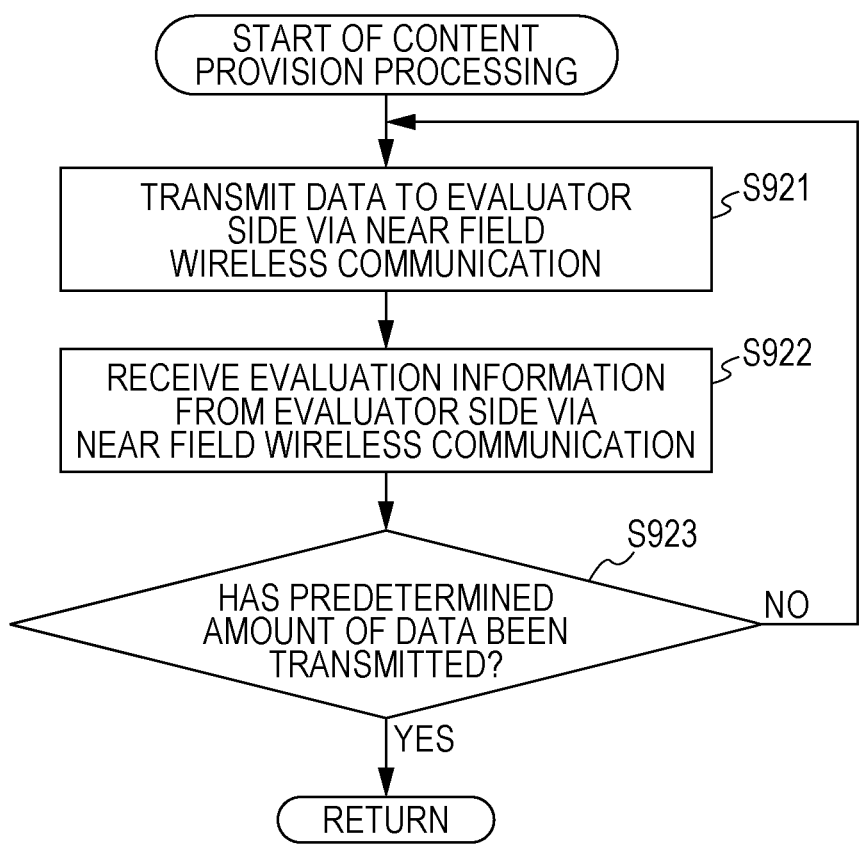
FIG. 26 is a flow chart illustrating an example of content provision processing.

Here, description will be given of an example of the content provision processing in Step S904 in FIG. 25 with reference to the flow chart in FIG. 26.

The CPU 111 transmits the content data to the evaluator side via the near-field wireless communication in Step S921.

The CPU 111 receives the evaluation information from the evaluator side via the near-field wireless communication in Step S922.

The CPU 111 determines in Step S923 whether or not a predetermined amount of data has been transmitted in the processing of Step S921, and the processing returns to Step S921 when it is determined that the predetermined amount of data has not yet been transmitted. On the other hand, when it is determined that the predetermined amount of data has been transmitted, the processing proceeds to Step S906 in FIG. 25.

Figure 27:
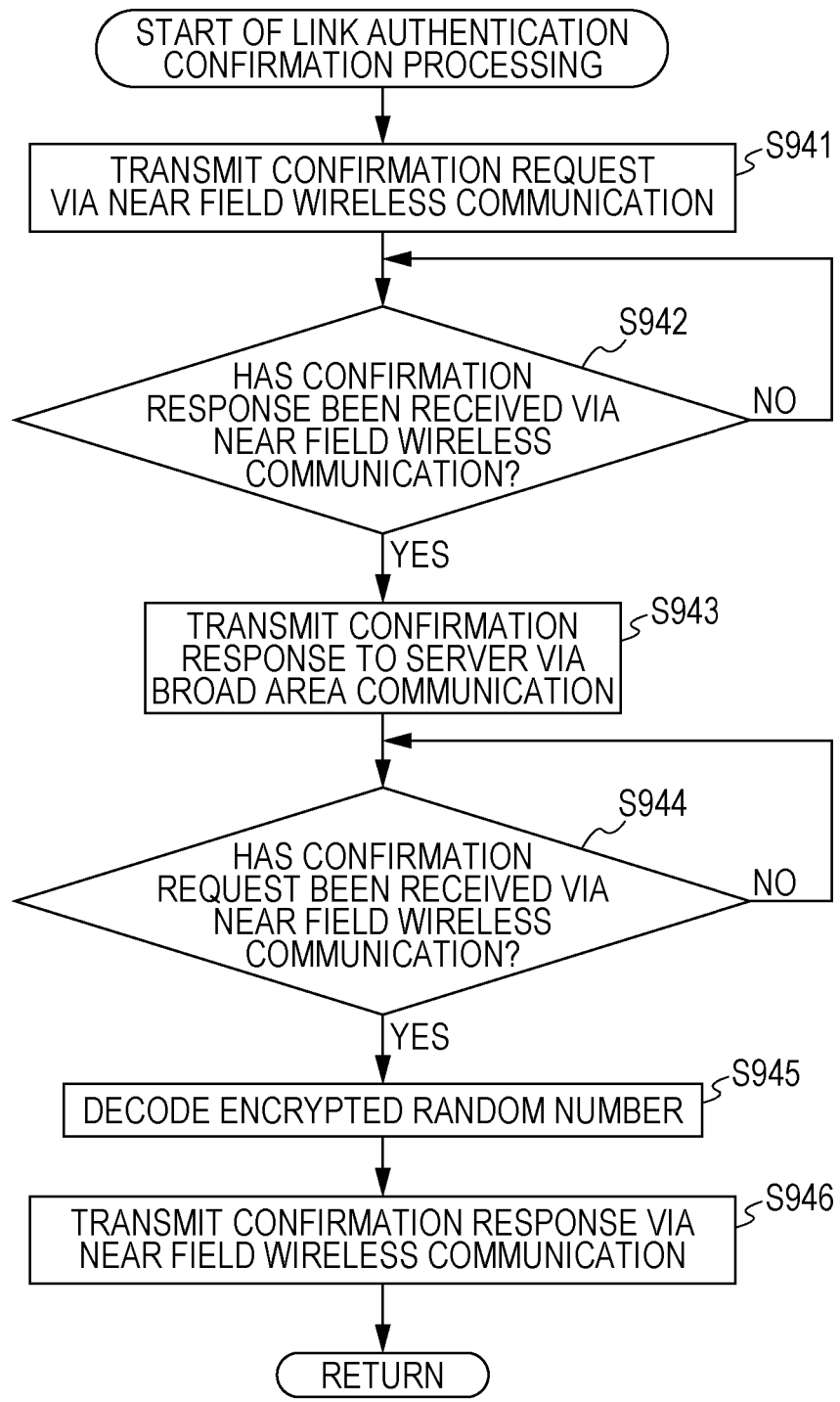
FIG. 27 is a flow chart illustrating an example of link authentication processing.

Here, description will be given of an example of the link authentication confirmation processing in Step S905 in FIG. 25 with reference to the flow chart in FIG. 27.

The CPU 111 transmits the confirmation request which has been determined to be received in Step S903 to the evaluator side via the near-field wireless communication in Step S941.

The CPU 111 determines in Step S942 whether or not the confirmation response to the confirmation request transmitted in Step S941 has been received via the near-field wireless communication and waits for the determination that the confirmation response has been received. When it is determined in Step S942 that the confirmation response has been received, the processing proceeds to Step S943.

The CPU 111 transmits the confirmation response which has been determined to be received in Step S942 to the server 21 via the broad area communication in Step S943.

The CPU 111 determines in Step S944 whether or not the confirmation request has been received via the near-field wireless communication and waits for the determination that the confirmation request has been received. When it is determined in Step S944 that the confirmation request has been received, the processing proceeds to Step S945.

The CPU 111 decodes an encrypted random number included in the confirmation request, which has been determined to be received in Step S944, with the use of its own unique key in Step S945.

The CPU 111 transmits the random number obtained by decoding in Step S945 as the confirmation response to the evaluator side via the near-field wireless communication in Step S946.

As described above, the link confirmation processing is executed.

Referring back to FIG. 25, the processing proceeds to Step S906 after the processing of Step S904 or Step S905, and the CPU 111 determines whether or not the content provision has been completed. For example, when the evaluator instructs the stop of the content reproduction, it is determined in Step S906 that the content provision has been completed. When it is determined that the content provision has not yet been completed in Step S906, the processing returns to Step S903.

When it is determined in Step S906 that the content provision has been completed, the processing proceeds to Step S907.

The CPU 111 transmits the evaluation information received in the processing of Step S904 to the server 21 via the broad area communication in Step S907.

As described above, the processing by the terminal device on the provider side is executed.

Next, description will be given of another example of the processing by the terminal device on the provider side with reference to the flow chart in FIG. 28. The processing is executed in the terminal device on the provider side which does not hold a unique key, and the terminal device on the provider side provides music content or the like in this example.

The CPU 111 of the information collecting terminal or the mobile terminal determines in Step S961 whether or not the handover has been performed and waits for the determination that the handover has been performed.

The CPU 111 notifies the server 21 of the handover via the broad area communication in Step S962. At this time, the other device information is transmitted along with the notification of the handover.

The CPU 111 determines in Step S963 whether or not a confirmation request or a temporary key via the broad area communication has been received. When it is determined in Step S963 that the confirmation request or the temporary key has been received, the processing proceeds to Step S965. When it is determined that the confirmation request has not been received, the processing proceeds to Step S964.

Here, description will be given of an example of the link authentication confirmation processing in Step S965 in FIG. 28 with reference to the flow chart in FIG. 29.

The CPU 111 determines in Step S981 whether or not what the CPU 111 has determined to receive in Step S963 is the confirmation request. When it is determined that the confirmation request has been received, the processing proceeds to Step S982.

The CPU 111 transmits the confirmation request which has been determined to receive in Step S963 to the evaluator side via the near-field wireless communication in Step S982.

The CPU 111 determines whether or not the confirmation response to the confirmation request transmitted in Step S982 has been received via the near-field wireless communication in Step S983 and waits for the determination that the confirmation response has been received. When it is determined in Step S983 that the confirmation response has been received, the processing proceeds to Step S984.

The CPU 111 transmits the confirmation response which has been determined to be received in Step S983 to the server 21 via the broad area communication in Step S984.

On the other hand, when it is determined in Step S981 that what the CPU 111 has determined to receive in Step S963 is not the confirmation request, the processing proceeds to Step S988. This means that the temporary key has been received.

The CPU 111 stores the temporary key, which has been determined to be received in Step S963, in Step S988.

After the processing of Step S984 or Step S988, the processing proceeds to Step S985.

The CPU 111 determines in Step S985 whether or not the confirmation request has been received via the near field wireless communication and waits for the determination that the confirmation request has been received. When it is determined that the confirmation request has been received in Step S985, the processing proceeds to Step S986.

The CPU 111 reads the temporary, which has been stored in Step S988, in Step S986.

The CPU 111 transmits the temporary key read in Step S986 as a confirmation response to the evaluator side via the near field wireless communication in Step S987.

As described above, the link authentication confirmation processing is executed.

Figure 28:
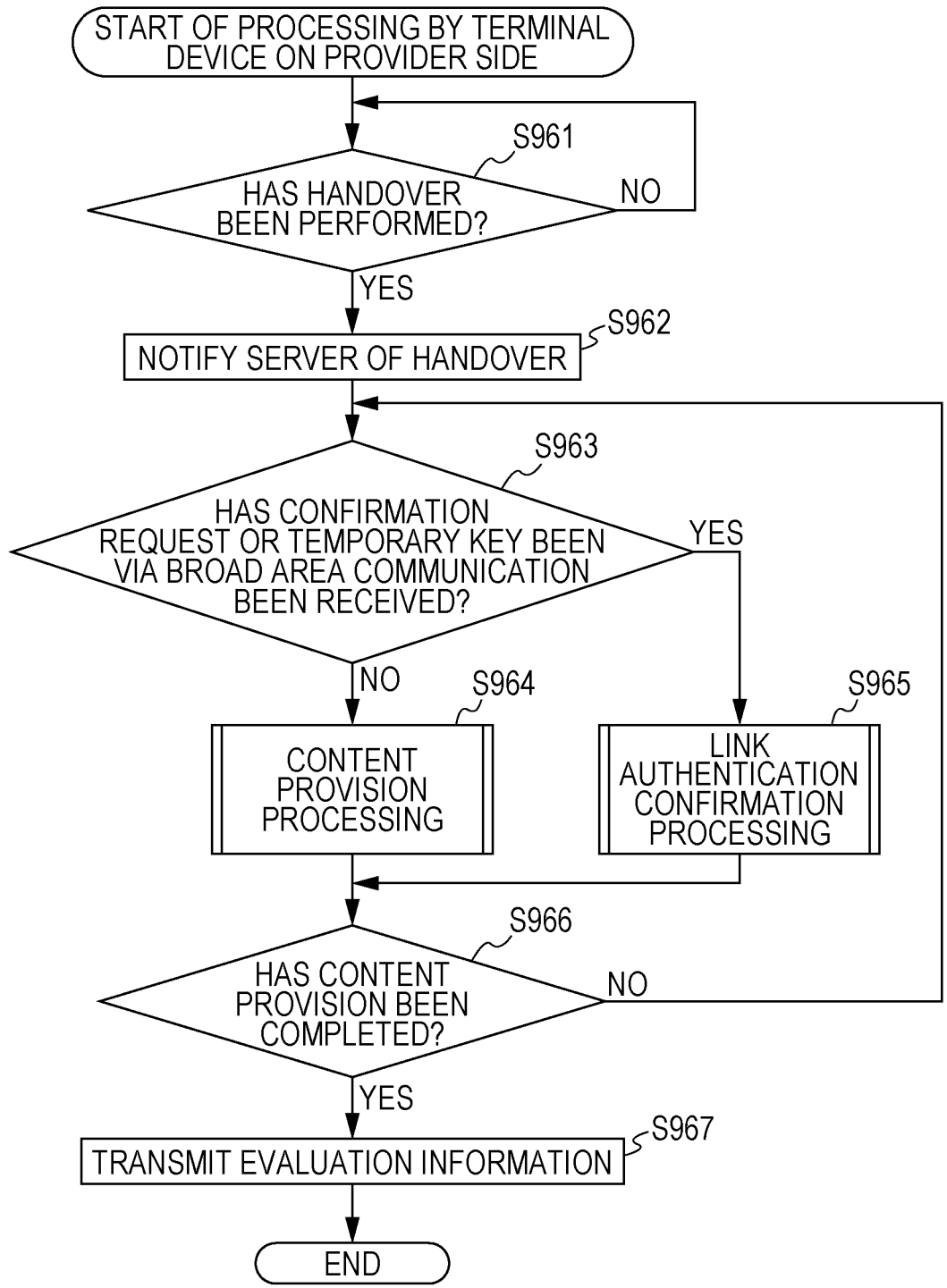
FIG. 28 is a flow chart illustrating another example of processing by a terminal device on the side of a provider.
Figure 29:
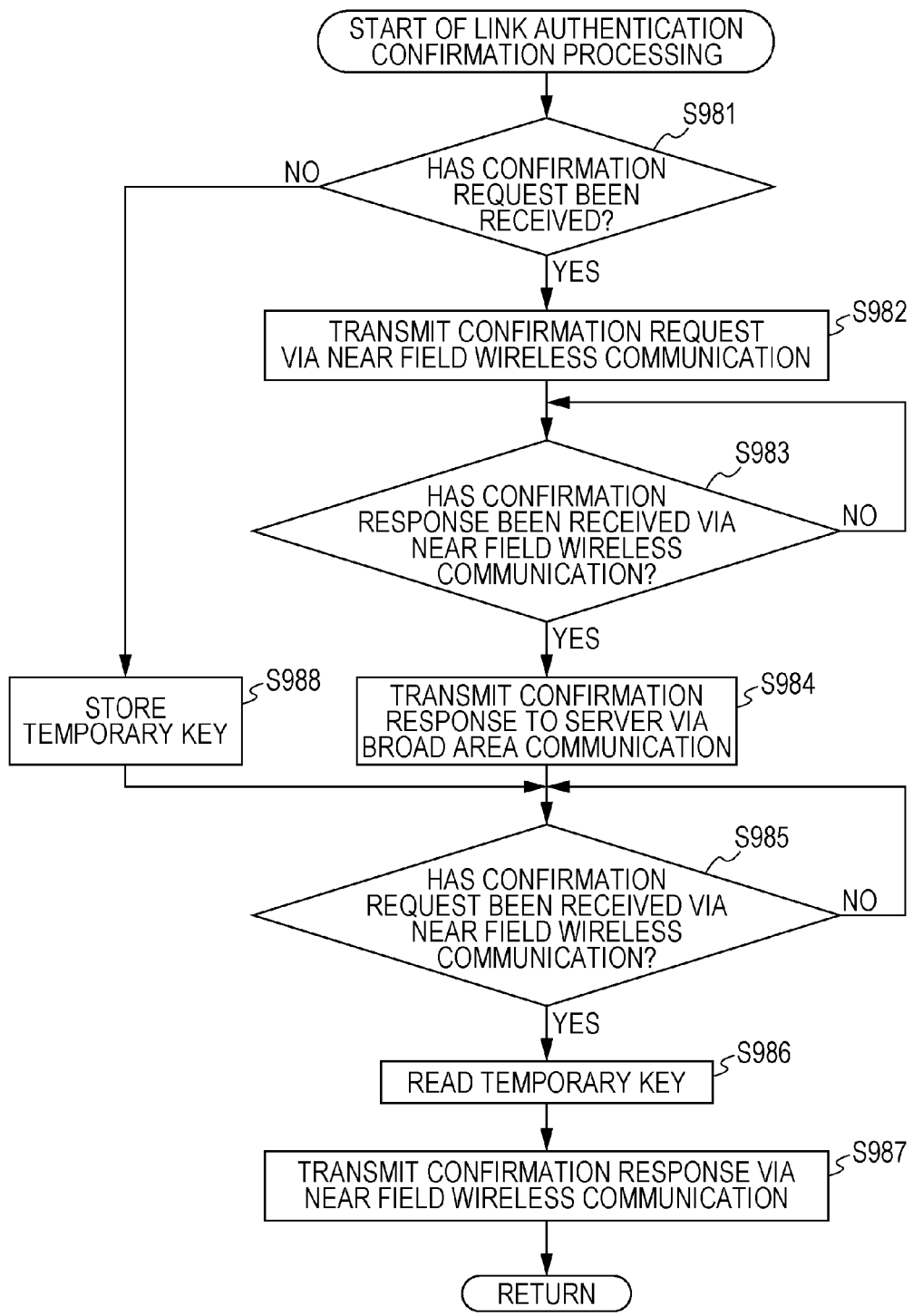
FIG. 29 is a flow chart illustrating another example of link authentication processing.

Since the content provision processing of Step S964 in FIG. 28 is the same as the processing described above with reference to FIG. 26, the detailed description thereof will be omitted. Moreover, since the processing of Step S966 and Step S967 in FIG. 28 is the same as the processing of Step S906 and Step S907 in FIG. 25, respectively, the detailed description thereof will be omitted.

As described above, the processing by the terminal device on the provide side is executed.

Figure 30:
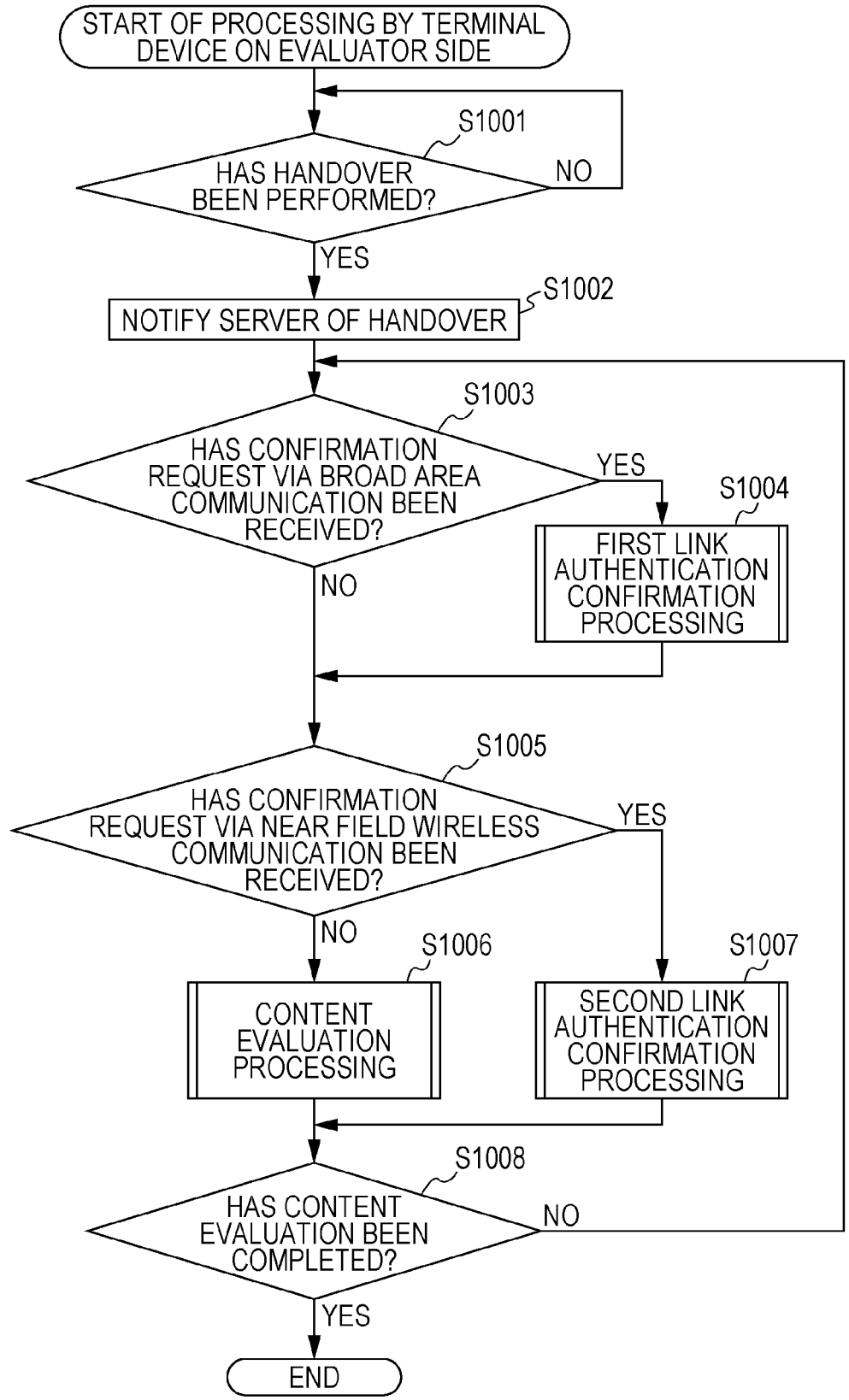
FIG. 30 is a flow chart illustrating an example of processing by a terminal device on the side of an evaluator.

Next, description will be given of an example of the processing by the terminal device (the mobile terminal 41, the mobile terminal 46, or the like, for example) on the evaluator side with reference to the flow chart in FIG. 30. The processing is executed by the terminal device on the evaluator side which holds a unique key, and music content or the like is provided by the terminal device on the provider side and the content is evaluated in this example.

The CPU 111 of the mobile terminal determines in Step S1001 whether or not the handover has been performed and waits for the determination that the handover has been performed.

The CPU 111 notifies the server of the handover via the broad area communication in Step S1002. At this time, the other device information is transmitted along with the notification of the handover. The processing of Step S1002 may be omitted.

The CPU 111 determines in Step S1003 whether or not the confirmation request via the broad area communication has been received. When it is determined that the confirmation request has been received in Step S1003, the processing proceeds to Step S1004.

Figure 31:
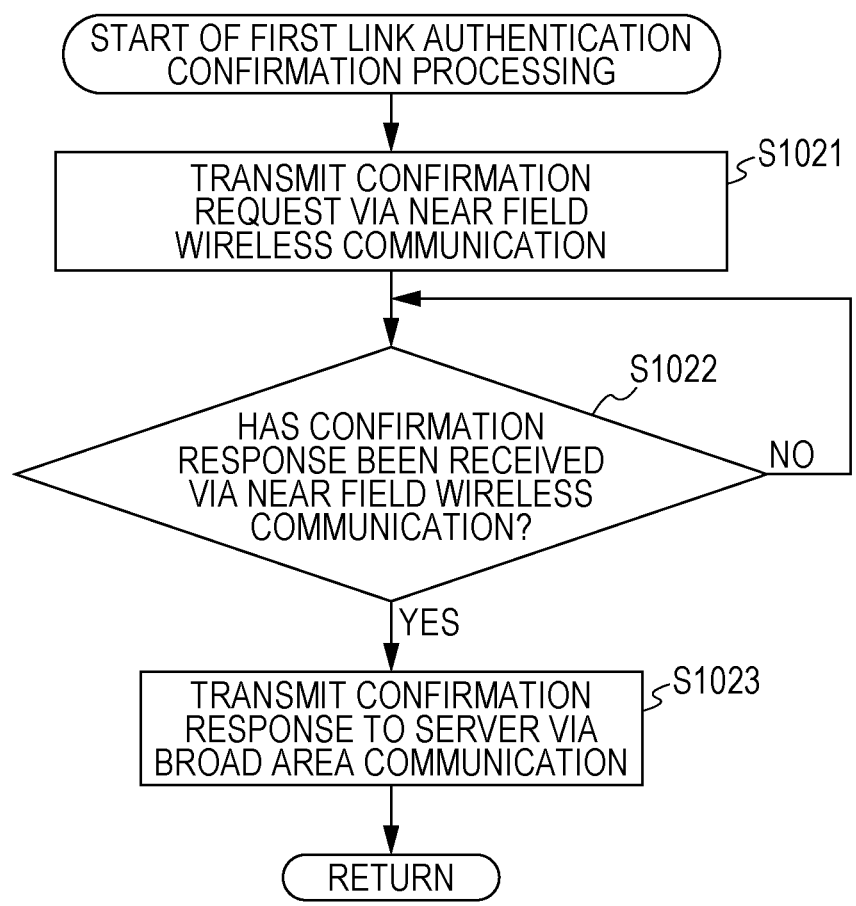
FIG. 31 is a flow chart illustrating an example of first link authentication processing.

Here, description will be given of an example of the first link authentication processing of Step S1004 in FIG. 30 with reference to the flow chart in FIG. 31.

The CPU 111 transmits the confirmation request which has been determined to be received in Step S1003 to the provider side via the near field wireless communication in Step S1021.

The CPU 111 determines in Step S1022 whether or not the confirmation response to the confirmation request transmitted in Step S1021 has been received and waits for the determination that the confirmation response has been received. When it is determined in Step S1022 that the confirmation response has been received, the processing proceeds to Step S1023.

The CPU 111 transmits the confirmation response which has been determined to be received in Step S1022 to the server 21 via the broad area communication in Step S1023.

As described above, the first link authentication processing is executed.

Referring back to FIG. 30, after the processing of Step S1004, or when it is determined in Step S1003 that the confirmation request has not been received, the processing proceeds to Step S1005.

The CPU 111 determines in Step S1005 whether or not the confirmation request via the near field wireless communication has been received. When it is determined in Step S1005 that the confirmation request has been received, the processing proceeds to Step S1007.

Figure 32:
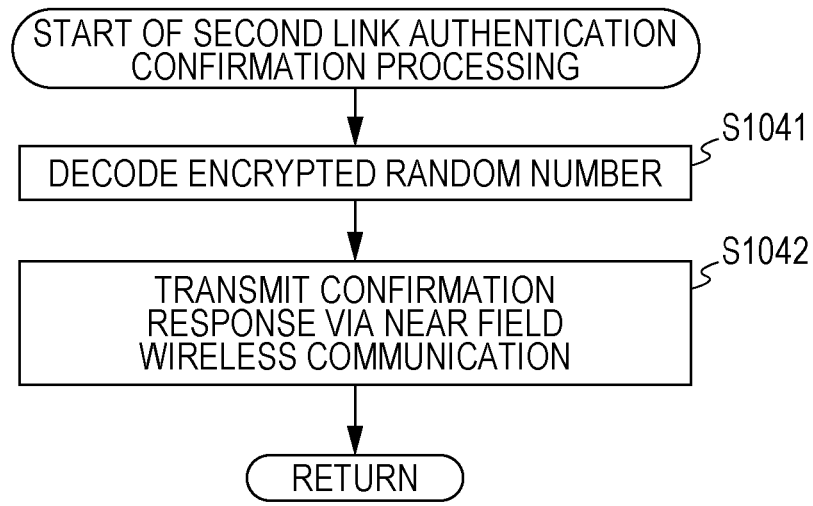
FIG. 32 is a flow chart illustrating an example of second link authentication processing.

Here, description will be given of an example of the second link authentication processing of Step S1007 in FIG. 30 with reference to the flow chart in FIG. 32.

The CPU 111 decodes the encrypted random number included in the confirmation request which has been determined to be received in Step S1005 with its own unique key in Step S1041.

The CPU 111 transmits the random number obtained by decoding in Step S1041 as a confirmation response to the provider side via the near field wireless communication in Step S1042.

As described above, the second link confirmation processing is executed.

Referring back to FIG. 30, when it is determined in Step S1005 that the confirmation request has not been received, the processing proceeds to Step S1006.

Figure 33:
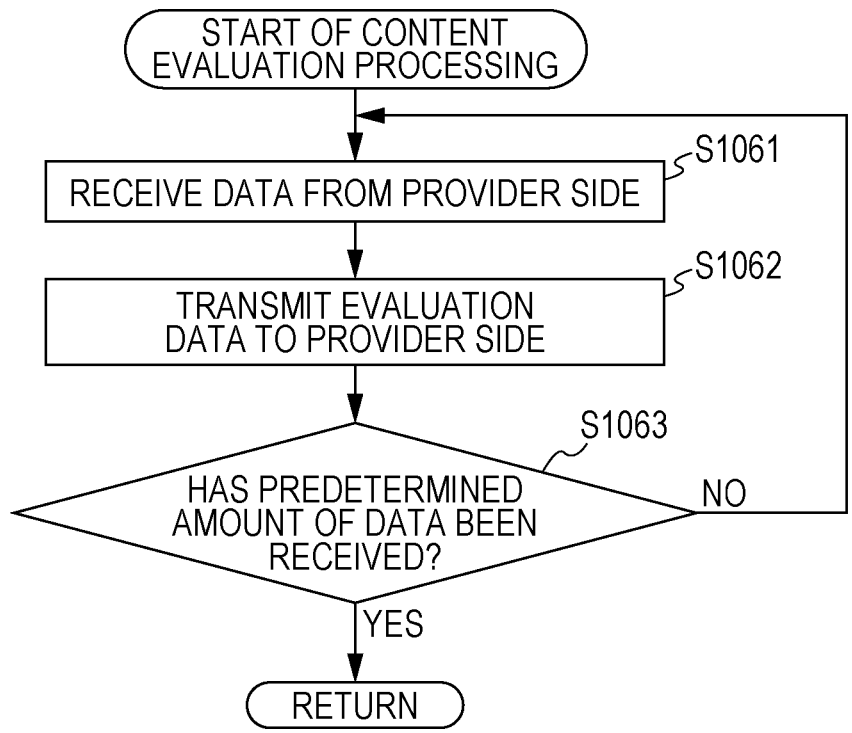
FIG. 33 is a flow chart illustrating an example of content evaluation processing.

Here, Description will be given of an example of the content evaluation processing of Step S1006 in FIG. 30 with reference to the flow chart in FIG. 33.

The CPU 111 receives the data from the provider side via the near field wireless communication in Step S1061.

The CPU 111 transmits the evaluation information to the provider side via the near field wireless communication in Step S1062.

The CPU 111 determines in Step S1063 whether or not a predetermined amount of data has been transmitted in the processing of Step S1061, and the processing returns to Step S1061 when it is determined that the predetermined amount of data has not yet been transmitted. On the other hand, when it is determined that the predetermined amount of data has been transmitted, the processing proceeds to Step S1008 in FIG. 30.

As described above, the content evaluation processing is executed.

Referring back to FIG. 30, after the processing of Step S1006 or Step S1007, the processing proceeds to Step S1008.

The CPU 111 determines in Step S1008 whether or not the evaluation of the content received from the provider side has been completed, and the processing returns to Step S1003 when it is determined that the evaluation has not yet been completed.

On the other hand, when it is determined in Step S1008 that the content evaluation has been completed, the processing is completed.

As described above, the processing by the terminal device on the evaluator side is executed.

Figure 34:
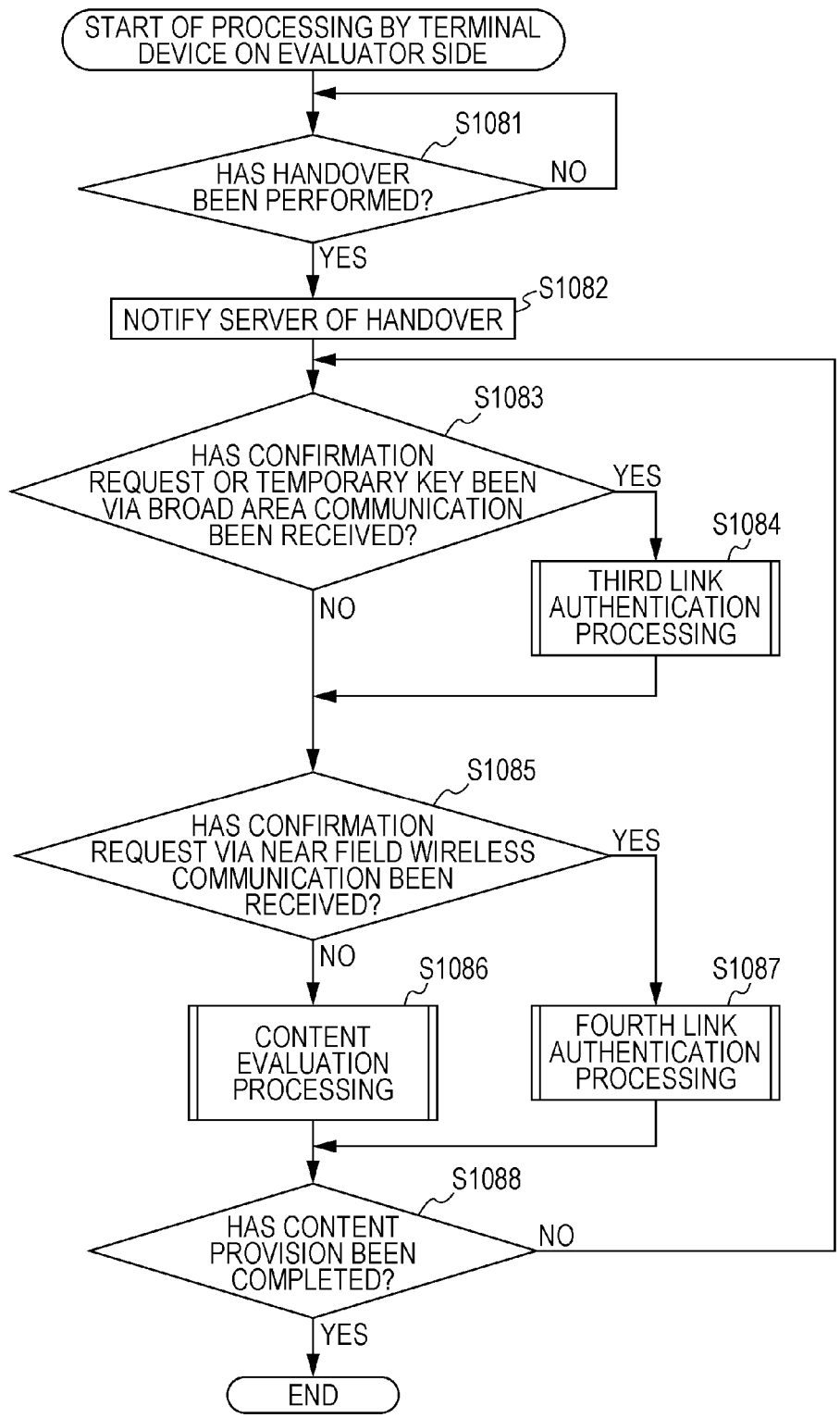
FIG. 34 is a flow chart illustrating another example of processing by a terminal device on the side of an evaluator.

Next, description will be given of another example of the processing by the terminal device on the evaluator side with reference to the flow chart in FIG. 34. The processing is executed by the terminal device on the evaluator side which does not hold a unique key, and music content or the like is provided by a terminal device on the provider side and the content is evaluated in this example.

The CPU 111 of the mobile terminal determines in Step S1081 whether or not the handover has been performed and waits for the determination that the handover has been performed.

The CPU 111 notifies the server 21 of the handover via the broad area communication in Step S1082. At this time, the other device information is transmitted along with the notification of the handover. The processing of Step S1082 may be omitted.

The CPU 111 determines in Step S1083 whether or not the confirmation request via the broad area communication has been received. When it is determined in Step S1083 that the confirmation request has been received, the processing proceeds to Step S1084.

Figure 35:
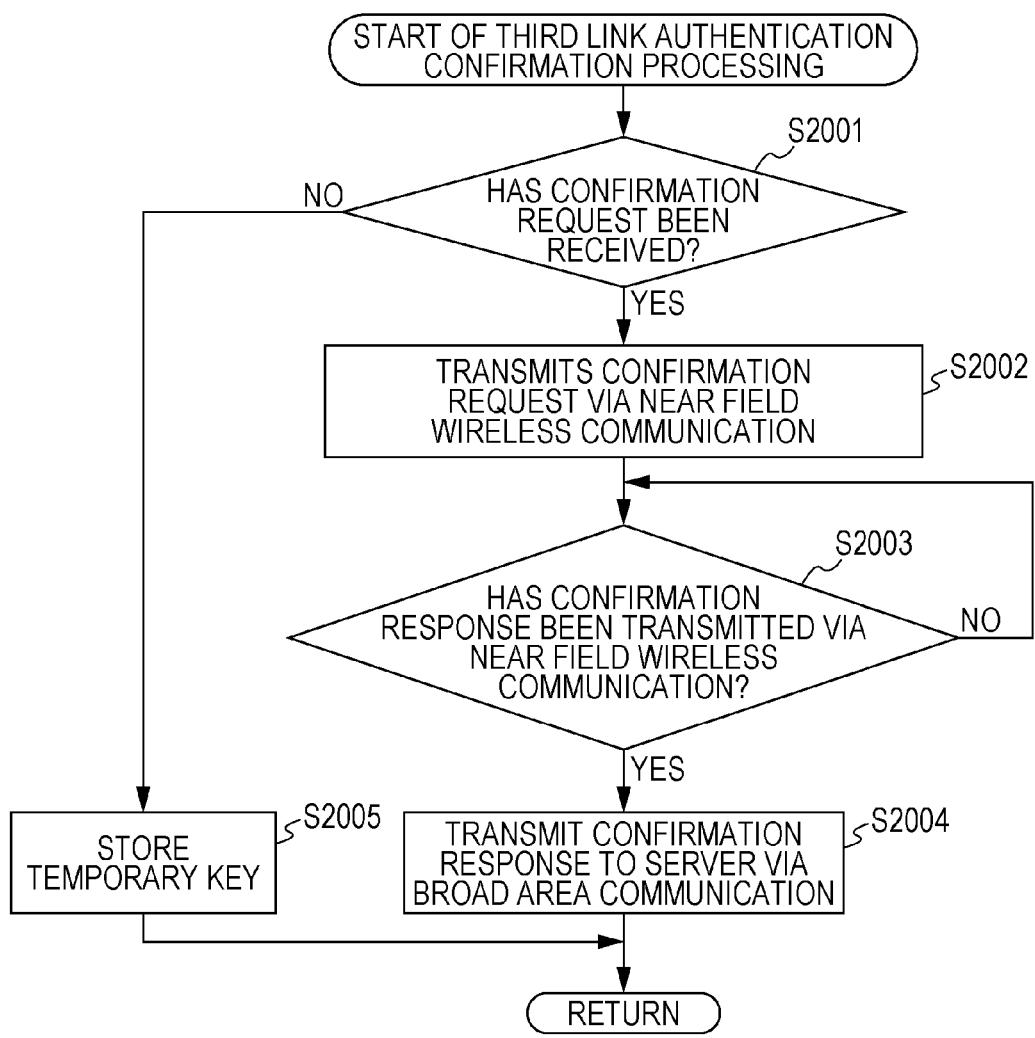
FIG. 35 is a flow chart illustrating an example of third link authentication processing.

Here, description will be given of an example of the third link authentication processing of Step S1084 in FIG. 34 with reference to the flow chart in FIG. 35.

The CPU 111 determines in Step S2001 what has been determined to be received in Step S1083 is the confirmation request. When it is determined that the confirmation request has been received, the processing proceeds to Step S2002.

The CPU 111 transmits the confirmation request which has been determined to be received in Step S1083 to the provider side via the near field wireless communication in Step S2002.

The CPU 111 determines in Step S2003 whether or not the confirmation response to the confirmation request transmitted in Step S2002 has been received via the near field wireless communication and waits for the determination that the confirmation response has been received. When it is determined in Step S2003 that the confirmation response has been received, the processing proceeds to Step S2004.

The CPU 111 transmits the confirmation response which has been determined to be received in Step S2003 to the server 21 via the broad area communication in Step S2004.

On the other hand, when it is determined in Step S2001 that what has been determined to be received in Step S1083 is not the confirmation request, the processing proceeds to Step S2005. This means that the temporary key has been received.

The CPU 111 records the temporary key, which has been determined to be received in Step S1083, in Step S2005.

As described above, the third link authentication processing is executed.

Referring back to FIG. 34, after the processing of Step S1084, or when it is determined in Step S1083 that the confirmation request via the broad area communication has not been received, the processing proceeds to Step S1085.

The CPU 111 determines in Step S1085 whether or not the confirmation request via the near field wireless communication has been received. When it is determined in Step S1085 that the confirmation request has been received, the processing proceeds to Step S1087.

Figure 36:
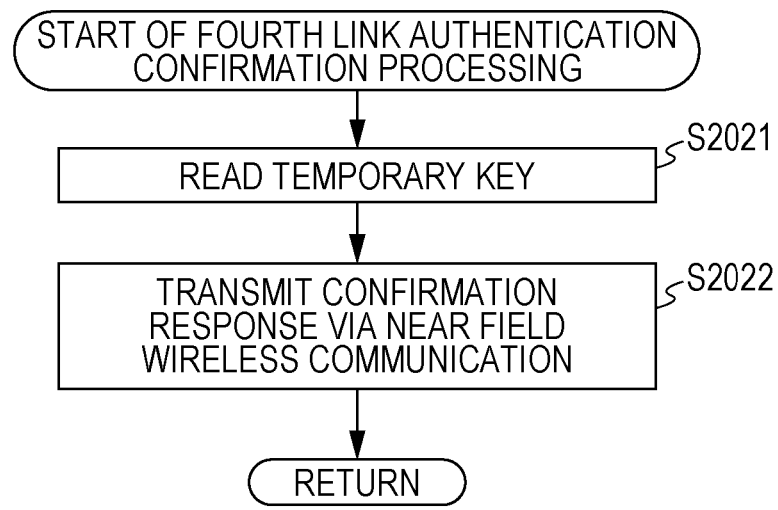
FIG. 36 is a flow chart illustrating an example of fourth link authentication processing.

Here, description will be given of an example of the fourth link authentication processing of Step S1087 in FIG. 34 with reference to the flow chart in FIG. 36.

The CPU 111 reads the temporary key, which has been stored in Step S2005, in Step S2021.

The CPU 111 transmits the temporary key read in Step S2021 as the confirmation response to the evaluator side via the near field wireless communication in Step S2022.

As described above, the fourth link authentication confirmation processing is executed.

Referring back to FIG. 34, on the other hand, in Step S1085, when it is determined that the confirmation request has not been received, the processing proceeds to Step S1086. Since the content evaluation processing of Step S1086 is the same as the processing described above with reference to the flow chart in FIG. 33, the detailed description thereof will be omitted.

After the processing of Step S1086 or Step S1087, the processing proceeds to Step S1088.

The CPU 111 determines in Step S1088 whether or not the evaluation of the content provided from the provider side has been completed, and the processing returns to Step S1083 when it is determined that the evaluation has not yet been completed.

On the other hand, when it is determined in Step S1088 that the content evaluation has been completed, the processing is completed.

As described above, the processing by the terminal device on the evaluator side is executed.

Incidentally, the above description was mainly given of the examples in which the evaluation information is collected as the information to be referred to for purchasing products or services, such as so-called word-of-mouth information. However, the information may be collected from a different view point.

Figure 37:
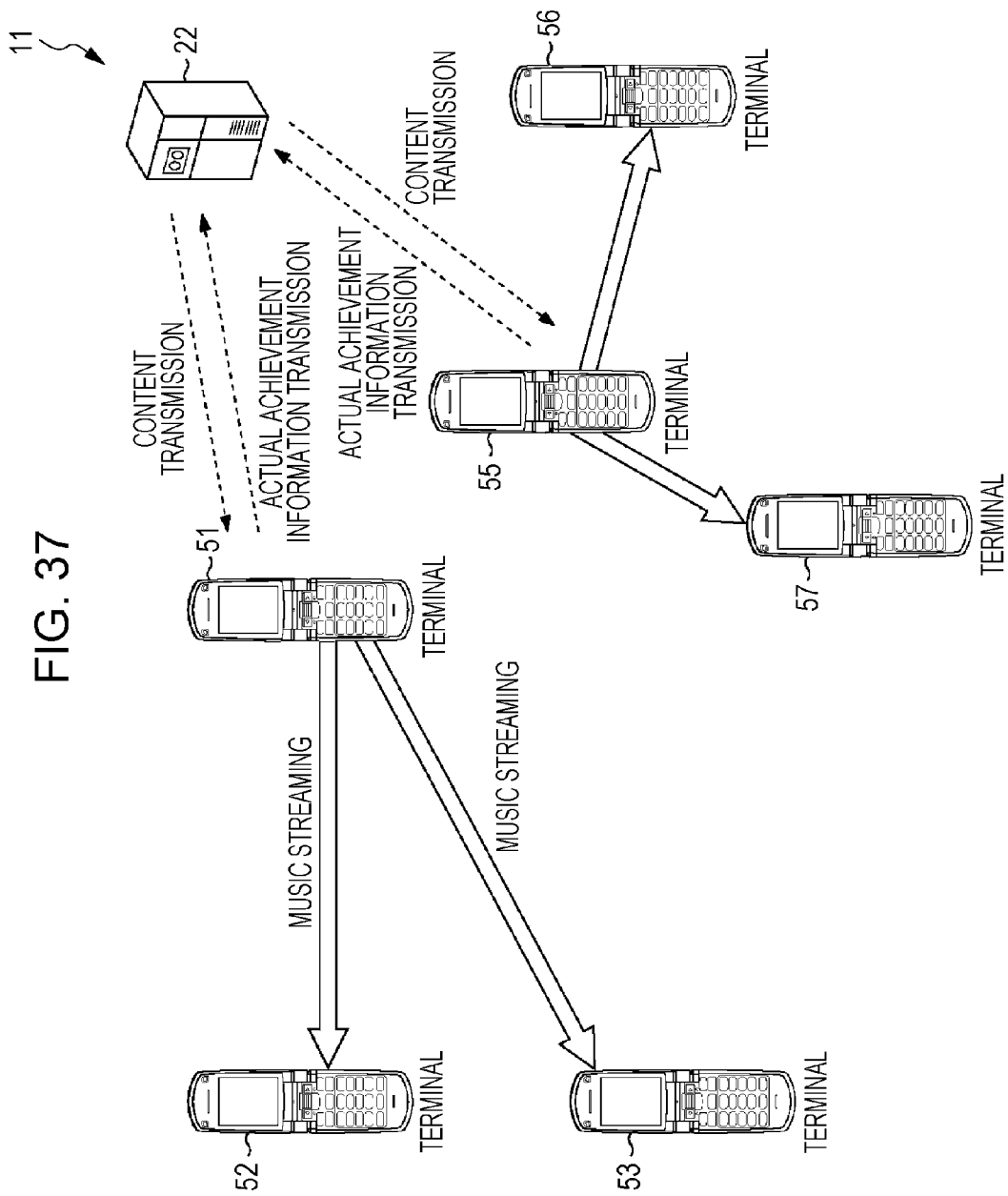
FIG. 37 is a diagram showing a configuration example of a content distribution system according to an embodiment of the present disclosure.

FIG. 37 is a diagram illustrating another embodiment of the present disclosure. The drawing shows a configuration example of the content distribution system 11 which distributes content based on the record relating to the content provision of each terminal device.

In this example, the content distribution system 11 includes a server 22, mobile terminals 51 to 53, and mobile terminals 55 to 57. In this example content is transmitted (distributed) to the mobile terminal 51 and mobile terminal 55.

The content is provided from the mobile terminal 51 to the mobile terminals 52 and 53. In addition, the content is provided from the mobile terminal 55 to the mobile terminals 56 and 57. The content is provided to each of the mobile terminals 52, 53, 56, and 57 by the mobile terminals 52, 53, 56, and 57 respectively performing the streaming reproduction of the music content or the like.

The server 22 is installed at the data center of a business operator collecting record information, for example, to obtain the record information transmitted from the mobile terminal 51 or 55 and perform processing such as storage, modification, and the like of the obtained record information. The server 22 distributes the content to the mobile terminal or the mobile terminal 55 based on the obtained record information.

The configuration described above with reference to FIG. 4 is applied to the server 22.

Here, a scheme is assumed in which content is sequentially with the use of the handover of the mobile phone. For example, a case is assumed in which a new song of a musician immediately after the release is distributed to the mobile phones of the members of the fan club for promotion.

The content of the new song immediately after the release is distributed to the use of the mobile terminal 51 and the user of the mobile terminal 55 who are members of the fan club. At this time, the mobile terminals 51 and 55 download the content data from the server 22 and store the content data in the storage unit 123, respectively.

Then, the user of the mobile terminal 51 performs the handover between the mobile terminal 51 and the mobile terminal 52 of a friend to cause the mobile terminal 52 to perform the streaming reproduction of the content with the use of the near field wireless communication. In addition, the user of the mobile terminal 51 performs the handover between the mobile terminal 51 and the mobile terminal 53 of another friend to cause the mobile terminal 53 to perform the streaming reproduction of the content with the use of the near field wireless communication.

The user of the mobile terminal 55 causes the mobile terminals 56 and 57 of friends to perform the streaming reproduction of the content in the same manner.

Although another configuration is also applicable in which the mobile terminal 52 or 53 downloads the content from the mobile terminal 51, it is assumed here that only the streaming reproduction of the content is performed.

Although only the mobile terminals 51 and 55 are described herein as the mobile terminals of the users who are the members of the fan club, more members respectively have the mobile terminals in practice. Moreover, although the example was described herein in which each member provides the content to two friends, the number of persons to which the content is provided is different depending on each member.

As described above, the content is sequentially provided from the members of the fan club according to the content distribution system 11. Some of the users who have received the content as described above actually purchase and download the music content or newly join the fan club.

In the content distribution system 11, the mobile terminals 51 and 55 transmit record information. The record information is the information representing to whom the mobile terminals 51 and 55 respectively have provided the content, for example.

FIG. 38 is a diagram showing an example of the record information. The drawing shows the record information transmitted from the mobile terminal 51 to the server 21, for example, and the record information includes the information relating to the "content provision destination" and the information relating to the "detail" in this example.

The information relating to the "content provision destination" includes the "user ID" and the "user attribute". The "user ID" is the identification information which specifies the user. In this example, "A010001" and "B020003" are described, and they are the identification information of the users of the mobile terminals 52 and 53. In addition, the user ID is allotted to each user based on a predetermined numbering rule in order to uniquely specify each user in the content distribution system 11.

The "user attribute" in FIG. 38 includes "age", "sex", "address" and "taste", and the "age", the information representing the "age, the "sex", the "address" and the "taste" of the user specified by the "user ID" is described. As the "taste", information representing the hobby of the user such as the "watching sports", "reading books", and the like may be described, or information representing the preference specified to music content such as "rock", "jazz", and the like may be described, for example.

The information described as the "user ID" and the "user attribute" in the record information is included in the handover message as will be described later, and is obtained when the handover is performed between the mobile terminal 51 and the mobile terminal 52 or 53, for example.

The information relating to the "detail" includes "provision start time", "provision completion time", "content ID", and "certificate". The "provision start time" and the "provision completion time" are information representing the time point at which the content provision to the user specified by the "user ID" is started and the information representing the time point at which the content provision is completed, respectively.

The "content ID" is the information which specifies the provided content.

The "certificate" is issued as a result of the authentication of the users with the user ID "A010001" and the user ID "B020003" by the application program mounted to the mobile terminal 52 or 53. In addition, the result of the link authentication may be included in the "certificate" as will be described later.

For performing the streaming reproduction of the content in the mobile terminal 52 or 53, it is necessary to log on in advance to the application program for reproducing the content, and the user is authenticated by inputting a password at the time of the log-on, for example. For example, a software company which has developed the application program holds a secret key and an opened key, and the secret key is mounted on the mobile terminal with the application program.

The application for reproducing the content creates a certificate obtained by encrypting a value, which is obtained by performing predetermined computation on the user ID of the user, with its own secret key when a password which is coincident with the password registered in advance is input.

When the record information is transmitted from the mobile terminal 51, the server 22 can authenticate the user as a result by decoding the certificate with the use of the opened key in the server 22. For example, when content of a new song of a musician immediately after the release is distributed for promotion, content provision" means allowing the users to listen via the mobile terminals. For this reason, it is possible to create more reliable record information by adding the user authentication result in each mobile terminal as a certificate.

The above creation of the certificate is just one example, and the certificate may be created based on another scheme. In addition, it is not necessary to provide the certificate for the record information, and the information representing that the user has not been authenticated may be described in the "certificate" for the record information when the user is not authenticated by the mobile terminal 52 or 53, for example.

The information which specifies the type of the certificate is stored in the "certificate" for the record information with the information including the numerical values constituting the certificate. Accordingly, the server which has received the record information recognizes whether or not the result of the user authentication by the application program is included in the record information or whether or not the result of the link authentication is included in the record information as will be described later.

The server 22 receives the record information configured as described above from the mobile terminals 51 and 55. Then, the server 22 analyzes the record information, specifies when and to whom the mobile terminals 51 and 55 have provided the content, and specifies the mobile terminal which has provided the content to more users in unit time, for example.

As described above, the server 22 analyzes the record information and specifies the mobile terminals with the best record in the content provision, for example. The fact that the record in the provision is good may mean that the mobile terminals have provided the content to more users in a unit of time or that the mobile terminals have provided the content to the users of the ages, sexes, addresses, tastes of the promotion target, for example. When the goal of the promotion is to increase fans in the young generation, the record information is filtered with the "age" in the information relating to the "content provision destination", and the record in the provision by the mobile terminals which have provided the content to more users of the ages less than a threshold value is considered to be good.

Moreover, in the analysis of the record information, the effectiveness of the certificate may be determined as well as the determination of whether or not the user authentication result by the application program is included in the "certificate" for the record information or whether or not the link authentication result is included in the "certificate". Here, the effectiveness of the certificate is obtained such that effectiveness is determined when the link authentication result is included along with the user authentication result or when the certificate creation date satisfies a predetermined reference, for example.

The record information may be filtered based on the content of the information (the user authentication result, the link authentication result, or both) included in the certificate and the effectiveness thereof. In so doing, it is possible to specify the mobile terminals with good record in the content provision in consideration of the extent to which the reliability is necessary for the record information.

The server 22 distributes the content of the subsequent new song, for example, to the mobile terminals with good record in the provision, which have been specified as described above, with priority. For example, when the server 22 determines that the record in the provision by the mobile terminal 51 is good, the server 22 allows the mobile terminal to download the content of the subsequent new song for free. Alternatively, the server 22 may allow a plurality of mobile terminals for which the better record in the provision than a preset reference has been confirmed to download the content of the subsequent new song for free, or the server 22 may allow the mobile terminals to download the content of the new song for free in order from the mobile terminal with the best record in the provision with time differences.

Alternatively, a bonus advantage such as a ticket of a concert or the like may be given to the mobile terminal with the best record in the provision.

In so doing, it is possible to promote the selling of the content, for example, and thereby it is possible for a record company or the like which provide the content to realize more effective content distribution.

The content distribution system 11 of the present disclosure makes it possible to perform the aforementioned collection of the record information. Thus, the following information is included in the handover message.

Figure 39:
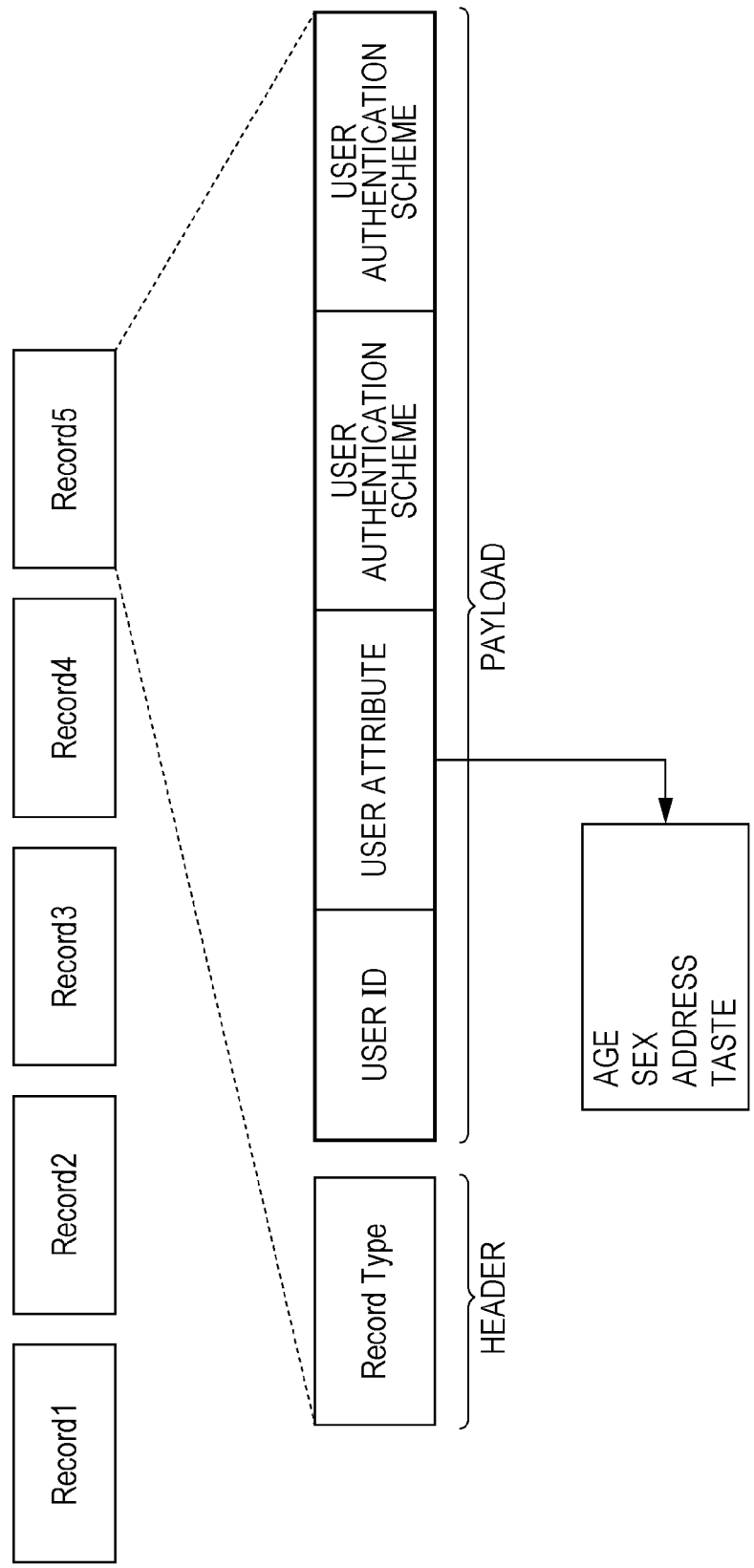
FIG. 39 is a diagram showing another example of a handover message.

FIG. 39 is a diagram illustrating a format of the handover message. As described above with reference to FIG. 14, the handover message is the information transmitted and received when the mobile terminal or the information collecting terminal performs the non-contact communication (NFC communication). The format of the handover message is standardized by NFC Forum, and the format in the drawing is defined by the standard of the NFC Forum.

The "Record 1" to the "Record 4" in the drawing are the same as those described above with reference to FIG. 14. Therefore, the detailed description thereof will be omitted.

The "Record 5" is the information in which the information defined by the manufacturer of the mobile terminal or the like is stored in the same manner as in the "Record 4". According to the present disclosure, the packet information as shown in the drawing is defined as the information included in the "Record 5".

As shown in the drawing, the packet including the header and the payload is stored in the "Record 5".

The information of the "Record Type" is described in the header, and the information representing that the Record 5 is the record in which the information to be used for collecting the record information is stored is described in this case.

The payload includes the "user ID", the "user attribute", the "user authentication scheme", and the "user authentication information".

The "user ID" and the "user attribute" are the same as those in the record information described above with reference to FIG. 38.

The "user authentication scheme" is the information which specifies the authentication scheme relating to the "user authentication information".

A case will be considered in which the user authentication is performed in the mobile terminal 52 or 53 as described above. For example, when the mobile terminal 52 or the like performs the streaming reproduction of the content, it is necessary to log on in advance to the application program for the content reproduction, and the user is authenticated by inputting a password at the time of the log-on. In such a case, a certificate is created by encrypting a value obtained by performing predetermined computation on the user ID with a secret key of a software company which has developed the application program.

In such a case, the information representing the aforementioned predetermined computation performed on the user ID, the information which specifies the software company, and the like are stored in the "user authentication information", for example, and the aforementioned certificate is stored.

For example, when the user is not authenticated by the mobile terminal 52 or 53, the information representing that the user has not been authenticated is stored in the "user authentication scheme", and null value is stored in the "user authentication information".

The mobile terminal 51 creates the aforementioned record information based on the information described in the "Record 5" in the handover message as described above and transmits the record information to the server 22.

Here, in order to further enhance the reliability of the record information, it is possible to perform the aforementioned link authentication and allow the link authentication result to be included in the certificate. That is, it is possible to add the link authentication result as the information which proves that the record information is not fake.

For example, when the server 22 in FIG. 37 can perform the link authentication in the same manner as the server 21 in FIG. 1, the server 22 creates the certificate of the link authentication. In such a case, the server 22 performs the link authentication on the communication between the provider side (the mobile terminal 51, for example) and the user (the mobile terminal 52 or 53, for example) in the same manner as the processing described above with reference to FIG. 16.

Then, the server 22 creates the certificate by encrypting the information representing that the link authentication is performed until the content provision from the mobile terminal 51 to the mobile terminal 52 or 53 is completed, for example. The information obtained by encrypting a value obtained in combination between the user ID of the user of the mobile terminal 52 or 53 and the time point of the link authentication with the unique key of the server 22 is regarded as the certificate. The server 22 transmits the encrypted certificate to the mobile terminal 51 when the content provision is completed.

The server 22 decodes the information stored in the "certificate" of the record information transmitted from the mobile terminal 51 with its own unique key. In so doing, the sever 22 obtains the user ID of the user of the mobile terminal 52 or 53 and the time point of the link authentication, and compares the user ID and the time point with the content of the record information to confirm that the record information is not the fake.

Alternatively, when the server 22 in FIG. 37 is not capable of performing the link authentication in the same manner as the server 21 in FIG. 1, the server 21 creates the certificate of the link authentication as described above. At this time, the server 21 holds a secret key and an opened key.

In this case, the information obtained by encrypting a value obtained in combination between the user ID of the user of the mobile terminal 52 or 53 and the time point of the link authentication with the secret key of the server 21 is regarded as the certificate, for example. The server 21 transmits the encrypted certificate to the mobile terminal 51 at the time of the completion of the content provision.

The server 22 decodes the information stored in the "certificate" of the record information transmitted from the mobile terminal 51 with the opened key of the server 21. In so doing, the server 22 obtains the user ID of the user of the mobile terminal 52 or 53 and the time point of the link authentication, compares the user ID and the time point with the content of the record information to confirm that the record information is not the fake.

Another method can also be selected in which a content text and a secret key (or a unique key) is input to a hash function and the output value is added to the certificate as a digital sign as well as the above method in which the certificate itself is encrypted. In such a case, the server can detect the fake in the certificate by verifying the sign with the use of the opened key (or the unique key) corresponding to the mobile terminal or the like.

It is possible to further enhance the reliability of the record information by allowing the link authentication result to be included in the certificate as described above.

In addition, the record information obtained as described above is used not only for the effective distribution of content but also for various purposes.

Figure 40:
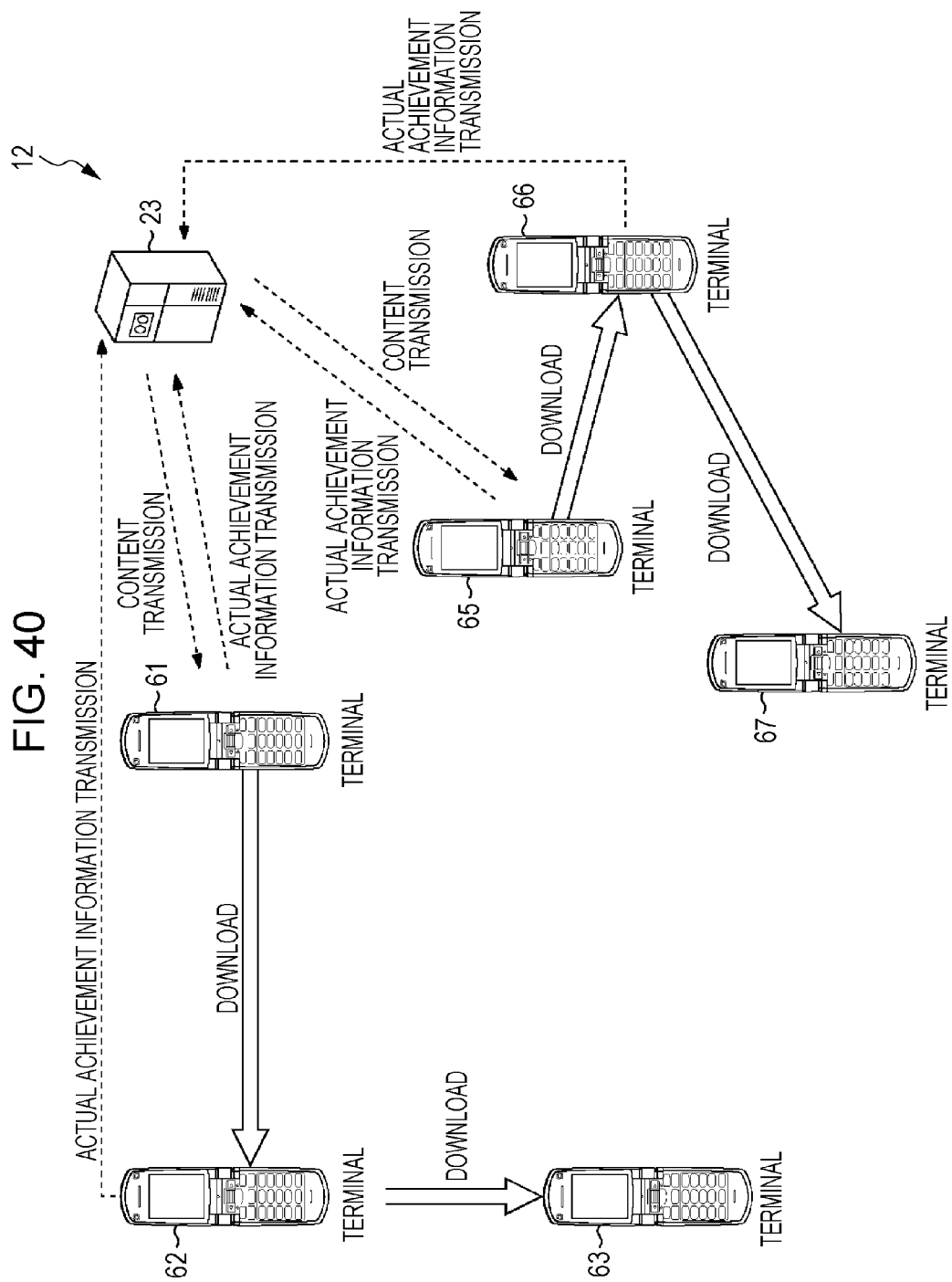
FIG. 40 is a diagram showing another configuration example of a content distribution system according to an embodiment of the present disclosure.

For example, a content distribution system 12 is assumed in which content is sequentially downloaded from a mobile terminal of a user to a mobile terminal of another user as shown in FIG. 40. In the example of FIG. 40, the mobile terminals 61 and 65 download the content data from the server 23.

In addition, the configuration described above with reference to FIG. 4 is applied to the server 23 as well.

The mobile terminals 62 and 66 download the content from the mobile terminals 61 and 65, respectively. Moreover, the mobile terminals 63 and 67 download the content from the mobile terminals 62 and 66, respectively.

Then, the mobile terminals 61, 62, 65, and 66 transmit the record information to the server 23.

In such a content distribution system 12, it is possible to specify the user as a core for the content provision based on the record information.

Figure 41:
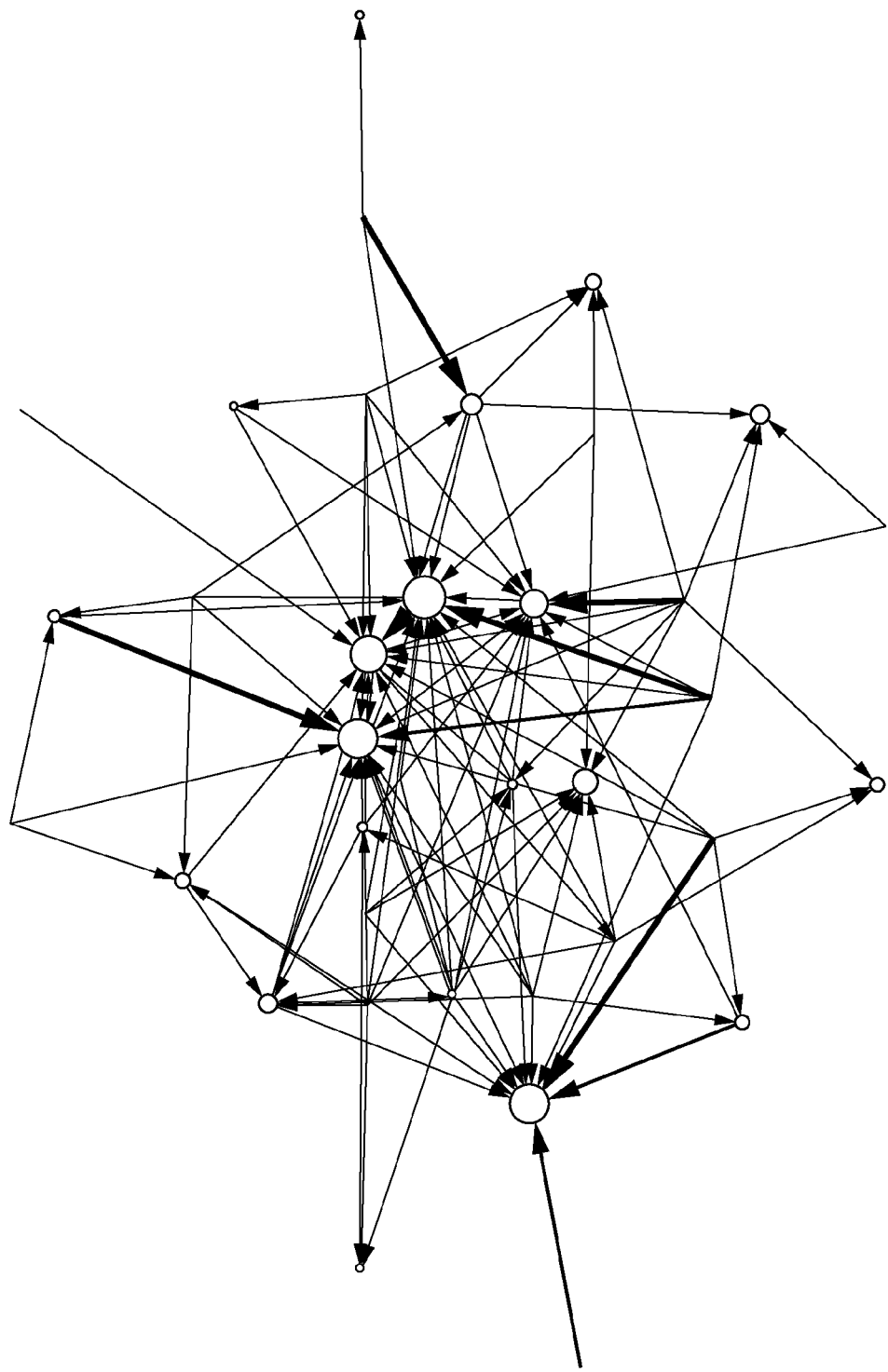
FIG. 41 is a diagram showing an example of a network map created by regarding respective mobile terminals in the record information as nodes.

The server 23 can recognize to which mobile terminal each mobile terminal has provided the content based on the record information. FIG. 41 is a diagram showing an example of a network map created by regarding respective mobile terminals in the record information as nodes. The circle in the drawing represents the node, and the node which is connected to more nodes is represented as a bigger circle.

It is considered that the mobile terminal which has provided the contents to more mobile terminals is the mobile terminal with high importance in the content distribution system 12 and the content evaluation by the user of the mobile terminal greatly affects the selling of the content. Thus, the server 23 specifies the user as a core based on the record information.

Although the server 23 may simply determine the user of the mobile terminal, who has provided the content to the largest number of the mobile terminals, it is also possible to specify the user who effectively becomes the core, based on the record information.

For example, the server 23 specifies the user as a core by computing an evaluation value corresponding to the number of the users to which the user has provided the content and comparing the evaluation values. At this time, the evaluation value is computed by performing the weighting as will be described later.

For example, the server 23 obtains the information representing the number of users to which the individual mobile terminals have provided the content based on the "user IDs" in the record information, for example. Then, the server 23 specifies the type and the category of the provided content based on the "content ID" in the record information, for example, and performs the weighting of the users who have provided the content based on the specification result.

In so doing, it is possible to specify the user as a core for music content or game content, for example.

In addition, the server 23 performs the weighting of the users who have provided the content based on the "provision start time" or the "provision completion time" in the record information, for example. The users who have recently provided the content are weighted more heavily, for example.

In so doing, it is possible to specify the user as a core in consideration of the timeliness of the record information.

The server 23 may further perform the weighting of the users after receiving the evaluation information from the server 21, for example. For example, the server 23 can obtain the identification information of the mobile terminal of the user based on the user ID of the record information. The server 23 obtains the evaluation information from the server based on the identification information of the mobile terminal. Then, the users of the mobile terminal from which evaluation information including longer comments was obtained are weighted more heavily.

As described above, it is possible to specify the users as cores in consideration of whether or not the content has been provided to the users who are interested in the content, for example.

The server 23 calculates the evaluation value of the user of each mobile terminal as described above, for example. When the evaluation value of the n-th $User_n$ is represented as V (User$_n$), the evaluation value of the user is computed based on the equation (1).

$$V(User_n) = \sum_{i=0}^{M} Cat_i \cdot Time_i \cdot Eval_i \quad (1)$$

In Equation (1), the variable i is a variable indicating the user ID included in the record information transmitted from the mobile terminal of the n-th user (referred to as a target user) as the target of the evaluation, and M user IDs are included here. That is, the n-th target user provided the content to M users. In addition, the user to whom the target user has provided the content will be referred to as a provision destination user here.

In addition, Cat$_i$ in the equation (1) indicates the weight of the provision destination user calculated based on the "content ID" in the record information. Time$_i$ indicates the weight of the provision destination user calculated based on the "provision start time" or the "provision completion time" in the record information. Eval$_i$ indicates the weight of the provision destination user calculated based on the evaluation information.

In addition to this, the weighting based on the age and the sex of the provision target user may be performed.

The user specified by the evaluation value described above with reference to the equation (1) can be considered to be a user as a start point for the content provision, namely a so-called hub user. However, it is also possible to specify the user with high importance in the content provision from another view point.

For example, when users form a group, the content provision is performed within the group in many cases. For example, a case will be considered in which the content is sequentially downloaded between the users who are students. In such a case, the content is relatively easily downloaded between the users who belong to a same club. However, the content is downloaded by the users belonging to another club in less cases.

In such a case, it is considered that the view point of whether or not the user has provided the content to the users in another club becomes more important than the view point of how many users the user has provided to the content, in order to specify the user as a core. That is, since it is considered that the content is easily downloaded within individual clubs, the user as a connector who connects a club and another club is important.

For example, the server 23 can obtain the history of the past content provision for each user of each mobile terminal by analyzing the record information. For example, it is possible to create a list of users who provided the content in the past three month as a history of the past content provision for each of the user of each mobile terminal.

Figure 42:
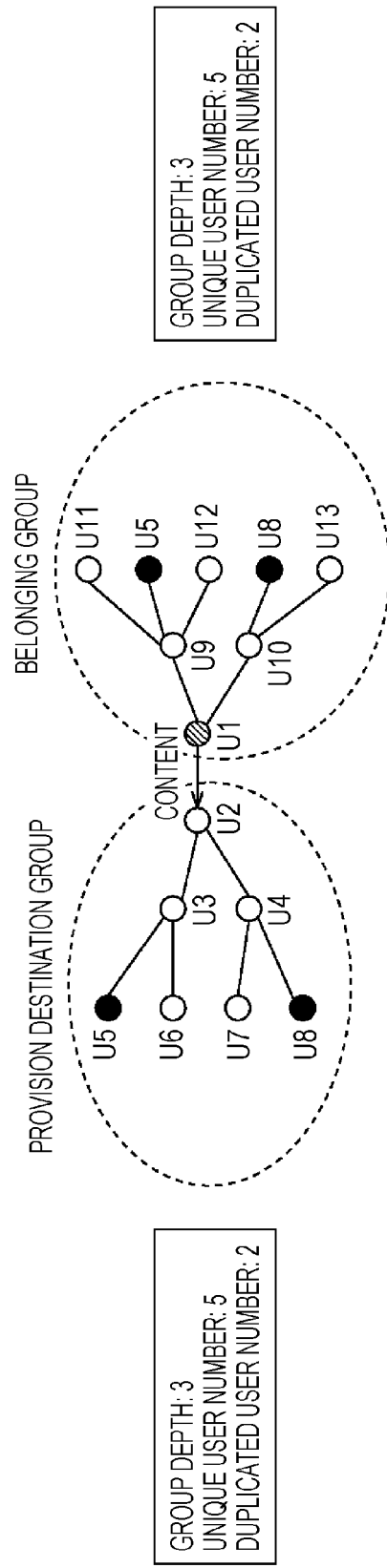
FIG. 42 is a diagram illustrating a scheme for specifying a user as a connector.

The server 23 can specify the user as a connector based on such content provision history. FIG. 42 is a diagram illustrating a scheme which specifies the user as a connector. In the drawing, each user is shown as a node represented by a circle with the corresponding reference numerals of U1, U2, or the like. Now, it is determined whether or not the user as the node shown by U1 in the drawing is the user as a connector.

The server 23 creates a list of the users to whom the user U1 provided the content in the past three months based on the already accumulated record information. In this case, the user U1 provided the content to the users U9 and U10 in the past.

The server 23 creates a list of the users to whom the users U9 and U10 provided the content in the past three months based on the already accumulated record information. In this case, the user U9 provided the content to the users U11, U5, and U12. In addition, the user U10 provided the content to the users U8 and U13.

As described above, the assigned group of the user U1 is specified.

The server 23 determines that the user U1 provided the content to the user U2 based on the record information newly transmitted from the mobile terminal of the user U1. The server 23 specifies the assigned group of the user U2 (referred to as a provision destination group) based on the already accumulated record information in the same manner as in the aforementioned case.

Then, the server 23 counts the number of the users duplicated between the assigned group and the provision destination group. In this example, the users U5 and U8 are duplicated, the number of duplicated users is two. In addition, the server 23 counts the number of the users (referred to as unique users) who are not duplicated between the assigned group and the provision destination group. In this example, the number of unique users is five in each of the assigned group and the provision destination group.

The server 23 sums up the number of unique users in the assigned group and the number of unique users in the provision destination group, for example, to calculate the evaluation value of the user as a connector. Then, the user as a connector is specified based on the calculated evaluation value.

The description was made of the example of FIG. 42 in which the group depths of the assigned group and the provision destination group were three. That is, the assigned group and the provision destination group were formed based on the content provision history of three levels from the user U1 and the user U2 as the start points. The group depth for specifying the user as a connector in practice may arbitrarily be set.

As described above, the server 23 can specify a user as a hub or a user as a connector. Such user information is important for viral marketing, for example. The operator of the server 23 can provide a service such as providing the information relating to the user as a hub or a connector specified as described above to the content business operator such as a game software manufacturer or the like.

Figure 43:
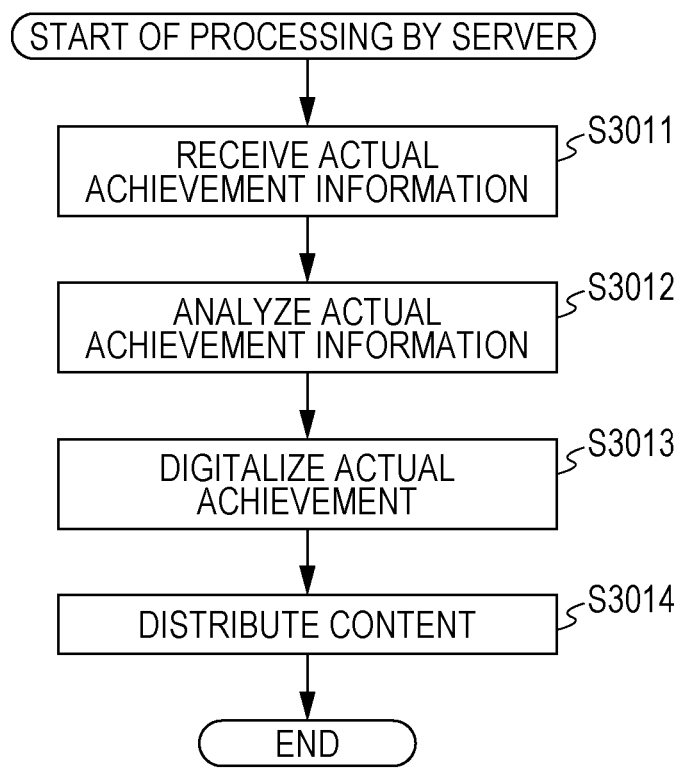
FIG. 43 is a flow chart illustrating an example of server processing according to the embodiment of FIG. 37.

Next, description will be given of the processing by the server 22 with reference to the flow chart in FIG. 43. This processing is executed when the content distribution based on the record information is ordered, for example.

The server 22 receives the record information in Step S3011. At this time, the record information transmitted from the mobile terminals 51 and 55 in FIG. 37 is received, for example.

The server 21 analyzes the record information, which has been received in Step S3011, in Step S3012. At this time, the analysis is performed for specifying the mobile terminal with the best record in the content provision, for example. The fact that the record in the provision is good may mean that the mobile terminals have provided the content to more users in unit time or that the mobile terminals have provided the content to the users of the ages, sexes, addresses, and tastes of the promotion target, for example. When the goal of the promotion is to increase fans in the young generation, the record information is filtered with the "age" in the information relating to the "content provision destination", and the record in the provision by the mobile terminals which have provided the content to more users of the ages less than a threshold value is considered to be good.

The record information may be filtered based on the content of the information (the user authentication result, the link authentication result, or both) included in the certificate and the effectiveness thereof.

In Step S3013, the server 22 quantifies the level of the record in the provision by each mobile terminal based on the result of the processing of Step S3012.

In Step S3014, the server 22 distributes the content of the subsequent new song with priority based on the result of the processing of Step S3013.

At this time, the mobile terminal with the good record in the provision is specified by mutually comparing the numerical values of the mobile terminals obtained as the result of the processing of Step S3013 or by comparing the numerical values with a preset threshold value, for example. Then, when the server 22 determines that the record in the provision by the mobile terminal 51 is good, the server 22 allows the mobile terminal 51 to download the content of the subsequent new song for free. Alternatively, the server 22 may allow a plurality of mobile terminals for which the better record in the provision than a preset reference has been conformed to download the content of the subsequent new song for free, or the server 22 may allow the mobile terminals to download the content of the new song for free in order from the mobile terminal with the best record in the provision with time differences.

Alternatively, a bonus advantage such as a ticket for a concert or the like may be given to the mobile terminal with the best record in the provision.

As described above, the processing by the server 22 is executed.

Figure 44:
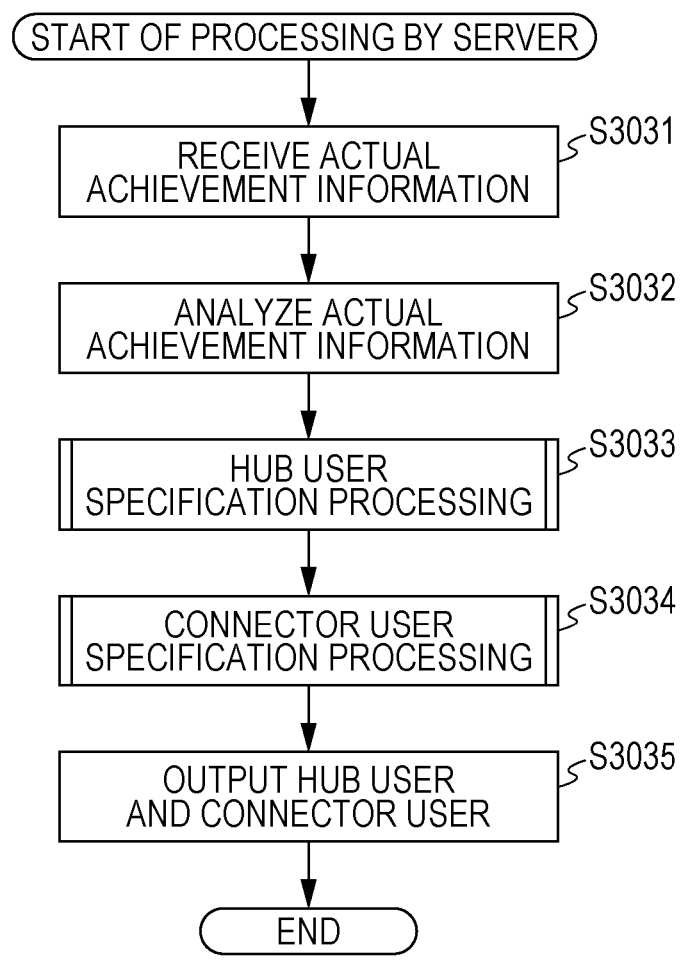
FIG. 44 is a flow chart illustrating an example of server processing according to the embodiment of FIG. 40.

Next, description will be given of the processing by the server 23 with reference to the flow chart in FIG. 44. This processing is executed when the specification of a hub user or a connector user based on the record information is ordered, for example.

The server 23 receives the record information in Step S3031. At this time, the record information transmitted from the mobile terminals 62 and 67 in FIG. 40 is received, for example.

The server 23 analyzes the record information, which has been received in Step S3032, in Step S3032.

At this time, the server 23 obtains the information representing to how many users the individual mobile terminals have provided the content based on the user IDs in the record information, for example. Then, the server 23 specifies the type, the category, and the like of the provided content based on the "content ID" in the record information and performs weighting of the users who have provided the content based on the specification result.

Alternatively, the server 23 may perform the weighting of the users who have provided the content based on the "provision start time" or the "provision completion time" of the record information, for example. Furthermore, the server 23 obtains the evaluation information from the server based on the identification information of the mobile terminal. Then, the users of the mobile terminal from which evaluation information including longer comments was obtained are weighted more heavily.

The analysis result is used in the hub user specification processing which will be described later.

In addition, the server 23 creates a list of the users who provided the content in the past three months for each user of each mobile terminal at this time, for example, to create the history of the past content provision.

Such an analysis result is used in the connector user specification processing which will be described later.

The server 23 executes the hub user specification processing in Step S3033. Here, the evaluation value of the user of each mobile terminal is calculated based on the result of the processing of Step S3032, for example. The user evaluation value is computed based on the aforementioned equation (1).

As described above, a hub user is specified.

The server 23 executes the connector user specification processing in Step S3034. Here, the number of the users duplicated between the assigned group and the provision destination group is counted as described above with reference to FIG. 42 based on the result of the processing of Step S3032, for example. The number of the unique users who are not duplicated between the assigned group and the provision destination group is counted, and then number of the unique users in the assigned group and the number of the unique users in the provision destination group are summed up to calculate the evaluation values of the users as connectors.

As described above, the connector user is specified.

In Step S3035, the server 23 outputs the user ID of the hub user specified in the processing of Step S3033 or the user ID of the connector user specified in the processing of Step S3034.

As described above, the processing by the server 23 is executed.

The description was given of the embodiments described above with reference to FIGS. 37 to 44 as examples in which the server 22 more effectively distribute the content based on the record information relating to the content provision by the mobile terminal with the handover function or in which the server 23 specifies the hub user or the connector user. However, the record information processed by the server 22 or 23 is not limited to the record information relating to the content provision by the mobile terminal with the handover function. For example, the record information relating to the content provision by a terminal which provides content via wired communication may be processed, for example.

In addition, the description was given of the embodiments described above with reference to FIGS. 37 to 44 as an example in which the record information relating to the content provision is handled. However, the present disclosure can be applied to the case in which the record information relating to the provision of electronic information properties other than content is handled, for example.

Although the above description was made of a case in which the non-contact communication is performed at the time of the handover and the near field wireless communication is then performed, the embodiments to which the present disclosure can be applied are not limited thereto. For example, contact type communication in which a terminal is brought to be in contact may be used instead of the non-contact communication such as the NFC or the like, or the ordinary wired LAN may be used instead of the near field wireless communication.

Although the above description was given of a case in which the wireless communication for the mobile communication network was used for the broad area communication performed between the server and the mobile terminal or the like, the embodiments to which the present disclosure can be applied are not limited thereto. For example, communication with the use of fixed communication network communication or the unique network may be used instead of the wireless communication for the mobile communication network.

The aforementioned series of processes can be executed by hardware or software. When the aforementioned series of processes is executed by the software, the program configuring the software is installed on a computer embedded in the dedicated hardware from the network or a recording medium. Alternatively, the various programs are installed on a general personal computer capable of performing various functions from the network or the recording medium.

When the aforementioned series of processes is executed by the software, the program constituting the software is installed from the network such as the Internet or the like or a recording medium such as a removable medium or the like.

It is matter of course that the series of processes described above in this specification is not necessarily performed in the time series manner but may include the processes executed in parallel or individually executed.

The embodiments of the present disclosure are not limited to the aforementioned embodiments, and various modifications can be made within the range of the scope of the present disclosure.

What is claimed is:

1. An information processing apparatus comprising:
   a central processing unit (CPU) operable to:
      generate first information using a first unique key of a first terminal device, wherein the first unique key is obtained based on identification information of the first terminal device received from a second terminal device, and wherein the first terminal device is configured to receive predetermined electronic information, evaluate the predetermined electronic information and provide evaluation information to the second terminal device based on the evaluation;
      transmit the first information to the second terminal device, wherein the second terminal device is a provider of the predetermined electronic information;
      receive second information from the second terminal device, wherein the first terminal device is configured to decode the first information using the first unique key to generate the second information;
      perform link authentication based on a comparison between the transmitted first information and the received second information;
      obtain the evaluation information from the second terminal device based on the confirmation;
      calculate an evaluation value of the second terminal device based on the obtained evaluation information; and
      specify a provision destination group, which includes one or more users to whom the first terminal device is configured to provide the predetermined electronic information received from the second terminal device, based on the evaluation information provided from the first terminal device to the second terminal device.

2. The information processing apparatus according to claim 1,
   wherein the evaluation information comprises the identification information of the first terminal device,
   wherein the evaluation information is obtained from the second terminal device through a first communication mechanism, and
   wherein the second terminal device is configured to provide the predetermined electronic information to the first terminal device through a second communication mechanism different from the first communication mechanism.

3. The information processing apparatus according to claim 1, wherein the evaluation value of the second terminal device is calculated based on at least one of: a type of the predetermined electronic information and a time at which the second terminal device provides the predetermined electronic information to the first terminal device.

4. The information processing apparatus according to claim 1, wherein the CPU is operable to:
   specify an assigned group, which includes one or more users to whom the second terminal device provides the predetermined electronic information, based on the obtained evaluation information.

5. The information processing apparatus according to claim 4, wherein the evaluation value is calculated based on a number of users who are not duplicated among the one or more users belonging to the specified assigned group and the provision destination group respectively.

6. The information processing apparatus according to claim 1, wherein the CPU is further operable to receive, from the second terminal device, handover information, indicating authentication of a connection between the first terminal device and the second terminal device and
   wherein the handover information comprises an authentication scheme information, and
   wherein the link authentication is performed based on the authentication scheme information.

7. The information processing apparatus according to claim 6, wherein the CPU is operable to perform the link authentication and confirm the connection between the first terminal device and the second terminal device using the authentication scheme information at a predetermined interval.

8. The information processing apparatus according to claim 6, wherein the CPU is further operable to confirm identity of the first terminal device and the second terminal device based on the authentication scheme information.

9. The information processing apparatus according to claim 8, wherein the authentication scheme information is based on a trust expression which indicates a confidential relationship between the information processing apparatus and the second terminal device as the provider of the predetermined electronic information.

10. The information processing apparatus according to claim 8,
    wherein the authentication scheme information is based on a determination whether or not the first unique key is stored in the first terminal device to confirm the identity of the first terminal device and based on a determination whether or not a second unique key is stored in the second terminal device to confirm the identity of the second terminal device, and
    wherein the CPU is operable to generate the first information as a temporary key and transmit the first information to the first terminal device when the first unique key is not stored in the first terminal device.

11. The information processing apparatus according to claim 1, wherein the CPU is further operable to:
    determine whether or not the first unique key is stored in the first terminal device;
    generate the first information as a temporary key based on the determination that the first unique key is not stored in the first terminal device;
    transmit the first information to the first terminal device;
    receive the second information from the second terminal device, wherein the first terminal device is configured to provide the first information to the second terminal device; and perform the link authentication and confirm a connection between the first terminal device and the second terminal device based on the comparison between the transmitted first information and the received second information.

12. The information processing apparatus according to claim 1, wherein the CPU is further operable to receive a notification, indicating authentication in a connection between the first terminal device and the second terminal device, from the second terminal device.

13. The information processing apparatus according to claim 12, wherein the notification comprises the identification information of the first terminal device and identification information of the second terminal device.

14. The information processing apparatus according to claim 12,
wherein the evaluation information is obtained from the second terminal device through a first communication mechanism,
wherein the second terminal device is configured to provide the predetermined electronic information to the first terminal device through a second communication mechanism,
wherein the authentication of the connection between the first terminal device and the second terminal device is performed through a third communication mechanism, and
wherein the first, the second, and the third communication mechanisms are different from each other.

15. The information processing apparatus according to claim 14, wherein the second terminal device is configured to transmit the first information to the first terminal device through the second communication mechanism.

16. The information processing apparatus according to claim 1, wherein the CPU is operable to generate a random number which is encrypted with the first unique key of the first terminal device to generate the first information.

17. The information processing apparatus according to claim 1, wherein the evaluation information comprises attribute information associated with a user of the first terminal device and wherein the attribute information comprises at least one of: age, sex, address, and taste.

18. The information processing apparatus according to claim 1, wherein the evaluation value of the second terminal device is based on a number of times the predetermined electronic information is provided to the first terminal device.

19. The information processing apparatus according to claim 1, wherein the evaluation value of the second terminal device is calculated by equation (1)

$$V=Cat*\text{Time}*\text{Eval} \qquad (1),$$

wherein "Cat" comprises a first weight for the predetermined electronic information, "Time" comprises a second weight for a time at which the second terminal device provides the predetermined electronic information to the first terminal device, and "Eval" comprises a third weight for the evaluation information, as evaluation of the predetermined electronic information, provided by the first terminal device to the second terminal device, and wherein "V", as the evaluation value, is a mathematical product of "Cat", "Time", and "Eval" of the equation (1).

20. The information processing apparatus according to claim 1, wherein the predetermined electronic information comprises one or more of:
music content, game content, restaurant menu, and questionnaire.

21. The information processing apparatus according to claim 1, wherein the evaluation information comprises a provision start time of the predetermined electronic information, a provision completion time of the predetermined electronic information and a content ID of the predetermined electronic information.

22. The information processing apparatus according to claim 21, wherein the provision start time represents the time at which the first terminal device corresponding to a user starts receiving the predetermined electronic information from the second terminal device.

23. The information processing apparatus according to claim 21, wherein the provision completion time represents the time at which the first terminal device completes the reception of the predetermined electronic information.

24. A non-transitory computer-readable medium having stored thereon, a computer program having at least one code section executable by a computer, thereby causing the computer to perform steps comprising:
generating first information using a unique key of a first terminal device, wherein the first key is obtained based on identification information of the first terminal device received from a second terminal device, and wherein the first terminal device is a provider of predetermined electronic information;
transmitting the first information to the second terminal device, wherein the second terminal device is configured to receive the predetermined electronic information, evaluate the predetermined electronic information and provide evaluation information to the first terminal device based on the evaluation;
receiving second information from the second terminal device, wherein the first terminal device is configured to decode the first information using the unique key to generate the second information;
performing link authentication based on a comparison between the transmitted first information and the received second information;
obtaining the evaluation information from the first terminal device based on the confirmation;
calculating an evaluation value of the first terminal device based on the obtained evaluation information;
specifying a provision destination group, which includes one or more users to whom the first terminal device is configured to provide the predetermined electronic information received from the second terminal device, based on the evaluation information provided from the first terminal device to the second terminal device.

25. The non-transitory computer-readable medium according to claim 24, further comprising determining a confidential relationship with the first terminal device and performing the link authentication is based on the confidential relationship.

* * * * *